(12) United States Patent
Santhakumar et al.

(10) Patent No.: US 11,687,424 B2
(45) Date of Patent: Jun. 27, 2023

(54) AUTOMATED MEDIA AGENT STATE MANAGEMENT

(71) Applicant: Commvault Systems, Inc., Tinton Falls, NJ (US)

(72) Inventors: Shree Nandhini Santhakumar, Kanyakumari (IN); Mrityunjay Upadhyay, Hyderabad (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 116 days.

(21) Appl. No.: 16/886,520

(22) Filed: May 28, 2020

(65) Prior Publication Data

US 2021/0374021 A1    Dec. 2, 2021

(51) Int. Cl.
| | | |
|---|---|---|
| *G06F 11/00* | (2006.01) | |
| *G06F 11/20* | (2006.01) | |
| *G06F 3/06* | (2006.01) | |
| *G06N 3/08* | (2023.01) | |

(52) U.S. Cl.
CPC ........ *G06F 11/2094* (2013.01); *G06F 3/0604* (2013.01); *G06F 3/067* (2013.01); *G06F 3/0634* (2013.01); *G06N 3/08* (2013.01); *G06F 2201/82* (2013.01)

(58) Field of Classification Search
CPC ............. G06F 11/2094; G06F 11/2017; G06F 11/2089; G06F 3/0604; G06F 3/0634
See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Philip Guyton
(74) *Attorney, Agent, or Firm* — Commvault Systems, Inc.

(57) ABSTRACT

Described herein are techniques for automating media agent state management. For example, if a media agent is running poorly, then the media agent can be disabled and an alternate media agent can perform secondary copy job operations in place of the poorly running media agent. To determine whether a media agent is running poorly, a storage manager can determine whether the media agent has an anomalous number of failed jobs, pending jobs, and/or long running jobs and/or can determine whether the amount of resources used by the media agent is high or is increasing constantly, at a constant rate, or at a near constant rate.

20 Claims, 30 Drawing Sheets

(56) References Cited

U.S. PATENT DOCUMENTS

| | | |
|---|---|---|
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,044,437 A | 3/2000 | Reinders |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,389,433 B1 | 5/2002 | Bolosky et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescenti et al. |
| 7,065,619 B1 | 6/2006 | Zhu et al. |
| 7,082,441 B1 | 7/2006 | Zahavi |
| 7,085,904 B2 | 8/2006 | Mizuno et al. |
| 7,100,089 B1 | 8/2006 | Phelps |
| 7,103,617 B2 | 9/2006 | Phatak |
| 7,107,298 B2 | 9/2006 | Prahlad et al. |
| 7,107,395 B1 | 9/2006 | Ofek |
| 7,117,246 B2 | 10/2006 | Christenson et al. |
| 7,130,860 B2 | 10/2006 | Pachet |
| 7,130,970 B2 | 10/2006 | Devassy et al. |
| 7,143,091 B2 | 11/2006 | Charnock |
| 7,155,465 B2 | 12/2006 | Lee |
| 7,155,633 B2 | 12/2006 | Tuma |
| 7,162,496 B2 | 1/2007 | Amarendran et al. |
| 7,174,433 B2 | 2/2007 | Kottomtharayil et al. |
| 7,194,454 B2 | 3/2007 | Hansen |
| 7,197,665 B2 | 3/2007 | Goldstein |
| 7,225,210 B2 | 5/2007 | Guthrie, II. |
| 7,243,163 B1 | 7/2007 | Friend et al. |

(56) References Cited

U.S. PATENT DOCUMENTS

| | | |
|---|---|---|
| 7,246,207 B2 | 7/2007 | Kottomtharayil et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,315,923 B2 | 1/2008 | Retnamma et al. |
| 7,343,356 B2 | 3/2008 | Prahlad |
| 7,343,453 B2 | 3/2008 | Prahlad et al. |
| 7,343,459 B2 | 3/2008 | Prahlad |
| 7,346,751 B2 | 3/2008 | Prahlad |
| 7,383,462 B2 | 6/2008 | Osaki et al. |
| 7,389,311 B1 | 6/2008 | Crescenti et al. |
| 7,395,282 B1 | 7/2008 | Crescenti et al. |
| 7,412,583 B2 | 8/2008 | Burton |
| 7,437,388 B1 | 10/2008 | DeVos |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,500,053 B1 | 3/2009 | Kavuri et al. |
| 7,512,595 B1 | 3/2009 | McBride et al. |
| 7,516,186 B1 | 4/2009 | Borghetti et al. |
| 7,519,726 B2 | 4/2009 | Palliyll et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,567,188 B1 | 7/2009 | Anglin et al. |
| 7,568,080 B2 | 7/2009 | Prahlad et al. |
| 7,574,692 B2 | 8/2009 | Herscu |
| 7,577,806 B2 | 8/2009 | Rowan |
| 7,581,077 B2 | 8/2009 | Ignatius et al. |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,664,771 B2 | 2/2010 | Kusters |
| 7,685,126 B2 | 3/2010 | Patel et al. |
| 7,702,782 B1 | 4/2010 | Pai |
| 7,720,841 B2 | 5/2010 | Gu et al. |
| 7,730,113 B1 | 6/2010 | Payette et al. |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,743,051 B1 | 6/2010 | Kashyap et al. |
| 7,747,577 B2 | 6/2010 | Cannon et al. |
| 7,747,579 B2 | 6/2010 | Prahlad et al. |
| 7,761,425 B1 | 7/2010 | Erickson et al. |
| 7,779,032 B1 | 8/2010 | Garfinkel |
| 7,797,279 B1 | 9/2010 | Starling et al. |
| 7,801,864 B2 | 9/2010 | Prahlad et al. |
| 7,809,914 B2 | 10/2010 | Kottomtharayil et al. |
| 7,814,074 B2 | 10/2010 | Anglin et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 7,840,533 B2 | 11/2010 | Prahlad et al. |
| 7,899,871 B1 | 3/2011 | Kumar et al. |
| 7,962,452 B2 | 6/2011 | Anglin et al. |
| 8,041,907 B1 | 10/2011 | Wu et al. |
| 8,074,043 B1 | 12/2011 | Zeis |
| 8,095,756 B1 | 1/2012 | Somavarapu |
| 8,108,446 B1 | 1/2012 | Christiaens |
| 8,108,638 B2 | 1/2012 | Kishi |
| 8,131,669 B2 | 3/2012 | Cannon et al. |
| 8,136,025 B1 | 3/2012 | Zhu et al. |
| 8,145,614 B1 | 3/2012 | Zimran et al. |
| 8,156,086 B2 | 4/2012 | Lu et al. |
| 8,170,995 B2 | 5/2012 | Prahlad et al. |
| 8,199,911 B1 | 6/2012 | Tsaur et al. |
| 8,200,638 B1 | 6/2012 | Zheng et al. |
| 8,200,923 B1 | 6/2012 | Healey et al. |
| 8,204,213 B2 | 6/2012 | Hunt et al. |
| 8,204,862 B1 | 6/2012 | Paulzagade et al. |
| 8,209,334 B1 | 6/2012 | Doerner |
| 8,224,875 B1 | 7/2012 | Christiaens et al. |
| 8,229,954 B2 | 7/2012 | Kottomtharayil et al. |
| 8,230,195 B2 | 7/2012 | Amarendran et al. |
| 8,261,240 B2 | 9/2012 | Hoban |
| 8,280,854 B1 | 10/2012 | Emmert |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan Retnamma et al. |
| 8,370,315 B1 | 2/2013 | Efstathopoulos et al. |
| 8,370,542 B2 | 2/2013 | Lu et al. |
| 8,375,008 B1 | 2/2013 | Gomes |
| 8,375,181 B1 | 2/2013 | Kekre et al. |
| 8,407,190 B2 | 3/2013 | Prahlad et al. |
| 8,452,739 B2 | 5/2013 | Jain et al. |
| 8,468,320 B1 | 6/2013 | Stringham |
| 8,479,304 B1 | 7/2013 | Clifford |
| 8,484,162 B2 | 7/2013 | Prahlad et al. |
| 8,510,573 B2 | 8/2013 | Muller et al. |
| 8,527,469 B2 | 9/2013 | Hwang et al. |
| 8,549,350 B1 | 10/2013 | Dutch et al. |
| 8,572,055 B1 | 10/2013 | Wu et al. |
| 8,572,340 B2 | 10/2013 | Vijayan Retnamma et al. |
| 8,577,851 B2 | 11/2013 | Vijayan Retnamma et al. |
| 8,578,109 B2 | 11/2013 | Vijayan Retnamma et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,667,591 B1 | 3/2014 | Claudatos et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,825,720 B1 | 9/2014 | Xie et al. |
| 8,849,762 B2 | 9/2014 | Kumarasamy et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan Retnamma et al. |
| 9,015,181 B2 | 4/2015 | Kottomtharayil et al. |
| 9,020,900 B2 | 4/2015 | Vijayan Retnamma et al. |
| 9,092,441 B1 | 7/2015 | Patiejunas et al. |
| 9,098,495 B2 | 8/2015 | Gokhale |
| 9,104,623 B2 | 8/2015 | Vijayan Retnamma et al. |
| 9,110,602 B2 | 8/2015 | Vijayan Retnamma et al. |
| 9,116,850 B2 | 8/2015 | Vijayan Retnamma et al. |
| 9,128,901 B1 | 9/2015 | Nickurak |
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan Retnamma et al. |
| 9,244,779 B2 | 1/2016 | Littlefield et al. |
| 9,251,186 B2 | 2/2016 | Muller et al. |
| 9,298,386 B2 | 3/2016 | Baldwin et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |
| 9,336,076 B2 | 5/2016 | Baldwin et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |

(56) References Cited

U.S. PATENT DOCUMENTS

| | | |
|---|---|---|
| 9,442,806 B1 | 9/2016 | Bardale |
| 9,483,486 B1 | 11/2016 | Christiaens et al. |
| 9,542,554 B1 | 1/2017 | Salsamendi et al. |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan Retnamma et al. |
| 9,665,591 B2 | 5/2017 | Vijayan et al. |
| 9,678,968 B1 | 6/2017 | Taylor et al. |
| 9,753,964 B1 | 9/2017 | Marshall et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,218,740 B1 | 2/2019 | Mesdaq et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,387,269 B2 | 8/2019 | Muller et al. |
| 10,445,293 B2 | 10/2019 | Attarde et al. |
| 10,474,638 B2 | 11/2019 | Mitkar et al. |
| 10,481,824 B2 | 11/2019 | Vijayan et al. |
| 10,481,825 B2 | 11/2019 | Vijayan et al. |
| 10,481,826 B2 | 11/2019 | Vijayan et al. |
| 10,523,699 B1 | 12/2019 | Alamuri |
| 10,540,327 B2 | 1/2020 | Ngo et al. |
| 10,592,357 B2 | 3/2020 | Vijayan et al. |
| 10,628,586 B1 | 4/2020 | Jung |
| 10,740,295 B2 | 8/2020 | Vijayan et al. |
| 10,877,856 B2 | 12/2020 | Vijayan et al. |
| 10,956,275 B2 | 3/2021 | Muller et al. |
| 10,956,286 B2 | 3/2021 | Vijayan et al. |
| 11,016,859 B2 | 5/2021 | Prahlad et al. |
| 11,113,246 B2 | 9/2021 | Mitkar et al. |
| 11,119,984 B2 | 9/2021 | Attarde et al. |
| 11,157,450 B2 | 10/2021 | Vijayan et al. |
| 11,188,504 B2 | 11/2021 | Attarde et al. |
| 11,237,935 B2 | 2/2022 | Upadhyay et al. |
| 11,256,673 B2 | 2/2022 | Bedadala et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0084076 A1 | 5/2003 | Sekiguchi et al. |
| 2003/0105716 A1 | 6/2003 | Lorin, Jr. et al. |
| 2003/0115346 A1 | 6/2003 | McHenry et al. |
| 2003/0149750 A1 | 8/2003 | Franzenburg |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0128442 A1 | 7/2004 | Hinshaw et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0050392 A1 | 3/2005 | Baba et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0154937 A1 | 7/2005 | Achiwa |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2006/0277154 A1 | 12/2006 | Lunt et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0050526 A1 | 3/2007 | Abe et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243769 A1 | 10/2008 | Arbour et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0013258 A1 | 1/2009 | Hintermeister et al. |

(56) References Cited

U.S. PATENT DOCUMENTS

| | | |
|---|---|---|
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0182789 A1 | 7/2009 | Sandorfi et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0228599 A1 | 9/2009 | Anglin et al. |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0276851 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1 | 6/2010 | Lin et al. |
| 2010/0169287 A1 | 7/2010 | Klose |
| 2010/0180075 A1 | 7/2010 | McCloskey et al. |
| 2010/0198864 A1 | 8/2010 | Ravid et al. |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306193 A1 | 12/2010 | Pereira et al. |
| 2010/0306283 A1 | 12/2010 | Johnson et al. |
| 2010/0312752 A1 | 12/2010 | Zeis et al. |
| 2010/0318759 A1 | 12/2010 | Hamilton et al. |
| 2010/0332401 A1 | 12/2010 | Prahlad et al. |
| 2010/0332454 A1 | 12/2010 | Prahlad et al. |
| 2011/0010498 A1 | 1/2011 | Lay et al. |
| 2011/0040728 A1 | 2/2011 | Akirav |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan Retnamma et al. |
| 2012/0166403 A1 | 6/2012 | Kim et al. |
| 2012/0185437 A1 | 7/2012 | Pavlov |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0151562 A1 | 6/2013 | Fujii et al. |
| 2013/0219470 A1 | 8/2013 | Chintala et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0262801 A1 | 10/2013 | Sancheti et al. |
| 2013/0332466 A1 | 12/2013 | Bornea et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0046904 A1 | 2/2014 | Kumarasamy |
| 2014/0047263 A1 | 2/2014 | Coatney et al. |
| 2014/0115287 A1 | 4/2014 | Schnapp et al. |
| 2014/0181028 A1 | 6/2014 | Prahlad et al. |
| 2014/0181441 A1 | 6/2014 | Kottomtharayil et al. |
| 2014/0189277 A1* | 7/2014 | Taki ............ G06F 3/0653 711/167 |
| 2014/0195749 A1 | 7/2014 | Colgrove et al. |
| 2014/0196037 A1 | 7/2014 | Gopalan et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |
| 2014/0281758 A1 | 9/2014 | Klein et al. |
| 2014/0283061 A1 | 9/2014 | Quinlan et al. |
| 2014/0289225 A1 | 9/2014 | Chan et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0089185 A1 | 3/2015 | Brandyberry et al. |
| 2015/0134611 A1 | 5/2015 | Avati et al. |
| 2015/0142755 A1 | 5/2015 | Kishi |
| 2015/0154220 A1 | 6/2015 | Ngo et al. |
| 2015/0154398 A1 | 6/2015 | Jones et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0269032 A1 | 9/2015 | Muthyala et al. |
| 2015/0269212 A1 | 9/2015 | Kramer et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0070911 A1 | 3/2016 | Okereke et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan Retnamma et al. |
| 2016/0306707 A1 | 10/2016 | Vijayan Retnamma et al. |
| 2016/0306708 A1 | 10/2016 | Prahlad et al. |
| 2016/0306818 A1 | 10/2016 | Vijayan Retnamma et al. |
| 2016/0350391 A1 | 12/2016 | Vijayan Retnamma et al. |
| 2017/0031768 A1 | 2/2017 | Sarab |
| 2017/0090786 A1 | 3/2017 | Parab et al. |

(56) References Cited

U.S. PATENT DOCUMENTS

| | | | |
|---|---|---|---|
| 2017/0168903 | A1 | 5/2017 | Dornemann et al. |
| 2017/0185488 | A1 | 6/2017 | Kumarasamy et al. |
| 2017/0192868 | A1 | 7/2017 | Vijayan et al. |
| 2017/0193003 | A1 | 7/2017 | Vijayan et al. |
| 2017/0235647 | A1 | 8/2017 | Kilaru et al. |
| 2017/0242871 | A1 | 8/2017 | Kilaru et al. |
| 2017/0262217 | A1 | 9/2017 | Pradhan et al. |
| 2017/0315876 | A1 | 11/2017 | Dornquast et al. |
| 2017/0331787 | A1 | 11/2017 | Mikami et al. |
| 2018/0075234 | A1 | 3/2018 | Boutnaru |
| 2018/0077201 | A1 | 3/2018 | Boutnaru |
| 2019/0179805 | A1 | 6/2019 | Prahlad et al. |
| 2019/0227879 | A1 | 7/2019 | Vijayan et al. |
| 2020/0073959 | A1 | 3/2020 | Tian |
| 2020/0104052 | A1 | 4/2020 | Vijayan et al. |
| 2020/0104213 | A1 | 4/2020 | Muller et al. |
| 2020/0167091 | A1 | 5/2020 | Haridas et al. |
| 2020/0167240 | A1 | 5/2020 | Haridas et al. |
| 2020/0250145 | A1 | 8/2020 | Ngo et al. |
| 2020/0252428 | A1 | 8/2020 | Gardezi et al. |
| 2020/0327017 | A1 | 10/2020 | Vijayan et al. |
| 2020/0334210 | A1 | 10/2020 | Vijayan et al. |
| 2020/0358621 | A1 | 11/2020 | Ngo |
| 2021/0279141 | A1 | 9/2021 | Vijayan et al. |
| 2021/0294510 | A1 | 9/2021 | Vijayan et al. |
| 2021/0349857 | A1 | 11/2021 | Mitkar et al. |
| 2021/0374021 | A1* | 12/2021 | Santhakumar ...... G06F 11/2094 |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Bhagwat, Extreme Binning: Scalable, Parallel Deduplication for Chunk-based File Backup. IEEE 2009, 9 pages.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cohen, Edith, et al.,. "The Age Penalty and Its Effect on Cache Performance." In USITS, pp. 73-84. 2001.

Cohen, Edith, et al.,."Aging through cascaded caches: Performance issues in the distribution of web content." In ACM SIGCOMM Computer Communication Review, vol. 31, No. 4, pp. 41-53. ACM, 2001.

Cohen, Edith, et al.,. "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#2 of 2, pp. 604-609), Jim; Reuter Andreas, Transaction Processing Concepts and Techniques, Morgan Kaufmann Publisher, USA 1994, pp. 604-609.

Guo et al., Building a High-performance Deduplication System, Jun. 15, 2011, retrieved from the Internet at<U RL: http://dl.acm.org/citation.cfm?id=2002206>, pp. 1-14.

Huff, KL, "Data Set Usage Sequence Number," IBM Technical Disclosure Bulletin, vol. 24, No. 5, Oct. 1981 New York, US, pp. 2404-2406.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structure File System," Operating Systems Review SIGOPS, vol. 25, No. 5, New York, US, pp. 1-15 (May 1991).

Wei, et al. "MAD2: A scalable high-throughput exact deduplication approach for network backup services." Mass Storage Systems and Technologies (MSST), 2010 IEEE 26th Symposium on. IEEE, 2010, 14 pages.

Wolman et al., On the scale and performance of cooperative Web proxy caching, 1999.

Wu, et al., Load Balancing and Hot Spot Relief for Hash Routing among a Collection of Proxy Caches, 1999.

Final Office Action for Japanese Application No. 2003531581, dated Mar. 24, 2009, 6 pages.

International Search Report and Written Opinion, International Application No. PCT/US2009/58137, dated Dec. 23, 2009, 14 pages.

International Search Report and Written Opinion, International Application No. PCT/US2011/030804, dated Jun. 9, 2011.

International Search Report and Written Opinion, International Application No. PCT/US2011/030814, dated Jun. 9, 2011.

International Search Report and Written Opinion, International Application No. PCT/US2013/045443 dated Nov. 14, 2013, 16 pages.

International Preliminary Report on Patentability, International Application No. PCT/US2013/045443 dated Dec. 16, 2014 11 pages.

\* cited by examiner

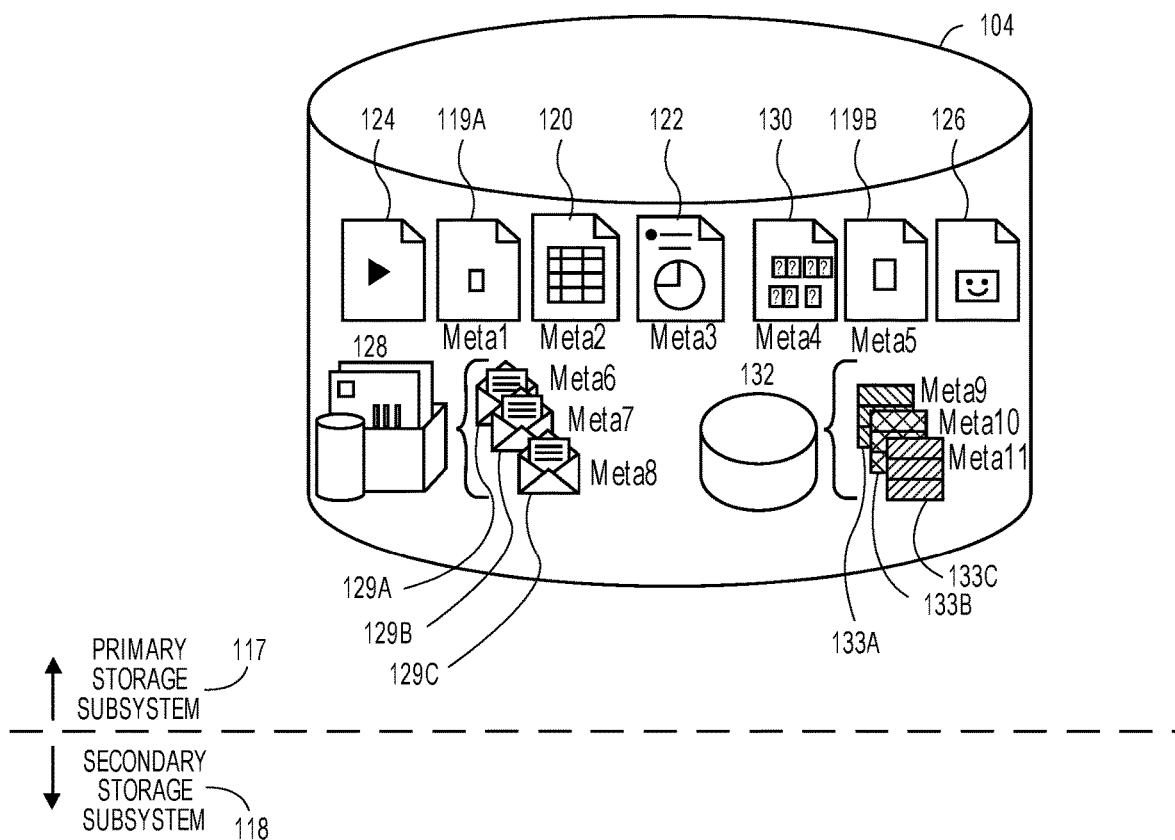
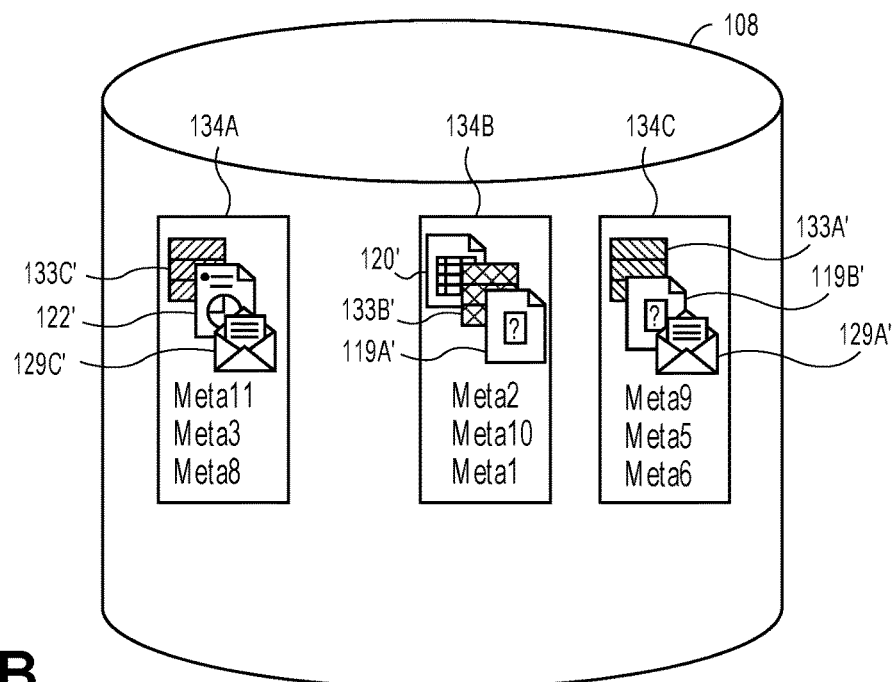
FIG. 1B

ANOMALY NOTIFICATION
THE SYSTEM DETECTED JOBS THAT ARE RUNNING LONGER THAN USUAL

| SERVER | SUBCLIENT NAME | JOB ID | % COMPLETE | ANOMALY THRESHOLD | RUNNING TIME | DELAY REASON |
|---|---|---|---|---|---|---|
| SERVER #1 | SUBCLIENT #1 | 1234 | 85% | 4 MINS | 2 DAYS, 23 HOURS, 12 MINS | <u>POSSIBLE CAUSE</u><br>1. DDB QUERY AND INSERT TIME EXCEEDED THRESHOLD<br>2. DDB IS BEING BACKED UP<br><u>SUGGESTIONS</u><br>1. PLEASE CONSIDER RUNNING DDB BACKUP AT MONDAY 12AM TO WEDNESDAY 10AM, DURING PERIODS OF LOW ACTIVITY |
| SERVER #1 | SUBCLIENT #2 | 1435 | 25% | 1 SECOND | 30 MINUTES | <u>POSSIBLE CAUSE</u><br>1. DDB IS BEING BACKED UP<br><u>SUGGESTIONS</u><br>1. PLEASE CONSIDER RUNNING DDB BACKUP AT MONDAY 12AM TO WEDNESDAY 10AM, DURING PERIODS OF LOW ACTIVITY |
| SERVER #2 | SUBCLIENT #1 | 243754 | 10% | 12 HOURS, 10 MINS | 7 DAYS, 23 HOURS, 49 MINS | WAITING FOR SERVICES ON CLIENT TO COME ONLINE |
| SERVER #3 | SUBCLIENT #1 | 73470 | 15% | 6 HOURS, 10 MINS | 23 HOURS, 48 MINS | REACHED THE MAXIMUM SNAP LIMIT ON THE VOLUME; NO MORE SNAPS CAN BE CREATED. PLEASE DELETE SOME SNAPS AND TRY AGAIN |

FIG. 10A

ANOMALY NOTIFICATION
THE SYSTEM DETECTED JOBS THAT ARE RUNNING LONGER THAN USUAL

| SERVER | SUBCLIENT NAME | JOB ID | % COMPLETE | ANOMALY THRESHOLD | RUNNING TIME | DELAY REASON |
|---|---|---|---|---|---|---|
| SERVER #4 | SUBCLIENT #1 | 894 | 15% | 53 MINS | 11 HOURS, 49 MINS | WAITING FOR THE SERVICES ON THE CLIENT TO COME ONLINE |
| SERVER #4 | SUBCLIENT #2 | 7112 | 15% | 1 HOUR, 3 MINS | 11 HOURS, 49 MINS | WAIITNG FOR THE SERVICES ON THE CLIENT TO COME ONLINE |
| SERVER #4 | SUBCLIENT #3 | 9940 | 15% | 5 HOURS, 40 MINS | 11 HOURS, 49 MINS | WAITING FOR SERVICES ON CLIENT TO COME ONLINE |
| SERVER #5 | SUBCLIENT #1 | 10503 | 90% | 1 HOUR, 51 MINS | 6 HOURS, 48 MINS | POSSIBLE CAUSES<br>1. DDB QUERY AND INSERT TIME EXCEEDED THRESHOLD |
| SERVER #5 | SUBCLIENT #2 | 10509 | 90% | 1 HOUR, 50 MINS | 6 HOURS, 48 MINS | POSSIBLE CAUSES<br>1. DDB QUERY AND INSERT TIME EXCEEDED THRESHOLD |
| SERVER #6 | SUBCLIENT #1 | 5002 | 5% | 16 MINS | 1 HOUR, 49 MINS | WAITING FOR THE SERVICES ON THE CLIENT TO COME ONLINE |

FIG. 10B

ANOMALY NOTIFICATION

THE SYSTEM DETECTED AN UNUSUALLY LARGE NUMBER OF JOBS FAILED. CURRENT FAILED JOBS ARE 109 AGAINST AN EXPECTED VALUE OF LESS THAN 28.

PLEASE CLICK HERE FOR MORE DETAILS.

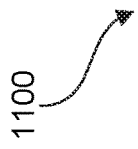

FIG. 11A

ANOMALY NOTIFICATION

THE SYSTEM DETECTED AN UNUSUALLY LARGE NUMBER OF JOBS PENDING. CURRENT PENDING JOBS ARE 17 AGAINST AN EXPECTED VALUE OF LESS THAN 16.

PLEASE CLICK HERE FOR MORE DETAILS.

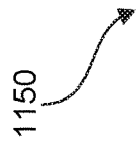

FIG. 11B

ANOMALY NOTIFICATION
THE SYSTEM DETECTED EVENTS THAT ARE UNUSUAL IN OCCURRENCE OR FREQUENCY

| SERVER | EVENT TIME | EVENT | OCCURRENCE | ANOMALY TYPE |
|---|---|---|---|---|
| SERVER #1 | 2019-09-01 17:43:23 | SNAP OF SOURCE VOLUME [D:\] DELETED SUCCESSFULLY | 21 | FREQUENCY |
| SERVER #1 | 2019-09-01 17:43:21 | PREPARE FAILED AS DEVICE IS NOT A HDS DEVICE. PLEASE CHECK IF THE SUBCLIENT CONTENT IS AN HDS DEVICE | 21 | FREQUENCY |

FIG. 12

AUTOMATED MEDIA AGENT STATE MANAGEMENT

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

SUMMARY

Described herein are techniques for better understanding problems arising in an illustrative information management system, such as a data storage management system, and for issuing appropriate alerts and reporting to data management professionals. For example, an information management system can track various events (e.g., user log ins, user log outs, the start of a secondary copy operation, completion of a secondary copy operation, failure of a secondary copy operation, etc.) that occur with respect to components of the information management system, job status (e.g., the status of secondary copy operations, such as backup operations, snapshot operations, archive operations, etc.), and/or the like. In some cases, events occur at regular intervals and/or according to an expected trend. However, if the number of occurrences of an event and/or the duration of time between an event deviates from the regular interval or expected trend (which may be considered an anomaly), this may indicate that a component in the information management system is failing or failed, configured incorrectly, incompatible with other components in the information management system, and/or the like. In such situations, computing resources (e.g., processing power, memory usage, etc.) provided by the information management system may be overutilized to compensate for the issue, negatively affecting the performance of other components in the information management system that rely on these computing resources.

Similarly, during a specific seasonal period of time (e.g., hourly, daily, weekly, monthly, etc.), the time for a job to complete and the number of jobs running in an information management system that have succeeded, are pending, have failed, have been killed, and/or are suspended may be consistent and/or follow an expected trend. However, if jobs start to run longer than expected and/or the number of succeeded, pending, failed, killed, and/or suspended jobs deviates from the expected number or expected trend (which may be considered anomalies), this may indicate that a component in the information management system is failing or failed, configured incorrectly, incompatible with other components in the information management system, and/or the like. Thus, long running jobs or jobs with statuses that deviate from the norm can affect the computing resources provided by the information management system, negatively affecting the performance of other components in the information management system that rely on these computing resources.

In an embodiment, anomaly detection can be performed on deduplication database pruning operations. For example, an archive file may be generated in response to a job being performed (e.g., a backup job) and the archive file may comprise various chunks. Each chunk may store a data block and/or a reference to a data block that was already stored in another chunk (possibly in another archive file). Information about archive files and their corresponding chunks may be stored in a storage manager database. The deduplication database may store or have access to a table that indicates, for a data block, a signature of the data block, an archive file or chunk in which the data block is stored, a reference count of a number of times the data block is referenced by other chunks or archive files, and/or the other chunks or archive files that reference the data block. Generally, to perform pruning of chunks, the deduplication database may receive a list of archive files that are to be deleted, and the deduplication database can update the table to reduce the reference count as appropriate. The chunks of the archive files may not be deleted immediately, however, because the chunks may include data blocks referenced by other chunks. Thus, the deduplication database can then, after updating the table, provide a storage manager of the information management system with a list of archive files that only include data blocks for which the reference count is 0. The storage manager or another component in the information management system system can then delete the chunks of these listed archive files.

In some circumstances, a delay can occur in the transmission of the list of archive files that are to be deleted to the deduplication database, resulting in a backlog of archive file deletion indications that the deduplication database needs to process to update the table. In other circumstances, the deduplication database can be running slowly such that there is a delay in generation of the list of archive files that only include data blocks for which the reference count is 0. Thus, archive files that could otherwise be deleted are not deleted, reducing the amount of available memory space to store other blocks.

Accordingly, the storage manager can store, for various time periods, a count of the number of archive files or chunks that a deduplication database has yet to process to update the table, a count of the number of archive files or chunks identified as only having data blocks for which the reference count is 0, and/or a time since the last list of archive files that only include data blocks for which the reference count is 0 was generated by the deduplication database. The storage manager can retrieve this deduplication pruning information from the deduplication database and implement the anomaly detection and reporting functionality described herein to detect whether there are any anomalous delays in the pruning operations of the deduplication database. In some embodiments, instead of comparing the absolute value of the counts or times over various time periods, the storage manager can determine a difference in the absolute value of the counts or times between time periods, and use the determined differences to detect anomalies and/or generate alerts. In other embodiments, the storage manager uses the absolute value of the counts or times to detect anomalies and/or generate alerts.

The illustrative embodiments include a number of features that detect and raise awareness of anomalies in system operations. Categories of interest include events and job anomalies, such as long-running jobs and job success/failure rates. Anomalies are characterized by frequency anomalies and/or by occurrence counts. Utilization is also of interest for certain key system resources, such as deduplication databases, CPU and memory at the storage manager, etc., without limitation. Predicting low utilization periods for these and other key resources is useful for scheduling maintenance activities without interfering with ordinary data protection jobs.

In some cases, if a component in the information management system that runs jobs (e.g., a media agent) is performing poorly (e.g., jobs start to run longer than expected and/or the number of succeeded, pending, failed, killed, and/or suspended jobs deviates from the expected number or expected trend), then the component can be disabled (e.g., soft state disabled, completely disabled, or otherwise marked as being offline) and future jobs can be routed to an alternate component (e.g., an alternate media agent). For example, a list of media agents to be enabled can be obtained, such as by a storage manager of the information management system. Media agents may be present on the list if the media agents had previously been disabled due to an error or other poor performance. The storage manager can also obtain a list of media agents that have current or pending jobs to which resources (e.g., computing resources) have been allocated. The storage manager can then remove any media agents from the lists that have jobs that are delayed (e.g., long-running or pending longer than expected) for reasons other than those caused by the media agent. For the remaining media agents on both lists, the storage manager can identify a new state for the respective media agent. The new state of a media agent may be the same as the current state of the media agent if, for example, jobs are not running longer than expected, the number of pending jobs does not deviate from an expected number or expected trend, there are no issues with the media agent resource usage, and/or the services of the media agent have not been recycled for at least a threshold period of time.

However, the new state of the media agent may be to restart services if, for example, this is at least the second time services of the media agent are being checked over a threshold period of time and (1) there is an anomaly in the number of failed jobs (e.g., the number of failed jobs deviates from an expected number or expected trend); and/or (2) there is an anomaly in the number of long-running or pending jobs (e.g., the number of long-running or pending jobs deviates from the expected number or expected trend), the job completion rate is down (e.g., the number of succeeded jobs is lower than expected), resource usage by the media agent is increasing at a certain rate, and/or the amount of unused memory available is less than a threshold percentage (e.g., 10%). The new state of the media agent may be a disabled state if, for example, there is an anomaly in the number of long-running or pending jobs (e.g., the number of long-running or pending jobs deviates from the expected number or expected trend), the job completion rate is down (e.g., the number of succeeded jobs is lower than expected), and/or resource usage by the media agent is above a threshold percentage (e.g., 90%) or at a maximum.

Once the new state has been determined for each media agent, the storage manager can change the state of a media agent if the current state of the media agent is different than the new state. However, prior to changing the state, the storage manager can perform a health check on one or more alternate media agents to ensure that the alternate media agent(s) are able to take over for media agents that will be changed to a disabled state. For example, the storage manager can determine the health of an alternate media agent based on the number of pending, failed, and/or long-running jobs. If an alternate media agent is healthy and available to take over for a soon-to-be-disabled media agent, the storage manager can maintain the states of media agents that have a new state equal to a current state and can change the states of media agents that have a new state not equal to a current state to the corresponding new state.

By routing future jobs to an alternate component (e.g., an alternate media agent), the information management system performance may not be degraded by a poorly performing component. Rather, the job success rate of the information management system may be increased and/or the job failure rate of the information management system may decrease.

One aspect of the disclosure provides a networked information management system comprising a client computing device having one or more first hardware processors, where a first type of event occurs on the client computing device. The networked information management system further comprises one or more computing devices in communication with the client computing device, where the one or more computing devices are configured with computer-executable instructions that, when executed, cause the one or more computing devices to: retrieve event data corresponding to the first type of event and the client computing device; perform a time-series decomposition of the event data; analyze a component of the decomposed time-series to determine an acceptable range for a number of occurrences of the first type of event; determine not to expand the acceptable range in response to an indication that a number of alerts generated for the first type of event is less than a threshold; determine that an anomaly exists at a first time in response to a determination that a number of occurrences of the first type of event falls outside the acceptable range; and generate an alert for the detected anomaly.

The networked information management system of the preceding paragraph can include any sub-combination of the following features: where the computer-executable instructions, when executed, further cause the one or more computing devices to perform the time-series decomposition of the event data to form a trend component, a seasonal component, and an error component; where the computer-executable instructions, when executed, further cause the one or more computing devices to analyze the error component to determine the acceptable range for the number of occurrences of the first type of event; where the computer-executable instructions, when executed, further cause the one or more computing devices to determine that a second anomaly exists at the first time in response to a determination that a duration between occurrences of the first type of event falls outside a second acceptable range; where the duration between occurrences of the first type of event is less than a lower extreme of the second acceptable range; where the number of occurrences of the first type of event is greater than an upper limit of the acceptable range; and where the number of occurrences of the first type of event is less than a lower limit of the acceptable range.

Another aspect of the disclosure provides a computer-implemented method comprising: retrieving event data corresponding to a first type of event that occurs on a client computing device; performing a time-series decomposition of the event data; analyzing a component of the decomposed time-series to determine an acceptable range for a number of occurrences of the first type of event; determining not to expand the acceptable range in response to an indication that a number of alerts generated for the first type of event is less than a threshold; determining that an anomaly exists at a first time in response to a determination that a number of occurrences of the first type of event falls outside the acceptable range; and generating an alert for the detected anomaly.

The computer-implemented method of the preceding paragraph can include any sub-combination of the following features: where performing the time-series decomposition further comprises performing the time-series decomposition of the event data to form a trend component, a seasonal component, and an error component; where analyzing a component of the decomposed time-series further comprises analyzing the error component to determine the acceptable range for the number of occurrences of the first type of event; where the computer-implemented method further comprises determining that a second anomaly exists at the first time in response to a determination that a duration between occurrences of the first type of event falls outside a second acceptable range; where the duration between occurrences of the first type of event is less than a lower extreme of the second acceptable range; where the number of occurrences of the first type of event is greater than an upper limit of the acceptable range; and where the number of occurrences of the first type of event is less than a lower limit of the acceptable range.

Another aspect of the disclosure provides non-transitory computer-readable medium storing instructions, which when executed by one or more computing devices, cause the one or more computing devices to perform a method comprising: retrieving event data corresponding to a first type of event that occurs on a client computing device; performing a time-series decomposition of the event data; analyzing a component of the decomposed time-series to determine an acceptable range for a number of occurrences of the first type of event; determining not to expand the acceptable range in response to an indication that a number of alerts generated for the first type of event is less than a threshold; determining that an anomaly exists at a first time in response to a determination that a number of occurrences of the first type of event falls outside the acceptable range; and generating an alert for the detected anomaly.

The non-transitory computer-readable medium of the preceding paragraph can include any sub-combination of the following features: where the method further comprises performing the time-series decomposition of the event data to form a trend component, a seasonal component, and an error component; where the method further comprises analyzing the error component to determine the acceptable range for the number of occurrences of the first type of event; where the method further comprises determining that a second anomaly exists at the first time in response to a determination that a duration between occurrences of the first type of event falls outside a second acceptable range; where the duration between occurrences of the first type of event is less than a lower extreme of the second acceptable range; and where the number of occurrences of the first type of event is greater than an upper limit of the acceptable range.

Another aspect of the disclosure provides a networked information management system comprising a client computing device having one or more first hardware processors, where the client computing device is associated with a first job. The networked information management system further comprises one or more computing devices in communication with the client computing device, where the one or more computing devices are configured with computer-executable instructions that, when executed, cause the one or more computing devices to: retrieve jobs data corresponding to the first job and the first client computing device; perform a time-series decomposition of the jobs data; analyze a component of the decomposed time-series to determine at least one of an acceptable range for time to perform the first job, an acceptable range for a size of secondary copy data associated with the first job, or an acceptable range for a number of job attempts until the first job is complete; determine a possible cause for the first job running longer than the acceptable range for time to perform the first job in response to the first job at a first time running longer than the acceptable range for time to perform the first job; determine whether any events corresponding to the first job are anomalous; and generate an alert in response to at least one of the first job running longer or a first event corresponding to the first job being anomalous.

Another aspect of the disclosure provides a computer-implemented method comprising: retrieving jobs data corresponding to a first job and a first client computing device; performing a time-series decomposition of the jobs data; analyzing a component of the decomposed time-series to determine at least one of an acceptable range for time to perform the first job, an acceptable range for a size of secondary copy data associated with the first job, or an acceptable range for a number of job attempts until the first job is complete; determining a possible cause for the first job running longer than the acceptable range for time to perform the first job in response to the first job at a first time running longer than the acceptable range for time to perform the first job; determining whether any events corresponding to the first job are anomalous; and generating an alert in response to at least one of the first job running longer or a first event corresponding to the first job being anomalous.

Another aspect of the disclosure provides a non-transitory computer-readable medium storing instructions, which when executed by one or more computing devices, cause the one or more computing devices to perform a method comprising: retrieving jobs data corresponding to a first job and a first client computing device; performing a time-series decomposition of the jobs data; analyzing a component of the decomposed time-series to determine at least one of an acceptable range for time to perform the first job, an acceptable range for a size of secondary copy data associated with the first job, or an acceptable range for a number of job attempts until the first job is complete; determining a possible cause for the first job running longer than the acceptable range for time to perform the first job in response to the first job at a first time running longer than the acceptable range for time to perform the first job; determining whether any events corresponding to the first job are anomalous; and generating an alert in response to at least one of the first job running longer or a first event corresponding to the first job being anomalous.

Another aspect of the disclosure provides a networked information management system comprising one or more client computing devices each having one or more first hardware processors, where the one or more client computing devices are associated with a plurality of jobs. The networked information management system further comprises one or more computing devices in communication with the client computing device, where the one or more computing devices are configured with computer-executable instructions that, when executed, cause the one or more computing devices to: retrieve jobs data corresponding to the plurality of jobs; perform a time-series decomposition of the jobs data; analyze a component of the decomposed time-series to determine at least one of an acceptable range for succeeded jobs in the plurality of jobs, an acceptable range for failed jobs in the plurality of jobs, an acceptable range for killed jobs in the plurality of jobs, an acceptable range for suspended jobs in the plurality of jobs, or an acceptable range for pending jobs in the plurality of jobs; determine a possible cause for at least one of the succeeded jobs, the failed jobs, the killed jobs, the suspended jobs, or the pending jobs falling outside the respective acceptable range; generate a graph corresponding to a number of succeeded jobs, failed jobs, killed jobs, suspended jobs, and pending jobs; and generate an alert indicating an anomalous status of at least one of the succeeded jobs, the failed jobs, the killed jobs, the suspended jobs, or the pending jobs, where the alert includes the generated graph.

Another aspect of the disclosure provides a computer-implemented method comprising: retrieving jobs data corresponding to a plurality of jobs; performing a time-series decomposition of the jobs data; analyzing a component of the decomposed time-series to determine at least one of an acceptable range for succeeded jobs in the plurality of jobs, an acceptable range for failed jobs in the plurality of jobs, an acceptable range for killed jobs in the plurality of jobs, an acceptable range for suspended jobs in the plurality of jobs, or an acceptable range for pending jobs in the plurality of jobs; determining a possible cause for at least one of the succeeded jobs, the failed jobs, the killed jobs, the suspended jobs, or the pending jobs falling outside the respective acceptable range; generating a graph corresponding to a number of succeeded jobs, failed jobs, killed jobs, suspended jobs, and pending jobs; and generating an alert indicating an anomalous status of at least one of the succeeded jobs, the failed jobs, the killed jobs, the suspended jobs, or the pending jobs, where the alert includes the generated graph.

Another aspect of the disclosure provides a non-transitory computer-readable medium storing instructions, which when executed by one or more computing devices, cause the one or more computing devices to perform a method comprising: retrieving jobs data corresponding to a plurality of jobs; performing a time-series decomposition of the jobs data; analyzing a component of the decomposed time-series to determine at least one of an acceptable range for succeeded jobs in the plurality of jobs, an acceptable range for failed jobs in the plurality of jobs, an acceptable range for killed jobs in the plurality of jobs, or an acceptable range for pending jobs in the plurality of jobs; determining a possible cause for at least one of the succeeded jobs, the failed jobs, the killed jobs, the suspended jobs, or the pending jobs falling outside the respective acceptable range; generating a graph corresponding to a number of succeeded jobs, failed jobs, killed jobs, suspended jobs, and pending jobs; and generating an alert indicating an anomalous status of at least one of the succeeded jobs, the failed jobs, the killed jobs, the suspended jobs, or the pending jobs, where the alert includes the generated graph.

Another aspect of the disclosure provides a networked information management system comprising a deduplication database. The networked information management system further comprises one or more computing devices in communication with the deduplication database, where the one or more computing devices are configured with computer-executable instructions that, when executed, cause the one or more computing devices to: retrieve deduplication pruning information associated with the deduplication database; perform a time-series decomposition of the deduplication pruning information; analyze a component of the decomposed time-series to determine an acceptable range for a time to process archive files to be deleted; determine that an anomaly exists at a first time in response to a determination that a time to process archive files to be deleted at the first time falls outside the acceptable range; and generate an alert for the detected anomaly.

The networked information management system of the preceding paragraph can include any sub-combination of the following features: where the computer-executable instructions, when executed, further cause the one or more computing devices to perform the time-series decomposition of the deduplication pruning information to form a trend component, a seasonal component, and an error component; where the computer-executable instructions, when executed, further cause the one or more computing devices to analyze the error component to determine the acceptable range for the time to process archive files to be deleted; where the computer-executable instructions, when executed, further cause the one or more computing devices to analyze the component of the decomposed time-series to determine a second acceptable range for a time to generate a list of archive files to delete; where the acceptable range comprises one or an absolute time value or a delta time value; where the time to process archive files to be deleted at the first time is greater than an upper limit of the acceptable range; where the time to process archive files to be deleted at the first time is less than a lower limit of the acceptable range; where the computer-executable instructions, when executed, further cause the one or more computing devices to generate a graph indicating the anomaly for display in a user interface rendered by a client computing device; where the computer-executable instructions, when executed, further cause the one or more computing devices to determine a possible cause of the anomaly in response to the determination that the anomaly exists; where the computer-executable instructions, when executed, further cause the one or more computing devices to determine a possible solution to resolve the anomaly based on the determined possible cause; and where the deduplication pruning information comprises at least one of a count of a number of archive files that the deduplication database has yet to process to update a table, a count of a number of archive files identified as only having data blocks for which a reference count is zero, or a time since a last list of archive files that only include data blocks for which the reference count is zero was generated by the deduplication database.

Another aspect of the disclosure provides a computer-implemented method comprising: retrieving deduplication pruning information associated with a deduplication database; performing a time-series decomposition of the deduplication pruning information; analyzing a component of the decomposed time-series to determine an acceptable range for a time to process archive files to be deleted; determining that an anomaly exists at a first time in response to a determination that a time to process archive files to be deleted at the first time falls outside the acceptable range; and generating an alert for the detected anomaly.

The computer-implemented method of the preceding paragraph can include any sub-combination of the following features: where performing a time-series decomposition further comprises performing the time-series decomposition of the deduplication pruning information to form a trend component, a seasonal component, and an error component; where analyzing a component of the decomposed time-series further comprises analyzing the error component to determine the acceptable range for the time to process archive files to be deleted; where the computer-implemented method further comprises analyzing the component of the decomposed time-series to determine a second acceptable range for a time to generate a list of archive files to delete; where the acceptable range comprises one or an absolute time value or a delta time value; where the time to process archive files to be deleted at the first time is greater than an upper limit of the acceptable range; where the time to process archive files to be deleted at the first time is less than a lower limit of the acceptable range; where the computer-implemented method further comprises determining a possible cause of the anomaly in response to the determination that the anomaly exists, and determining a possible solution to resolve the anomaly based on the determined possible cause; and where the deduplication pruning information comprises at least one of a count of a number of archive files that the deduplication database has yet to process to update a table, a count of a number of archive files identified as only having data blocks for which a reference count is zero, or a time since a last list of archive files that only include data blocks for which the reference count is zero was generated by the deduplication database.

Another aspect of the disclosure provides a networked information management system comprising a first secondary storage computing device. The networked information management system further comprises one or more computing devices in communication with the secondary storage computing device, where the one or more computing devices are configured with computer-executable instructions that, when executed, cause the one or more computing devices to: determine that the first secondary storage computing device has computing resources allocated to a current job; identify a new state for the first secondary storage computing device based at least in part on the current job, where the new state is a disabled state; determine that at least one alternate secondary storage computing device associated with the first secondary storage computing device is healthy; and disable the first secondary storage computing device.

The networked information management system of the preceding paragraph can include any sub-combination of the following features: where the computer-executable instructions, when executed, further cause the one or more computing devices to obtain a list of secondary storage computing devices to be enabled; where the computer-executable instructions, when executed, further cause the one or more computing devices to: identify a second new state for a second secondary storage computing device present on the list, remove the second secondary storage computing device from the list in response to the identification of the new state, and set the second secondary storage computing device to the second new state; where the computer-executable instructions, when executed, further cause the one or more computing devices to: monitor jobs of the first secondary storage computing device, determine that a number of failed jobs of the first secondary storage computing device is anomalous, determine that services of the first secondary storage computing device were refreshed within a threshold period of time of the determination that the number of failed jobs of the first secondary storage computing device is anomalous, and set the new state of the first secondary storage computing device to be the disable state; where the computer-executable instructions, when executed, further cause the one or more computing devices to: monitor jobs of the first secondary storage computing device, determine that a number of failed jobs of the first secondary storage computing device is not anomalous, determine that a number of long running or pending jobs is anomalous, determine that a job completion rate of the first secondary storage computing device has fallen from a first level to a second level below the first level, determine that an amount of computing resources used by the first secondary storage computing device is above a threshold value, and set the new state of the first secondary storage computing device to be the disable state; where the computer-executable instructions, when executed, further cause the one or more computing devices to train a neural network that outputs the threshold value; where the computer-executable instructions, when executed, further cause the one or more computing devices to: obtain a list of alternate secondary storage computing devices associated with the first secondary storage computing device, for each alternate secondary storage computing device in the list, identify a number of pending jobs, failed jobs, and long running jobs, and determine that, for the at least one alternate secondary storage computing device, the number of pending jobs, failed jobs, and long running jobs is below a threshold value; where the computer-executable instructions, when executed, further cause the one or more computing devices to route future jobs to the at least one alternate secondary storage computing device instead of to the first secondary storage computing device; where the computer-executable instructions, when executed, further cause the one or more computing devices to place the first secondary storage computing device on a list of secondary storage computing devices to enable in response to services of the first secondary storage computing device not being restarted within a threshold period of time; where the computer-executable instructions, when executed, further cause the one or more computing devices to re-enable the first secondary storage computing device after placing the first secondary storage computing device on the list of secondary storage computing devices to enable; and where the computer-executable instructions, when executed, further cause the one or more computing devices to route future jobs to the first secondary storage computing device instead of the at least one alternate storage computing device after re-enabling the first secondary storage computing device.

Another aspect of the disclosure provides a computer-implemented method comprising: determining, by a storage manager in a networked information management system, that a first secondary storage computing device in the networked information management system has computing resources allocated to a current job; identifying a new state for the first secondary storage computing device based at least in part on the current job, where the new state is a disabled state; determining that at least one alternate secondary storage computing device associated with the first secondary storage computing device is healthy; and disabling the first secondary storage computing device.

The computer-implemented method of the preceding paragraph can include any sub-combination of the following features: where the computer-implemented method further comprises obtaining a list of secondary storage computing devices to be enabled; where the computer-implemented method further comprises: identifying a second new state for a second secondary storage computing device present on the list, removing the second secondary storage computing device from the list in response to the identification of the new state, and setting the second secondary storage computing device to the second new state; where identifying a new state for the first secondary storage computing device further comprises: monitoring jobs of the first secondary storage computing device, determining that a number of failed jobs of the first secondary storage computing device is anomalous, determining that services of the first secondary storage computing device were refreshed within a threshold period of time of the determination that the number of failed jobs of the first secondary storage computing device is anomalous, and setting the new state of the first secondary storage computing device to be the disable state; where identifying a new state for the first secondary storage computing device further comprises: monitoring jobs of the first secondary storage computing device, determining that a number of failed jobs of the first secondary storage computing device is not anomalous, determining that a number of long running or pending jobs is anomalous, determining that a job completion rate of the first secondary storage computing device has fallen from a first level to a second level below the first level, determining that an amount of computing resources used by the first secondary storage computing device is above a threshold value, and setting the new state of the first secondary storage computing device to be the disable state; where the computer-implemented method further comprises training a neural network that outputs the threshold value; where determining that at least one alternate secondary storage computing device associated with the first secondary storage computing device is healthy further comprises: obtaining a list of alternate secondary storage computing devices associated with the first secondary storage computing device, for each alternate secondary storage computing device in the list, identifying a number of pending jobs, failed jobs, and long running jobs, and determining that, for the at least one alternate secondary storage computing device, the number of pending jobs, failed jobs, and long running jobs is below a threshold value; where the computer-implemented method further comprises routing future jobs to the at least one alternate secondary storage computing device instead of to the first secondary storage computing device; where the computer-implemented method further comprises placing the first secondary storage computing device on a list of secondary storage computing devices to enable in response to services of the first secondary storage computing device not being restarted within a threshold period of time.

BRIEF DESCRIPTION OF THE DRAWINGS

FIG. 1B is a detailed view of a primary storage device, a secondary storage device, and some examples of primary data and secondary copy data.

FIGS. 10A-10B depict a graphical user interface showing an anomaly notification or alert, according to an embodiment.

FIG. 11A depicts another graphical user interface showing an anomaly notification or alert, according to an embodiment.

FIG. 11B depicts another graphical user interface showing an anomaly notification or alert, according to an embodiment.

FIG. 12 depicts another graphical user interface showing an anomaly notification or alert, according to an embodiment.

DETAILED DESCRIPTION

Figure 1A:
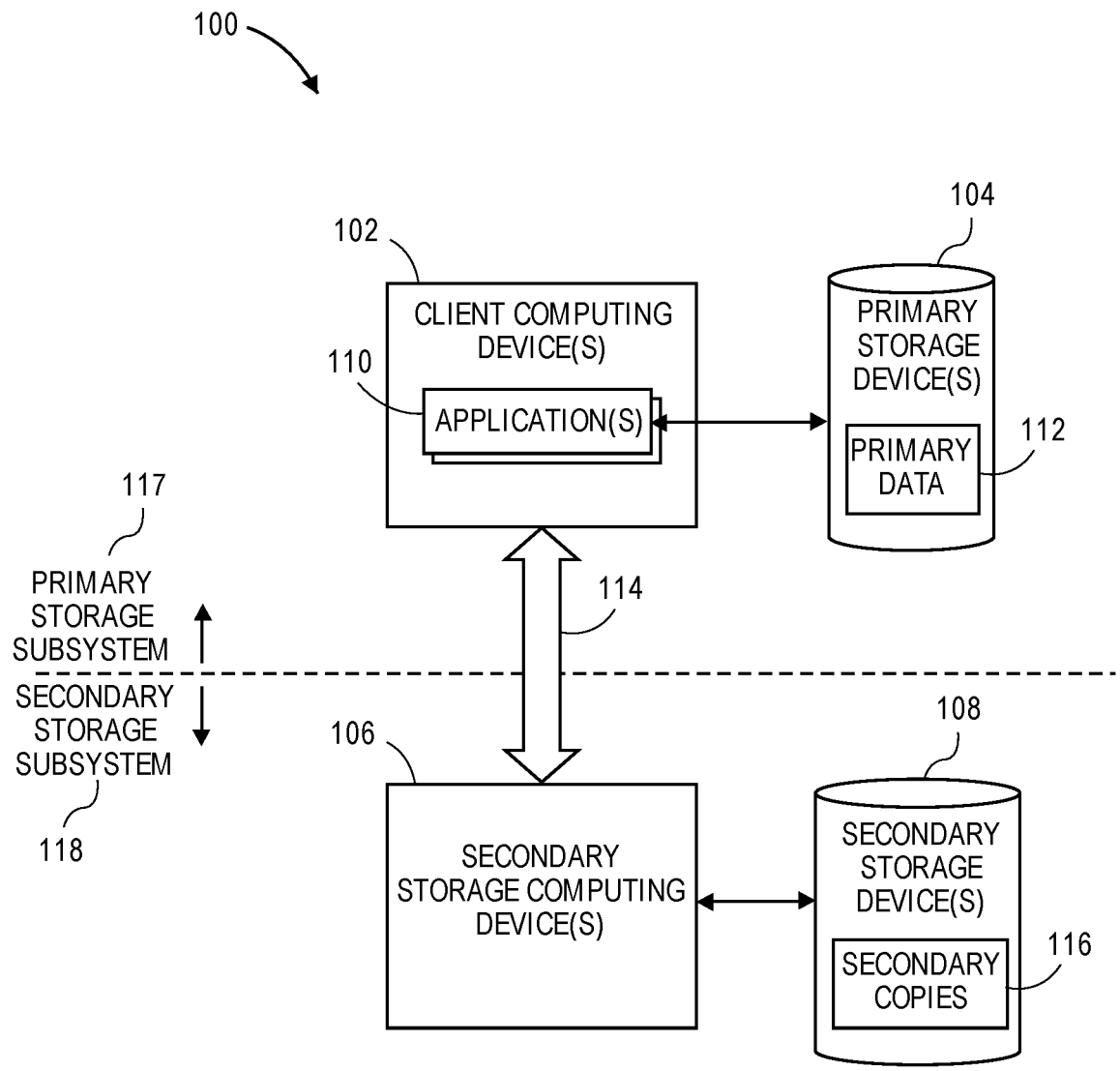
FIG. 1A is a block diagram illustrating an exemplary information management system.

Described herein are techniques for better understanding problems arising in an illustrative information management system, such as a data storage management system, and for issuing appropriate alerts and reporting to data management professionals. For example, an information management system can track various events (e.g., user log ins, user log outs, user changes a setting, the start of a secondary copy operation, completion of a secondary copy operation, failure of a secondary copy operation, service starts, service restarts, service closes, etc.) that occur with respect to components of the information management system, job status (e.g., the status of secondary copy operations, such as backup operations, snapshot operations, archive operations, etc.), and/or the like. In some cases, events occur at regular intervals and/or according to an expected trend. However, if the number of occurrences of an event and/or the duration of time between an event deviates from the regular interval or expected trend (which may be considered an anomaly), this may indicate that a component in the information management system is failing or failed, configured incorrectly, incompatible with other components in the information management system, and/or the like. In such situations, computing resources (e.g., processing power, memory usage, etc.) provided by the information management system may be overutilized to compensate for the issue, negatively affecting the performance of other components in the information management system that rely on these computing resources.

Similarly, during a specific seasonal period of time (e.g., hourly, daily, weekly, monthly, etc.), the time for a job to complete and the number of jobs running in an information management system that have succeeded, are pending, have failed, have been killed, and/or are suspended may be consistent and/or follow an expected trend. However, if jobs start to run longer than expected and/or the number of succeeded, pending, failed, killed, and/or suspended jobs deviates from the expected number or expected trend (which may be considered anomalies), this may indicate that a component in the information management system is failing or failed, configured incorrectly, incompatible with other components in the information management system, and/or the like. Thus, long running jobs or jobs with statuses that deviate from the norm can affect the computing resources provided by the information management system, negatively affecting the performance of other components in the information management system that rely on these computing resources.

The illustrative embodiments include a number of features that detect and raise awareness of anomalies in system operations. Categories of interest include events and job anomalies, such as long-running jobs and job success/failure rates. Anomalies are characterized by frequency anomalies and/or by occurrence counts. Utilization is also of interest for certain key system resources, such as deduplication databases, CPU and memory at the storage manager, etc., without limitation. Predicting low utilization periods for these and other key resources is useful for scheduling maintenance activities without interfering with ordinary data protection jobs.

In some cases, if a component in the information management system that runs jobs (e.g., a media agent) is performing poorly (e.g., jobs start to run longer than expected and/or the number of succeeded, pending, failed, killed, and/or suspended jobs deviates from the expected number or expected trend), then the component can be disabled (e.g., soft state disabled, completely disabled, or otherwise marked as being offline) and future jobs can be routed to an alternate component (e.g., an alternate media agent). For example, a list of media agents to be enabled can be obtained, such as by a storage manager of the information management system. Media agents may be present on the list if the media agents had previously been disabled due to an error or other poor performance. The storage manager can also obtain a list of media agents that have current or pending jobs to which resources have been allocated. The storage manager can then remove any media agents from the lists that have jobs that are delayed (e.g., long-running or pending longer than expected) for reasons other than those caused by the media agent. For the remaining media agents on both lists, the storage manager can identify a new state for the respective media agent. The new state of a media agent may be the same as the current state of the media agent if, for example, jobs are not running longer than expected, the number of pending jobs does not deviate from an expected number or expected trend, there are no issues with the media agent resource usage, and/or the services of the media agent have not been recycled for at least a threshold period of time.

However, the new state of the media agent may be to restart services if, for example, this is at least the second time services of the media agent are being checked over a threshold period of time and (1) there is an anomaly in the number of failed jobs (e.g., the number of failed jobs deviates from an expected number or expected trend); and/or (2) there is an anomaly in the number of long-running or pending jobs (e.g., the number of long-running or pending jobs deviates from the expected number or expected trend), the job completion rate is down (e.g., the number of succeeded jobs is lower than expected), resource usage by the media agent is increasing at a certain rate, and/or the amount of unused memory available is less than a threshold percentage (e.g., 10%). The new state of the media agent may be a disabled state if, for example, there is an anomaly in the number of long-running or pending jobs (e.g., the number of long-running or pending jobs deviates from the expected number or expected trend), the job completion rate is down (e.g., the number of succeeded jobs is lower than expected), and/or resource usage by the media agent is above a threshold percentage (e.g., 90%) or at a maximum.

Once the new state has been determined for each media agent, the storage manager can change the state of a media agent if the current state of the media agent is different than the new state. However, prior to changing the state, the storage manager can perform a health check on one or more alternate media agents to ensure that the alternate media agent(s) are able to take over for media agents that will be changed to a disabled state. For example, the storage manager can determine the health of an alternate media agent based on the number of pending, failed, and/or long-running jobs. If an alternate media agent is healthy and available to take over for a soon-to-be-disabled media agent, the storage manager can maintain the states of media agents that have a new state equal to a current state and can change the states of media agents that have a new state not equal to a current state to the corresponding new state.

By routing future jobs to an alternate component (e.g., an alternate media agent), the information management system performance may not be degraded by a poorly performing component. Rather, the job success rate of the information management system may be increased and/or the job failure rate of the information management system may decrease.

Detailed descriptions and examples of systems and methods according to one or more embodiments may be found in the sections entitled Anomaly Detection and Reporting, Anomaly Detection of Deduplication Pruning Operations, and Automated Media Agent State Management, as well as in the section entitled Example Embodiments, and also in FIGS. 3 through 21 herein. Furthermore, components and functionality for the anomaly detection and reporting may be configured and/or incorporated into information management systems such as those described herein in FIGS. 1A-1H and 2A-2C.

Various embodiments described herein are intimately tied to, enabled by, and would not exist except for, computer technology. For example, the anomaly detection and reporting and the automated media agent state management described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Patent Application Pub. No. 2006/0224846, entitled "System and Method to Support Single Instance Storage Operations";

U.S. Patent Application Pub. No. 2014/0201170, entitled "High Availability Distributed Deduplicated Storage System";

U.S. Patent Application Pub. No. 2016/0350391, entitled "Replication Using Deduplicated Secondary Copy Data";

U.S. Patent Application Pub. No. 2017/0168903 entitled "Live Synchronization and Management of Virtual Machines across Computing and Virtualization Platforms and Using Live Synchronization to Support Disaster Recovery";

U.S. Patent Application Pub. No. 2017/0193003 entitled "Redundant and Robust Distributed Deduplication Data Storage System";

U.S. Patent Application Pub. No. 2017/0235647 entitled "Data Protection Operations Based on Network Path Information";

U.S. Patent Application Pub. No. 2017/0242871, entitled "Data Restoration Operations Based on Network Path Information"; and U.S. Patent Application Pub. No. 2017/0185488, entitled "Application-Level Live Synchronization Across Computing Platforms Including Synchronizing Co-Resident Applications To Disparate Standby Destinations And Selectively Synchronizing Some Applications And Not Others".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, Calif.; Microsoft Virtual Server and Microsoft Windows Server Hyper-V, both by Microsoft Corporation of Redmond, Wash.; Sun xVM by Oracle America Inc. of Santa Clara, Calif.; and Xen by Citrix Systems, Santa Clara, Calif. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, DNA/RNA-based memory technology, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
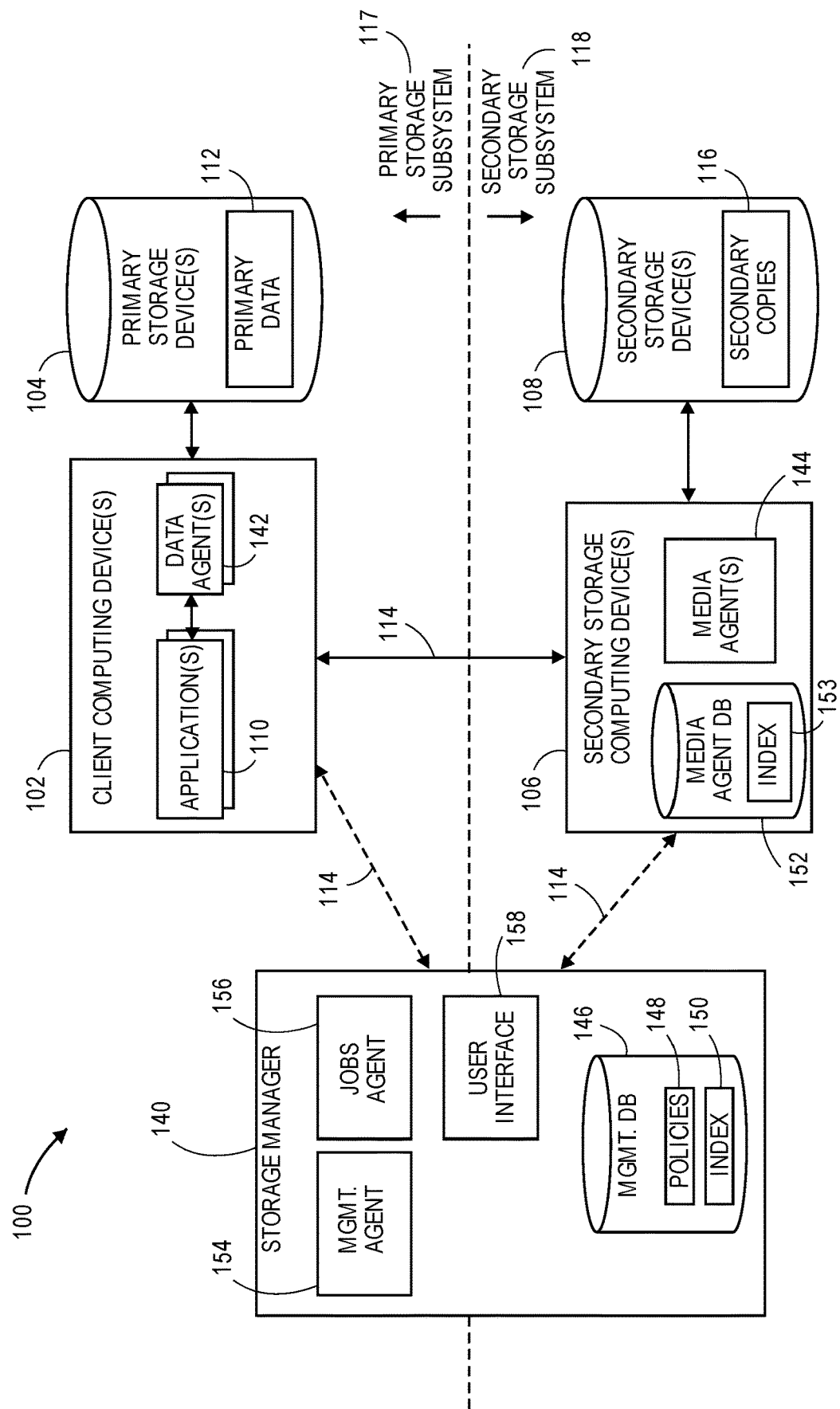
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s)

108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell.

A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
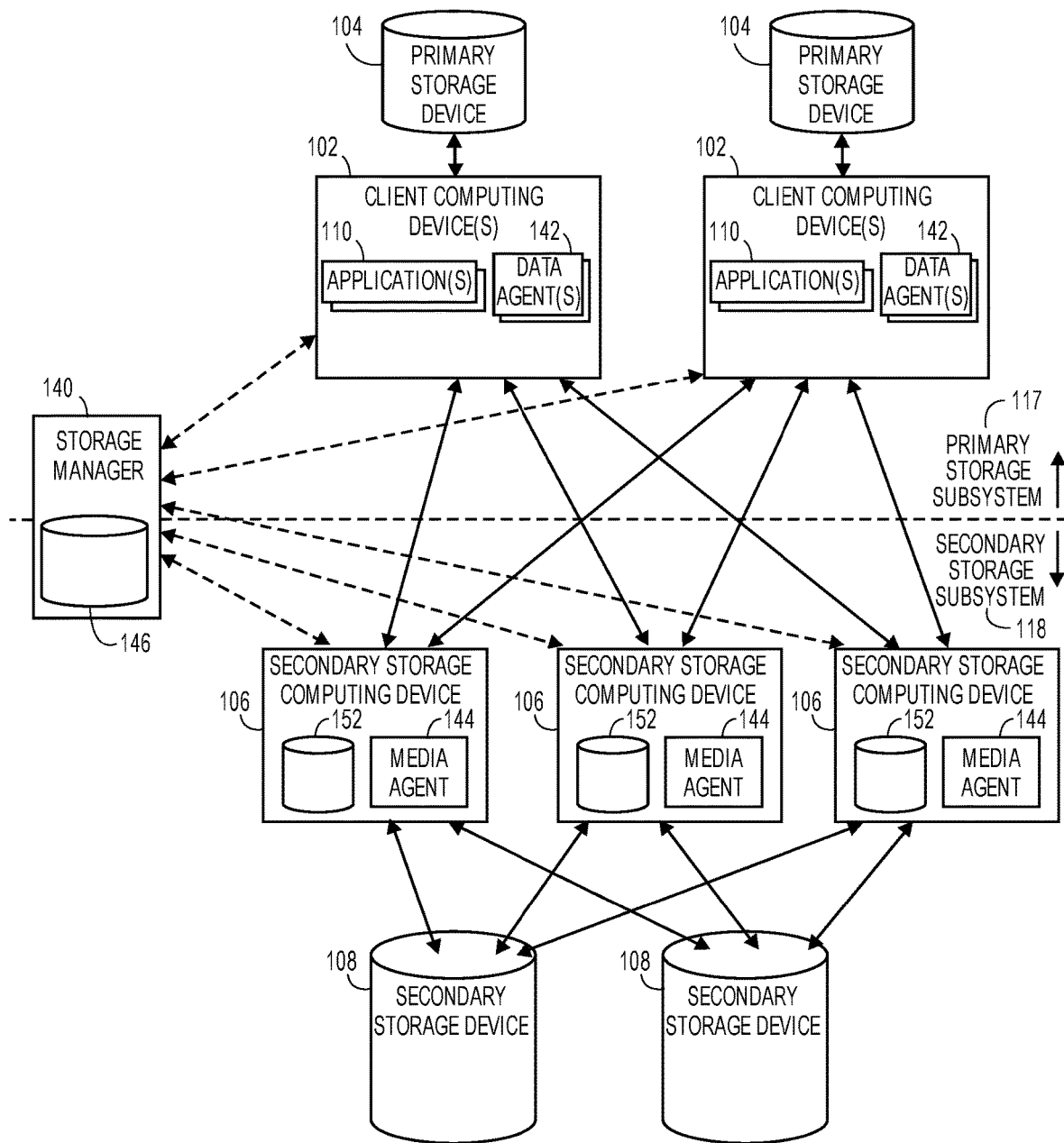
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
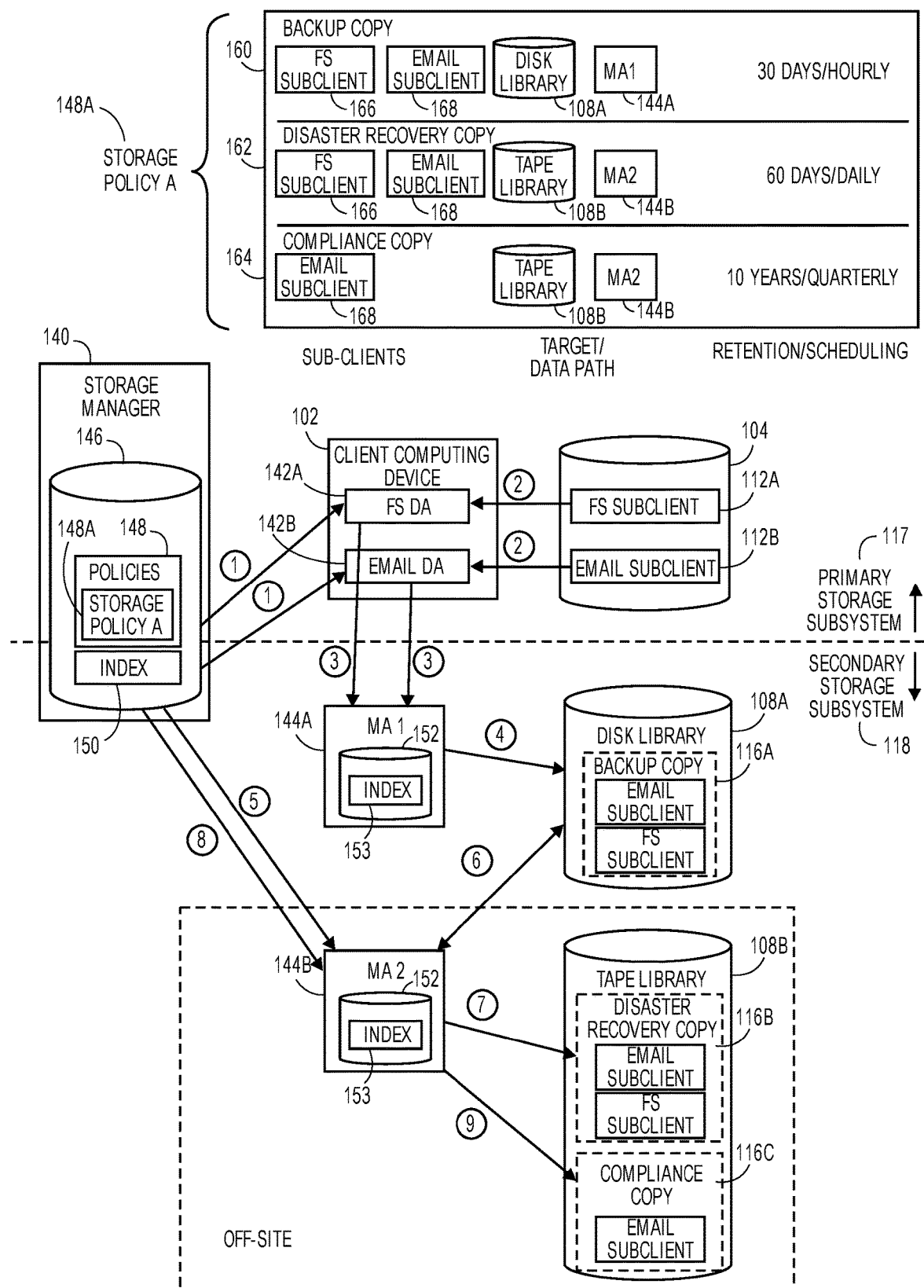
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. This includes steps 5-7 occurring daily for creating disaster recovery copy 116B. By way of illustrating the scalable aspects and off-loading principles embedded in system 100, disaster recovery copy 116B is based on backup copy 116A and not on primary data 112A and 112B.

At step 6, based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
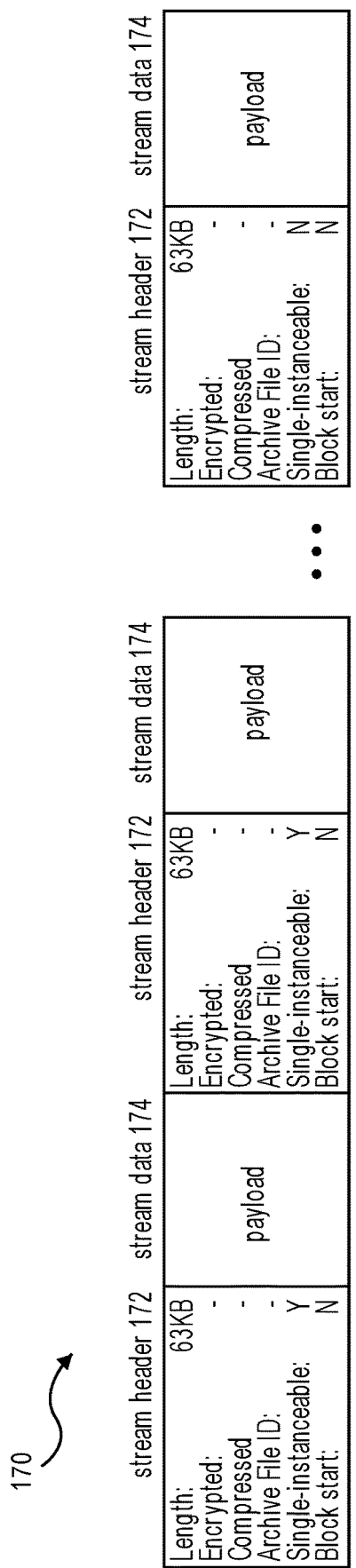
FIGS. 1F-1H are block diagrams illustrating suitable data structures that may be employed by the information management system.
Figure 1G:
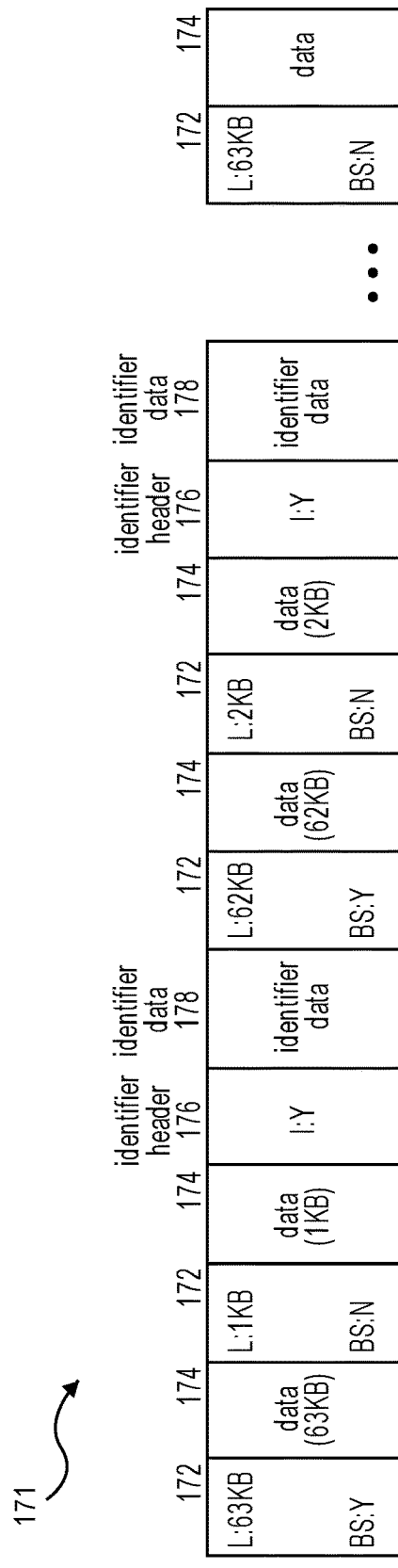

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
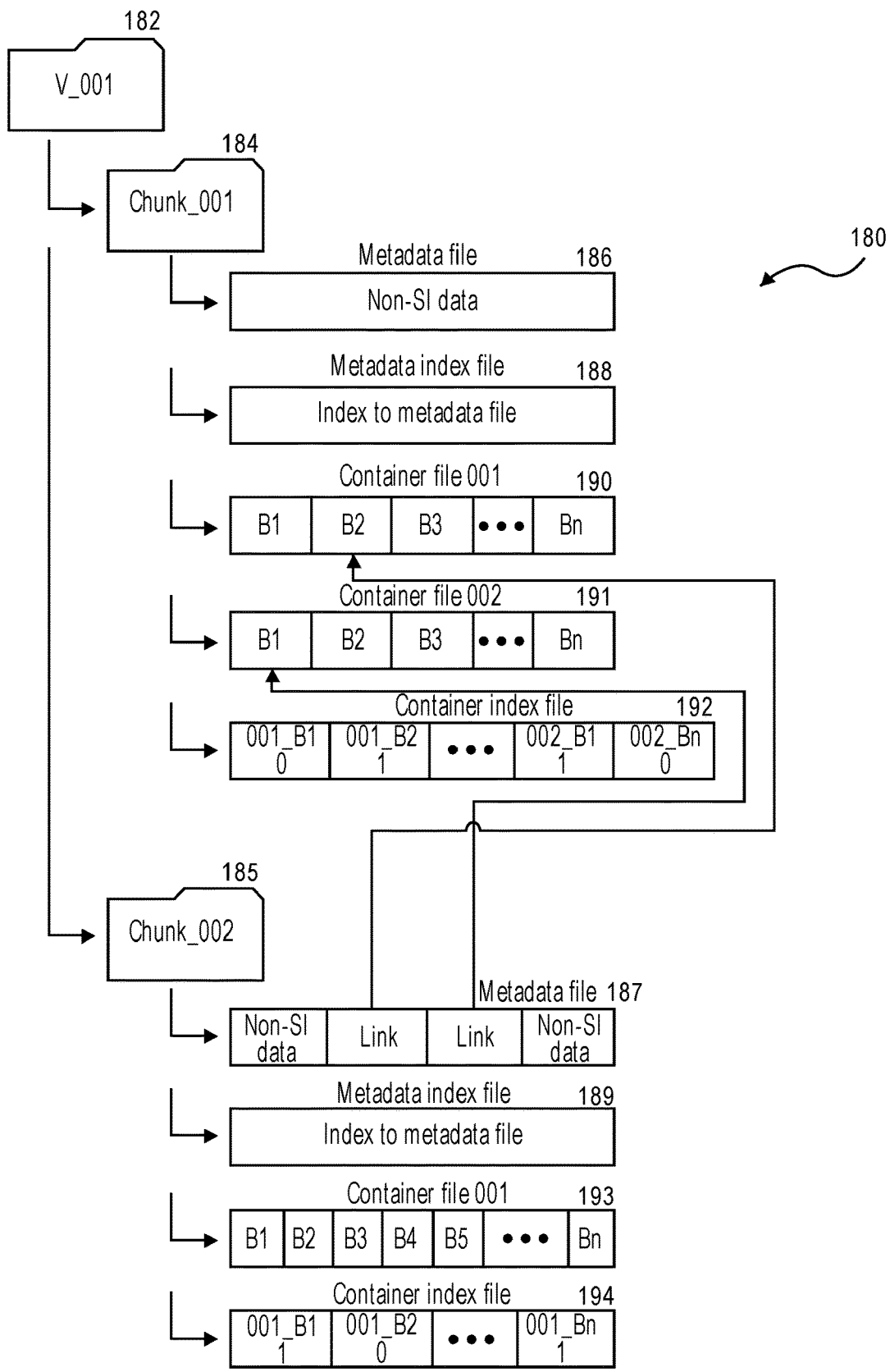

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
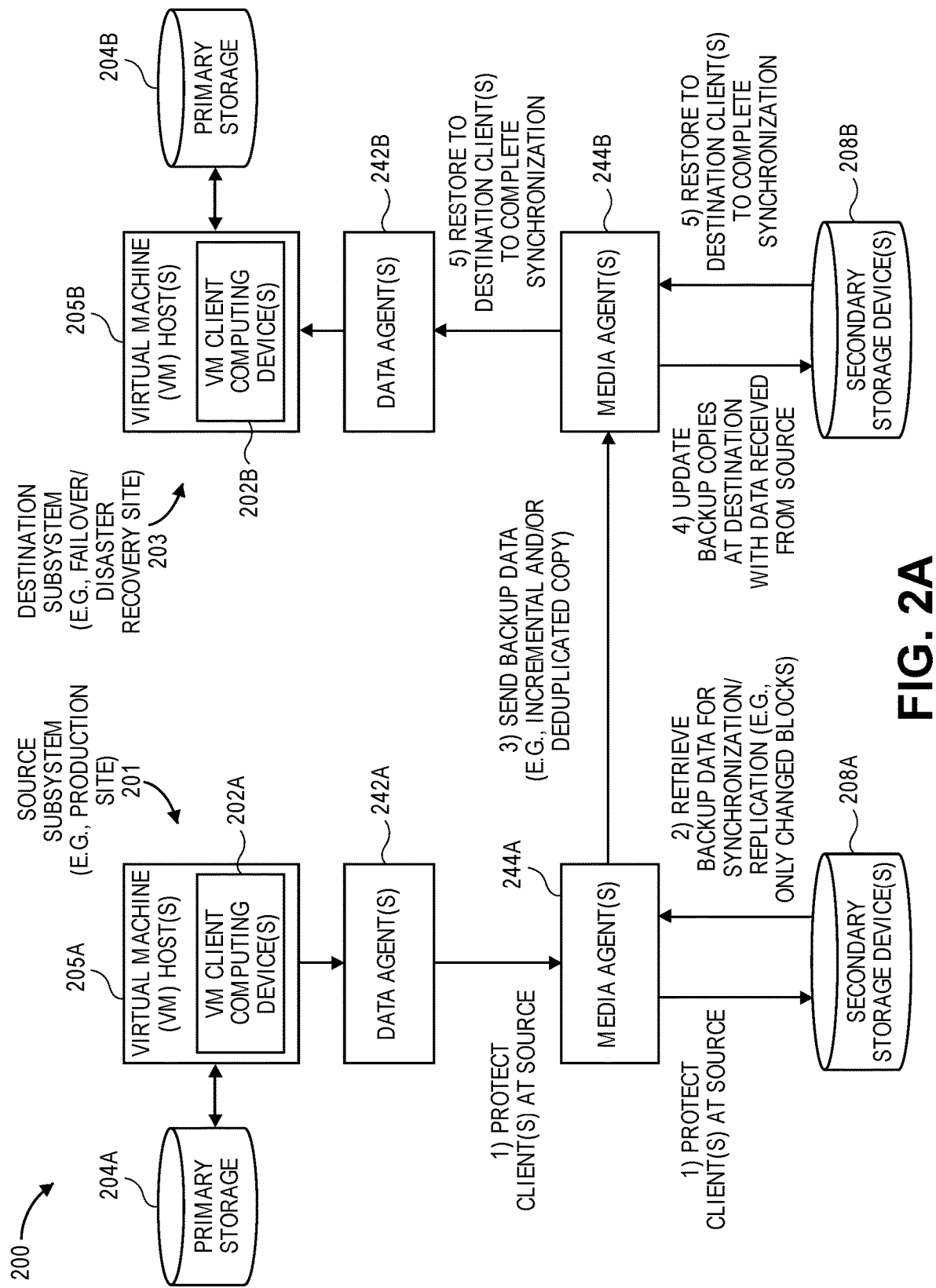
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
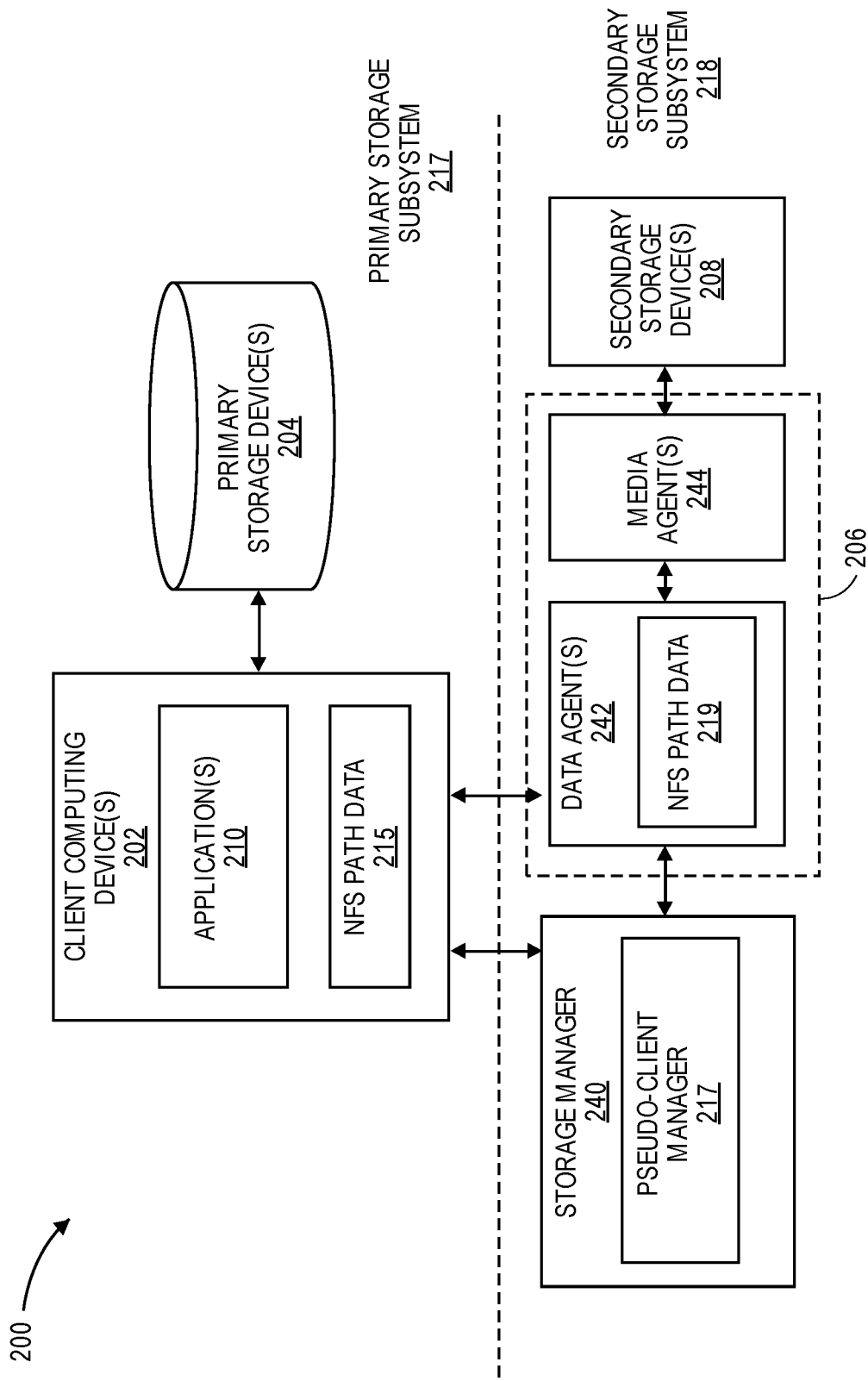
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
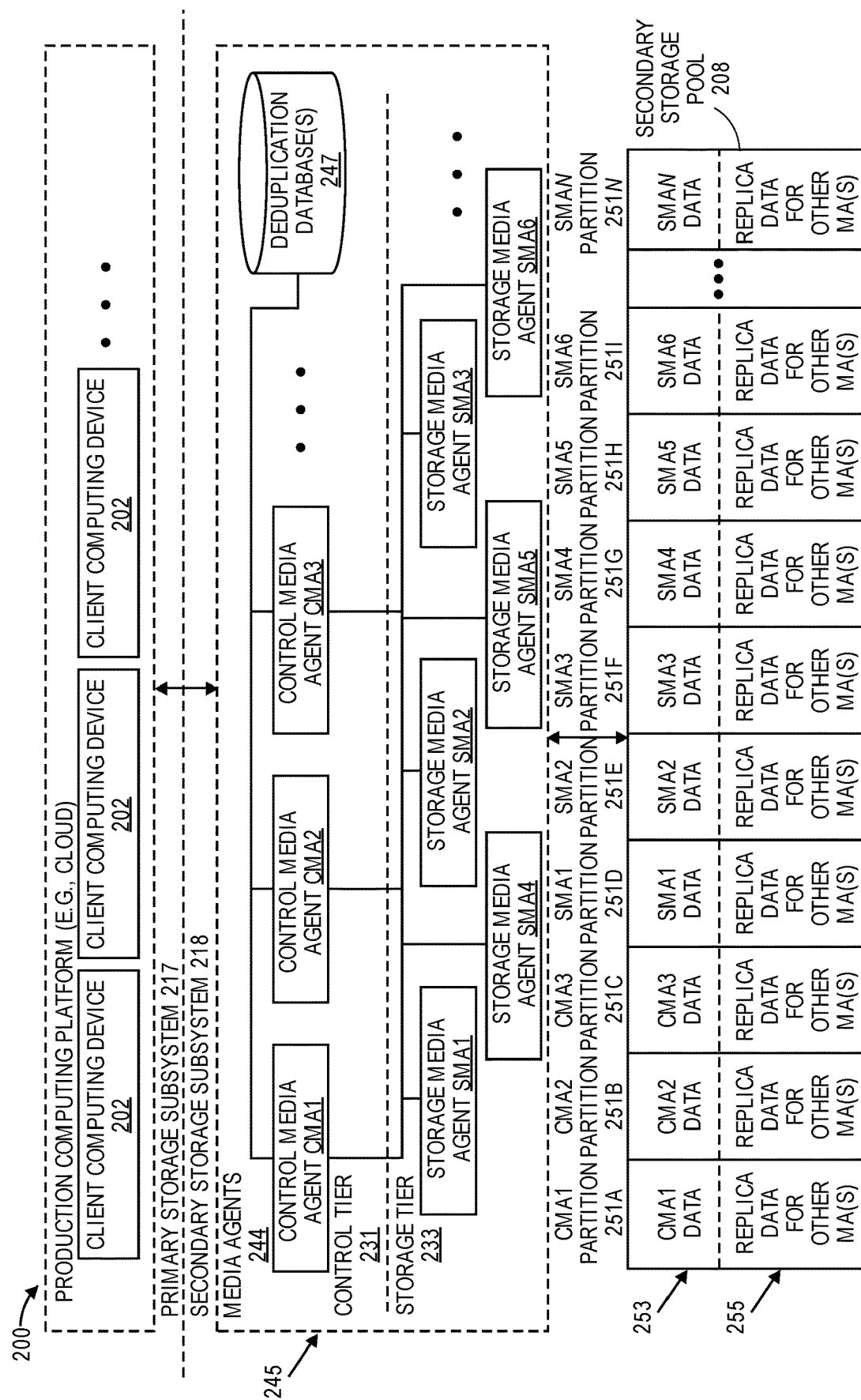
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Anomaly Detection and Reporting

Figure 3:
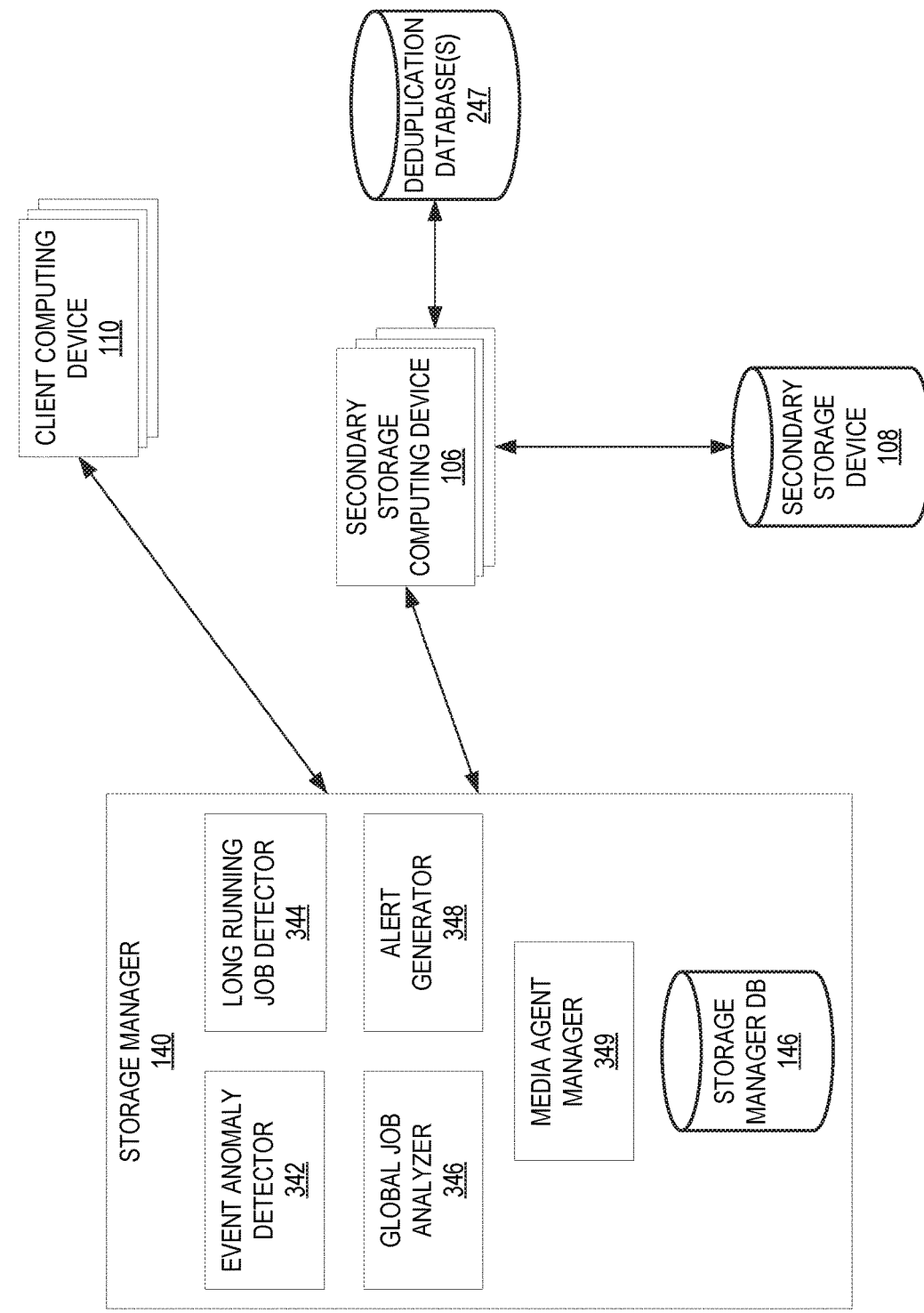
FIG. 3 is a block diagram illustrating some salient portions of a system for detecting and reporting anomalies in the occurrence of events, the length of jobs, and/or the status of jobs, according to an embodiment.

FIG. 3 is a block diagram illustrating some salient portions of a system 300 for detecting and reporting anomalies in the occurrence of events, the length of jobs, and/or the status of jobs, according to an embodiment. For example, the storage manager 140 can be configured to perform the anomaly detection and reporting.

As described herein, the storage manager 140 includes the storage manager database 146, which can store event data and/or jobs data. For example, event data can include, for a particular client computing device 110, a history of events that have occurred on the respective client computing device 110, such as the type of event, a date on which the event occurred, a time or time period (e.g., the hour, day, week, etc.) during which the event occurred, and the number of occurrences of the event during the time or time period. As an illustrative embodiment, the storage manager database 146 can store, for a particular client computing device 110, event data aggregated over 1 hour periods such that the event data indicates the number of times a particular event occurs during 1 hour intervals. Alternatively, the event data can be stored locally on client computing devices 110 instead of or in addition to in the storage manager database 146. For example, a client computing device 110 can store event data corresponding to the client computing device 110 locally, and the storage manager can retrieve the event data stored on the client computing device(s) 110.

Jobs data can include, for some or all of the client computing devices 110 during a particular time or time period, job status information (e.g., a number of jobs run by the client computing device(s) 110 that have succeeded, that have failed, that have been killed (e.g., by a user or administrator), that are pending (e.g., because the jobs have yet to be completed, the jobs are waiting for system resources, such as disks or processing threads, to become available, etc.), and/or that are suspended (e.g., by a user or administrator)), and/or lengths of time for jobs to complete. As an illustrative embodiment, the storage manager database 146 can store, for some or all of the client computing devices 110, a number of jobs run by the client computing device(s) 110 that have succeeded, that have failed, that have been killed, that are pending, and/or that are suspended, and/or lengths of time for jobs to complete over 1 hour periods (e.g., the job status information is stored in 1 hour intervals and/or analyzed in 1 hour intervals to determine whether the number of types of job statuses is anomalous). Alternatively, the jobs data can be stored in databases of one or more secondary storage computing devices 106 instead of or in addition to in the storage manager database 146. For example, a secondary storage computing device 106 can store jobs data corresponding to the secondary storage computing device 106 locally, and the storage manager 146 can retrieve and aggregate the jobs data stored on the secondary storage computing device(s) 106.

Optionally, the storage manager 140 periodically prunes event data and/or jobs data stored in the storage manager database 146. For example, the storage manager 140 can prune event data and/or jobs data stored in the storage manager database 146 that is older than a threshold age and/or that has been stored in the storage manager database 146 for longer than a threshold time. As an illustrative example, the storage manager 140 can prune event data and/or jobs data that has been stored in the storage manager database 146 longer than six months.

Optionally, the storage manager 140 can aggregate event data and/or jobs data prior to storing such data in the storage manager database 146. For example, the storage manager database 146 may store hourly data, and thus the storage manager 140 may aggregate any event data and/or jobs data falling within a one hour period, and store the aggregated data in the storage manager database 146. The storage manager 140 can also filter event data and/or jobs data before such data is stored in the storage manager database 146. For example, part or all of the information management cell may be shut down for maintenance. During the maintenance period, no events may be recorded and/or no jobs may be initiated or completed. To prevent the lack of events or jobs from skewing the historical data (upon which the anomaly detection functionality relies), the storage manager 140 can filter such event data and/or jobs data such that it does not appear as if no events or jobs occurred during the maintenance period.

As illustrated in FIG. 3, the storage manager 140 includes an event anomaly detector 342, a long running job detector 344, a global job analyzer 346, an alert generator 348, and a media agent manager 349 that can provide the anomaly detection and alert functionality and the automated media agent state management functionality described herein. For example, the event anomaly detector 342 can detect anomalies in events that occur on a particular client computing device 110. In particular, the event data corresponding to a particular event and a particular client computing device 110 stored in the storage manager database 146 may be in the form of time-series data (e.g., where the x-axis represents a time or time period at which the particular event occurs and the y-axis represents a number of occurrences of the particular event during the time or time period). As described herein, an event may have a seasonal pattern (e.g., have a consistent number of occurrences during particular time periods, such as during a certain hour, during a certain day of the week, during a certain week of the month, etc.) and/or a trend pattern (e.g., have a number of occurrences that rise at a certain rate over a period of time, have a number of occurrences that fall at a certain rate over a period of time, etc.). As an illustrative example, a first type of event that occurs on a first client computing device 110 may occur more often on Mondays than on other days of the week (e.g., the seasonal pattern), and may increase by 10 occurrences every week (e.g., the trend pattern). An anomaly therefore may be a situation in which an event has a number of occurrences that does not comport with the event's seasonal pattern or the event's trend pattern.

The event anomaly detector 342 can retrieve, from the storage manager database 146, some or all of the event data corresponding to a particular event that occurs on a particular client computing device 110. The event anomaly detector 342 can then perform a time-series decomposition on the retrieved time-series event data to separate the time-series event data into a seasonal component, a trend component, and an error component (also referred to herein as a residual component). The seasonal component may be the portion of the time-series event data that represents the seasonal pattern of the particular event, the trend component may be the portion of the time-series event data that represents the trend pattern of the particular event, and the error component may be the portion of the time-series event data that represents the remaining event data for the particular event.

In some embodiments, the particular event may correspond to multiple seasonal patterns. For example, the number of occurrences of the particular event may spike or drop during particular times of a day, during particular days of the week, and during particular weeks of a month. In such cases, the event anomaly detector 342 can perform multiple decompositions—one for each seasonal pattern such that in each decomposition, the time-series event data is decomposed into a seasonal component corresponding to one of the seasonal patterns, a trend component, and an error component—or perform a single decomposition in which the time-series event data is decomposed into multiple seasonal components, a trend component, and an error component.

In an embodiment, the event anomaly detector 342 can use the locally estimated scatterplot smoothing (LOESS) process to decompose the time-series event data. Alternatively, the event anomaly detector 342 can use the Dickey Fuller test, periodogram (e.g., Fast Fourier Transform), seasonal trend decomposition, the generalized extreme studentized deviate (GESD) test, and/or the like to decompose the time-series event data. Although these mathematical techniques may be known, their application to the present problems at hand, the sequencing of operations to find anomalies, and the combination of parameters analyzed within the particular architectures of the illustrative embodiments represent technological improvements over conventional systems.

As an illustrative example, the event anomaly detector 342 can use STL (Seasonal and Trend decomposition using Loess) to decompose a time-series into its components as follows:
1. Initialize trend as $T(0)v=0$ and $R(0)v$
2. Outer loop—Calculate robustness weights. Run $n(o)$ times
    Calculate Rv
    Calculate robustness weights $\rho v = B(|Rv|/h)$ where $h = 6*\text{median}(|Rv|)$ B is the bi-square weight function [1]
    On initial loop, $\rho v = 1$
3. Inner loop—Iteratively calculate trend and seasonal terms. Run $n(i)$ times
    Detrend: $Yv - Tv(k)$ where k is the loop number. If the observed value Yv is missing, then the detrended term is also missing.
    Cycle-subseries smoothing: The detrended time series is broken into cyclesubseries. For example, monthly data with a periodicity of twelve months would yield twelve cycle-subseries, one of which would be all of the months of January. Each cycle-subseries is then loess smoothed with q=n(s) and d=1. The smoothed values yield a temporary seasonal time series Ck+1.

Low-pass filter: The low pass filter on Ck+1 yields Lk+1. This filter is the application of two moving averages of lag equal to three followed by loess filtering with q=n(I) and d=1. n(I) is defaulted the smallest odd integer greater than the period (e.g. 13 for monthly data). The output of the low-pass filter is Lk+1

Detrending of smoothed cycle-subseries: Sk+1=Ck+1−Lk+1. This is the k+1-th estimate of seasonal component. Importantly, the low-pass filter causes this seasonal time series to average to be nearly zero.

Deseasonalizing: Y−Sk+1

Trend smoothing: Loess smooth the deseasonalized time series with q=n(t). Results in Tk+1, the k+1-th estimate of the trend component.

4. After obtaining univariate series, run GESD test to find whether a given value is an outlier or not.

Once the event anomaly detector 342 has decomposed the time-series event data, the event anomaly detector 342 can determine a variance in association with the error component(s). For example, the error component(s) may represent the number of occurrences of the particular event during various times or time periods after removing from the count the occurrences that are attributable to the seasonal pattern(s) and/or the trend pattern. The event anomaly detector 342 can apply a Box and Whisker analysis to the error component(s) to determine a positive occurrence threshold value (e.g., an upper extreme in a Box and Whisker plot that is above the median, upper quartile, and upper whisker) that, if exceeded, indicates a possible event occurrence anomaly (e.g., the events are occurring too often) and/or a negative occurrence threshold value (e.g., a lower extreme in a Box and Whisker plot that is below the median, lower quartile, and lower whisker) that, if not exceeded, indicates a possible event occurrence anomaly (e.g., the events are not occurring often enough). As an illustrative example, the positive occurrence threshold value may be N (e.g., 1, 2, 3, 4, 5, etc.) times the mean, median, standard deviation, variance, etc. above the mean or median, and the negative occurrence threshold value may be N (e.g., 1, 2, 3, 4, 5, etc.) times the mean, median, standard deviation, variance, etc. below the mean or median. Thus, if the number of occurrences of the particular event represented by the error component(s) during a particular time or time period exceeds the positive occurrence threshold value or does not exceed the negative occurrence threshold value, then the event anomaly detector 342 may identify this time or time period as being a time or time period during which an anomaly may have occurred. The event anomaly detector 342 can provide this information to the alert generator 348.

Similarly, the event anomaly detector 342 can apply the Box and Whisker analysis to the error component(s) to identify an event anomaly in which the duration of time between event occurrences is too long or too short. For example, applying the Box and Whisker analysis to the error component(s) may result in creation of a minimum duration threshold and/or a maximum duration threshold, where the minimum duration threshold is measured between occurrences of the particular event and, if not exceeded, indicates that the particular event is occurring too often, and where the maximum duration threshold is measured between occurrences of the particular event and, if exceeded, indicates that the particular event is not occurring often enough.

The alert generator 348 may be configured to generate an alert for an event anomaly detected by the event anomaly detector 342. However, before generating the alert, the alert generator 348 may perform a filtering operation to determine whether an alert should be generated for the detected event anomaly. For example, if a particular event is occurring or not occurring at a rate that causes the event anomaly detector 342 to indicate multiple times that the same potential anomaly is present, it may not be beneficial to user to continue to receive alerts corresponding to the anomaly given that the user has already been alerted one or more times and the anomalies will continue to be detected until the underlying issue is resolved. Thus, the alert generator 348 can determine how many times an alert for the same potential anomaly has been generated. If the number of generated alerts exceeds a threshold value, the alert generator 348 instruct the event anomaly detector 342 to raise the positive occurrence threshold value, lower the negative occurrence threshold value, lower the minimum duration threshold, and/or raise the maximum duration threshold for the current time or time period of the next time or time period to be evaluated so that the event anomaly detector 342 is less likely to indicate a possible anomaly in conjunction with future occurrences of the particular event. In other words, the alert generator 348 can instruct the event anomaly detector 342 to adjust the range outside of which an anomaly is detected to become larger, resulting in fewer future anomaly detections.

Alternatively, the event anomaly detector 342 can perform the filtering operation instead of the alert generator 348 and before indicating to the alert generator 348 that an anomaly has been detected. In this situation, the event anomaly detector 342 may determine whether to expand the range outside of which an anomaly is detected. For example, the event anomaly detector 342 may make this determination based on whether the number of alerts previously generated for the event over a period of time is less than a threshold (e.g., if the number of alerts previously generated for the event is less than the threshold, then the event anomaly detector 342 does not expand the range (e.g., increase the difference between the occurrence thresholds and/or the duration thresholds); if the number of alerts previously generated for the event is greater or equal to the threshold, then the event anomaly detector 342 does expand the range). The event anomaly detector 342 can then determine whether the number of occurrences of the event (or the duration of time between event occurrences) falls within the unexpanded range or the expanded range, as appropriate. Thus, if as a result of the filtering operation, the range outside of which an anomaly is detected is adjusted to be larger so that a currently evaluated number of occurrences of an event or future evaluated number of occurrences of an event does not fall outside the expanded range, then the event anomaly detector 342 may not even indicate to the alert generator 348 that a potential anomaly is detected.

If the alert generator 348 determines that a detected an anomaly should result in an alert, the alert generator 348 can indicate the client computing device 110 on which the event occurred, the type of event for which an anomaly is detected, a reason why the anomaly was detected (e.g., the number of occurrences is too high because the positive occurrence threshold value was exceeded, the number of occurrences is too low because the negative occurrence threshold value was not exceeded, the events are occurring too frequently in time because the duration of time between event occurrences is less than the minimum duration threshold, the events are not occurring frequently enough in time because the duration of time between event occurrences is greater than the maximum duration threshold, etc.), the number of occurrences of the event in the time or time period being evaluated, and/or the time or time period during which the anomaly was detected (e.g., the time or time period being evaluated).

In some embodiments, the alert generator 348 can generate one or more graphs for inclusion in the alert. For example, the graph can depict the number of occurrences of the particular event over time, with an indication of the time or time period during which an anomaly is detected.

The alert generator 348 can transmit the generated alert to the client computing system 110 on which the event that caused the anomaly detection occurred. Alternatively or in addition, the alert generator 348 can generate an alert as an email or other electronic message and transmit the email or other electronic message to an email or other electronic message server so that a user or administrator can access the email and alert content.

The long running job detector 344 can be configured to detect instances in which a particular type of job running on a particular client computing device 110 is running longer than expected. For example, different types of jobs can include a full secondary copy operation job, an incremental secondary copy operation job, a differential secondary copy operation job, and/or the like. As described herein, the jobs data can include the type of job running on the particular client computing device 110, the size of the secondary copy data being backed up, snapped, archived, etc., a time that the job was started, a time that the job finished, and/or a number of times the job was attempted until the job successfully completed.

The long running job detector 344 can retrieve, from the storage manager database 146, the jobs data corresponding to a particular job and a particular client computing device 110. The retrieved jobs data may be represented by time-series indicating how long the particular job took to complete at different time instants over a period of time, the size of the secondary copy data over the period of time, and/or the number of job attempts over the period of time. Using the jobs data, the long running job detector 344 can perform a time-series decomposition in a manner as described herein (e.g., in a manner similar to the time-series decomposition performed by the anomaly detector 342) and analyze the decomposed error component(s) to identify an acceptable range for the time for the job to complete, an acceptable range for the size of the secondary copy data being backed up, snapped, archived, etc., and/or an acceptable range for a number of job attempts. In an embodiment, the ranges may be determined by the long running job detector 344 in a manner similar to how the anomaly detector 342 determines acceptable ranges (e.g., the positive and negative occurrence threshold values, the minimum and maximum duration thresholds, etc.).

The long running job detector 344 can then use the acceptable ranges to determine whether a current job or a historical job should be flagged. For example, the long running job detector 344 can flag a current or historical job if the time for the subject job to complete is outside the acceptable time range, if the size of the secondary copy data being processed during the subject job is outside the acceptable size range, and/or if the number of job attempts for the subject job is outside the acceptable attempts range. If the long running job detector 344 flags a current or historical job, the long running job detector 344 can provide the job information to the alert generator 348.

Optionally, the anomaly detector 342 can perform the operations described herein to determine whether an event associated with the subject job is anomalous. For example, an event associated with the subject job may be any event that is generated in response to the subject job being initiated, that is generated during the subject job and as a result of the subject job, and/or that is generated in response to the subject job being completed, failing, being killed, etc. If an event is generated that is associated with the subject job and that the anomaly detector 342 detects is anomalous, the anomaly detector 342 can inform the alert generator 348 and provide any corresponding data identifying the type of anomaly.

The alert generator 348 can then generate an alert, such as an alert described above, if the long running job detector 344 flags a current or historical job and/or if the anomaly detector 342 identifies an anomalous event that is associated with the current or historical job. Optionally, the alert generator 348, the long running job detector 344, and/or the anomaly detector 342 can perform the filtering operations described herein prior to generating the alert (e.g., the long running job detector 344 can expand the acceptable ranges before making a determination to flag a subject job if the number of alerts generated previously for the subject job over a period of time is greater than or equal to a threshold).

In some embodiments, the alert generated by the alert generator 348 for the current or historical job can include an indication of a possible cause for the issue that resulted in the alert and/or a possible solution for resolving the issue. For example, if the long running job detector 344 determines that the time for the subject job to complete is outside the acceptable time range, the long running job detector 344 determines a possible cause for the subject job running long. The long running job detector 344 can determine whether the secondary storage computing device 106 running the subject job is using a deduplication database 247 to perform the subject job that is also subject to a secondary copy operation. If the deduplication database 247 is the subject of a secondary copy operation (e.g., the deduplication database 247 is being backed up) while the subject job is running, this can slow down the subject job as various processes running as part of the subject job may have to wait longer for the deduplication database 247 to respond to read or write requests, further delaying other operations that rely on the completion of read or write requests to the deduplication database 247.

If the long running job detector 344 determines that the secondary storage computing device 106 is running the subject job at the same time that a secondary copy operation is being performed on the deduplication database 247 and that the subject job uses the deduplication database 247, then the long running job detector 344 can determine an interval of time at which the secondary copy operation should be performed on the deduplication database 247 and/or an interval of time when the secondary copy operation is less likely to be performed on the deduplication database 247 such that the subject job can be recommended to run during this interval of time. For example, the long running job detector 344 can retrieve, from the storage manager database 146, jobs data indicating times when jobs corresponding to a secondary copy operation on the deduplication database 247 (e.g., jobs to back up the deduplication database 247) are historically run. The long running job detector 344 can use this jobs data to then identify periods in which jobs corresponding to a secondary copy operation on the deduplication database 247 are not typically run, and provide this information to the alert generator 348. The alert generator 348 can then generate an alert that includes a possible cause of the issue being that the deduplication database 247 was being backed up, snapped, archived, etc. at the same time as the subject job and a possible suggestion on a time to run the subject job (e.g., a time corresponding to periods in which jobs corresponding to a secondary copy operation on the deduplication database 247 are not typically run). Alternatively, the long running job detector 344 can use the jobs data to identify when jobs that use the deduplication database 247 are typically run, providing such information to the alert generator 348 such that the alert generated by the alert generator 348 provides an indication of the possible cause (e.g., the deduplication database 247 was being backed up, snapped, archived, etc.) and suggests a time when a secondary copy operation should be run on the deduplication database 247 (e.g., a time that corresponds to times when jobs that use the deduplication database 247 are not typically run).

Alternatively or in addition, the long running job detector 344 can check the query insert time of the deduplication database 247 (e.g., by retrieving jobs data from the storage manager database 146). If the query insert time of the deduplication database 247 is higher than a threshold, then the long running job detector 344 can provide this information to the alert generator 348 such that the alert generated by the alert generator 348 indicates a possible cause of the issue (e.g., the query insert time of the deduplication database 247 is too high) and/or a possible solution for resolving the issue.

The long running job detector 344 can also determine other possible causes of the subject job running too long. For example, the long running job detector 344 can determine whether an activity was disabled (e.g., by a user or admin) on the client computing device 110 and/or the secondary storage computing device 106. If an activity was disabled, the long running job detector 344 can provide this information to the alert generator 348 such that the alert generated by the alert generator 348 can indicate a possible cause of the issue being that the activity was disabled and/or indicate a possible solution (e.g., enabling the activity). As another example, the long running job detector 344 can determine whether a secondary copy operation window was enforced (e.g., whether a backup window was enforced, such as whether a backup occurred during a set backup window). If the secondary copy operation window was not enforced (e.g., a backup occurred outside the set backup window), the long running job detector 344 can provide this information to the alert generator 348 such that the alert generated by the alert generator 348 can indicate a possible cause of the issue being that the secondary copy operation window was not enforced and/or indicate a possible solution (e.g., set backups to run during the secondary copy operation window). As another example, the long running job detector 344 can determine whether a user or admin suspended the subject job for a time. If the subject job was suspended, the long running job detector 344 can provide this information to the alert generator 348 such that the alert generated by the alert generator 348 can indicate a possible cause of the issue being that the subject job was suspended and/or indicate a possible solution (e.g., allow the subject job to resume if the subject job has not already been allowed to resume). As another example, the long running job detector 344 can determine whether the secondary copy data being processed during the subject job has changed since the last time the subject job was run. If the secondary copy data has changed, the long running job detector 344 can provide this information to the alert generator 348 such that the alert generated by the alert generator 348 can indicate a possible cause of the issue being that the secondary copy data changed and/or indicate a possible solution. As another example, the long running job detector 344 can determine whether a size of the secondary copy data being processed during the subject job has increased since the last time the subject job was run. If the size of the secondary copy data has increased, the long running job detector 344 can provide this information to the alert generator 348 such that the alert generated by the alert generator 348 can indicate a possible cause of the issue being that the size of the secondary copy data has increased and/or indicate a possible solution.

The global job analyzer 346 can be configured to determine whether, for some or all jobs initiated on behalf of some or all of the client computing devices 110 during a particular time or time period, too many jobs succeeded, too few jobs succeeded, too many jobs failed, too few jobs failed, too many jobs were killed, too few jobs were killed, too many jobs were suspended, too few jobs were suspended, too many jobs are pending, and/or too few jobs are pending. For example, the global job analyzer 346 can retrieve jobs data from the storage manager database 146 for some or all of the jobs initiated on behalf of some or all of the client computing devices 110 in the cell. The jobs data may be a time-series representing the number of succeeded jobs, the number of failed jobs, the number of killed jobs, the number of suspended jobs, and/or the number of pending jobs for different time instants over a period of time. The global job analyzer 346 can perform a decomposition of the time-series jobs data in a manner as described herein, and analyze the error component(s) (e.g., using Box and Whisker) to determine an acceptance range of the number of succeeded jobs, the number of failed jobs, the number of killed jobs, the number of suspended jobs, and/or the number of pending jobs for a particular time or time period.

The global job analyzer 346 can then determine whether the number of succeeded jobs, the number of failed jobs, the number of killed jobs, the number of suspended jobs, and/or the number of pending jobs at a current time or time period or a historical time or time period fall outside the acceptable range. If so, the global job analyzer 346 can provide this information to the alert generator 348, and the alert generator 348 can generate an alert indicating which type(s) of jobs fell outside the acceptable range and/or a possible cause or reason for the type(s) of jobs falling outside the acceptable range. For example, the alert can indicate a possible cause, such as a top failure reason and/or correlate and highlight one component in the system 300 that could be the issue (e.g., a client computing device 110, a secondary storage computing device 106, a deduplication database 247, a proxy, a firewall, etc.), if too many jobs are failing. As another example, the alert can indicate a possible cause, such as a new secondary copy operation schedule being created (after the global job analyzer 346 and/or the alert generator 348 determines that a new schedule is created), a secondary copy operation schedule being manually triggered (after the global job analyzer 346 and/or the alert generator 348 determines that the schedule is manually triggered), and/or new client computing device(s) 110 joining the system 300 (after the global job analyzer 346 and/or the alert generator 348 determines that new client computing device(s) 110 joined the system 300), if too many jobs succeeded. As another example, the alert can indicate a possible cause, such as a high job failure, slow progress because many jobs are running longer than expected (which may be indicated by the long running job detector 344), an activity is disabled (after the global job analyzer 346 and/or the alert generator 348 determines that the activity is disabled), and/or a change to the secondary copy job operation window (e.g., a reduction in the window, which may be determined by the global job analyzer 346 and/or the alert generator 348), if too few jobs succeeded.

The alert generated by the alert generator 348 can also include one or more graphs or other non-visual reports that indicate the number of succeeded, failed, killed, suspended, and/or pending jobs over time, with markings or other notations indicating time(s) in which at least one of the jobs types is outside an acceptable range.

Any combination and permutation of information may be included in the issued alerts generated by the alert generator 348. In some embodiments, the information is made available through a dashboard, without limitation.

Example terminology used herein is as follows:

Time series and series: a series of values of a quantity obtained at successive times, often with equal intervals between them.

Anomaly: something that deviates from what is standard, normal, or expected.

Trend: a general direction in which something is developing or changing.

Seasonal: relating to or characteristic of a particular season of the time period, like daily, weekly, yearly, hourly, etc.

STL: Seasonal and Trend decomposition using Loess.

Local anomaly: Anomaly within a season. This might change an existing seasonal pattern.

Global anomaly: Anomaly within a provided data set.

In general, a user or administrator can select one or more client computing devices 110 and/or one or more secondary storage computing devices 106 for which the user or administrator would like to receive alerts. The user selection can then invoke the storage manager 140 to perform the functionality described herein according to the user selection.

In some embodiments, an alert wizard (e.g., implemented by the storage manager 140) allows the user or administrator to select an option to alert on long-running anomalous jobs. The user or administrator needs to select an agent type. Long running jobs may use hourly seasonality. A model (e.g., an event anomaly detection model, a long running job detection model, a job status anomaly model, etc.) may be fit once in a day for the next 24 hours. The results may be cached in a table. The alert thread may use this cached value to remove N (e.g., 1, 2, 3, 4, 6, 8) seasonal values from a current running job's time. After this, the alert thread may check if the current running job's time is anomalous or not using GESD.

An exemplary NT_STL_CacheTable may decompose values. This decomposition may be done once every 24 hours.

Classes:
  LoessException: to throw configuration and data related exceptions.
  Loess: Provides Loess based smoothing.
  StlDecomposition: Provides STL decomposition in trend, season and residual. It uses helper classes.

The table may comprise decomposed values similar to the following Table 1 below:

TABLE 1

| Apptype | Optype | HourOfDay | Seriese | Trend | Season | Residual |
|---|---|---|---|---|---|---|
| 33 | 4 | 0 | 1 | 2.26952 | −2.31808 | 1.04856 |
| 33 | 4 | 1 | 2 | 2.77266 | −1.49282 | 0.720157 |
| 33 | 4 | 2 | 3 | 3.26676 | −0.67038 | 0.403618 |
| 33 | 4 | 3 | 4 | 3.7511 | 0.162935 | 0.085963 |
| 33 | 4 | 4 | 5 | 4.22601 | 1.00482 | −0.23083 |
| 33 | 4 | 5 | 6 | 4.68677 | 1.85148 | −0.53825 |
| 33 | 4 | 6 | 7 | 5.00241 | 2.73548 | −0.73789 |
| 33 | 4 | 7 | 2 | 5.21541 | −2.31808 | −0.89733 |
| 33 | 4 | 8 | 3 | 5.32163 | −1.49282 | −0.82881 |
| 33 | 4 | 9 | 4 | 5.3273 | −0.67038 | −0.65692 |
| 33 | 4 | 10 | 5 | 5.25612 | 0.162935 | −0.41906 |
| 33 | 4 | 11 | 6 | 5.14699 | 1.00482 | −0.15181 |
| 33 | 4 | 12 | 7 | 5.04758 | 1.85148 | 0.100938 |
| 33 | 4 | 13 | 8 | 5.00227 | 2.73548 | 0.262254 |
| 33 | 4 | 14 | 3 | 5.03997 | −2.31808 | 0.278108 |
| 33 | 4 | 15 | 4 | 5.17235 | −1.49282 | 0.320464 |
| 33 | 4 | 16 | 5 | 5.40012 | −0.67038 | 0.270256 |
| 33 | 4 | 17 | 6 | 5.7143 | 0.162935 | 0.12277 |
| 33 | 4 | 18 | 7 | 6.08956 | 1.00482 | −0.09438 |
| 33 | 4 | 19 | 8 | 6.48252 | 1.85148 | −0.334 |
| 33 | 4 | 20 | 9 | 6.8435 | 2.73548 | −0.57898 |
| 33 | 4 | 21 | 4 | 7.13333 | −2.31808 | −0.81526 |
| 33 | 4 | 22 | 5 | 7.33106 | −1.49282 | −0.83824 |
| 33 | 4 | 23 | 6 | 7.42983 | −0.67038 | −0.75945 |

The media agent manager 349 can provide the automated media agent state management described herein. For example, the media agent manager 349 can obtain a list of secondary storage computing devices 106 (e.g., media agents 144) to be enabled. A secondary storage computing device 106 may be present on the list if the secondary storage computing device 106 had previously been disabled due to an error or other poor performance, the secondary storage computing device 106 has not been restarted more than N (e.g., 1, 2, 3, 4, etc.) times over the last X hours (e.g., 24 hours), and/or resource usage statistics of the secondary storage computing device 106 indicate that at least a threshold percentage of the entries in the statistics (e.g., 75%) show resource usage of less than a second threshold percentage (e.g., 90%). For example, a secondary storage computing device 106 can be disabled (e.g., soft state disabled, completely disabled, or otherwise marked as being offline, etc.) if the secondary storage computing device 106 has an anomalous failed job count (e.g., as determined by the global job analyzer 346), the number of failed jobs is greater than a threshold (e.g., 15 failed jobs), and/or services of the secondary storage computing device 106 had already been recycled at least twice within a threshold time period (e.g., 24 hours). When a secondary storage computing device 106 is soft state disabled and not completely disabled, no new jobs may be assigned to the secondary storage computing device 106 (e.g., the storage manager 140 may not assign any new jobs to the secondary storage computing device 106). The secondary storage computing device 106, however, may continue to process existing jobs already assigned to the secondary storage computing device 106 prior to the secondary storage computing device 106 being soft state disabled. Any new jobs may be routed by the storage manager 140 to an alternate secondary storage computing device 106, if available. When a secondary storage computing device 106 is completely disabled, then the secondary storage computing device 106 may not process any new or existing jobs. Rather, new and/or existing jobs may be routed by the storage manager 140 to an alternate secondary storage computing device 106, if available. As another example, a secondary storage computing device 106 can be disabled if the secondary storage computing device 106 has an anomalous pending or long running job count, the secondary storage computing device 106 has more pending and long running jobs than running and succeeded jobs, the resource usage by the secondary storage computing device 106 is increasing constantly, at a constant rate, or at a relatively constant rate and the available memory or central processing unit (CPU) capacity is less than a threshold (e.g., 10%), and/or services of the secondary storage computing device 106 had already been recycled at least twice within a threshold time period (e.g., 24 hours). As another example, a secondary storage computing device 106 can be disabled if the secondary storage computing device 106 has an anomalous pending or long running job count, the secondary storage computing device 106 has more pending and long running jobs than running and succeeded jobs, and/or the resource (e.g., memory, CPU, etc.) usage by the secondary storage computing device 106 is greater than a threshold (e.g., 90%).

The media agent manager 349 can also obtain a list of secondary storage computing devices 106 that have current or pending jobs to which resources have been allocated. For some or all of the secondary storage computing devices 106 in the two obtained lists, the media agent manager 349 can obtain a count of the long running, pending jobs to which the respective secondary storage computing device 106 has allocated resources. The long running job detector 344 and/or the global job analyzer 346 can analyze the jobs associated with a secondary storage computing device 106 (e.g., which may or may not be initiated by the same client computing device 110) based on jobs data retrieved from the storage manager database 146 in a manner as described herein and determine a count of the long running, pending jobs for the secondary storage computing device 106. The long running job detector 344 and/or the global job analyzer 346 can then provide this data to the media agent manager 349.

For some or all of the secondary storage computing devices 106 in the list of secondary storage computing devices 106 to be enabled and/or for some or all of the secondary storage computing devices 106 in the list of secondary storage computing devices 106 that have current or pending jobs to which resources have been allocated, the media agent manager 349 can then reduce the obtained count by removing from the count any jobs that are delayed for reasons other than reasons caused by the respective secondary storage computing device 106. For example, some reasons a job may be delayed other than because of a secondary storage computing device 106 include a user suspended the job; an edge drive backup cannot run because the edge drive backup is in a paused state; a small number of valid archive files are missing in index logs, a loss of a control process occurred (e.g., because the control process unexpectedly died, communication to the control process machine failed due to network errors, the control process machine failed over to another control process machine in a cluster, the control process machine may have rebooted, etc.); the secondary storage computing device 106 is waiting for the services of the client computing device 110 to come online; a synthetic full job was suspended by a user; the job was initiated by an automatic schedule and is ready to be resumed by a client computing device 110; data management activity on a client computing device has been disabled; backup activity for a subclient on a client computing device 110 and/or for a data agent 142 has been disabled; backup activity for a subclient on a client computing device 110, a data agent 142, and/or an instance has been disabled; some or all activity on the storage manager 140 is disabled; data management activity on the storage manager 140 is disabled; there was a failure to validate the credentials of an instance; there was a failure to register a job; a full operation window for a client computing device 110 prevents a secondary copy operation from running; and/or the like. The media agent manager 349 can identify a reason for delay based on jobs data retrieved from the storage manager database 146, based on possible cause information provided by the long running detector 344, and/or based on possible cause information provided by the global job analyzer 346.

From the reduced count, for some or all of the secondary storage computing devices 106, the media agent manager 349 identifies the long running, pending jobs that have failed and uses these jobs to determine a new state for the respective secondary storage computing device 106. For example, if these job(s) for a secondary storage computing device 106 have errors caused by the secondary storage computing device 106, then the media agent manager 349 determines a new state for the secondary storage computing device 106—which may or may not be the same as the current state of the secondary storage computing device 106—regardless of the resource usage of the secondary storage computing device 106. If these job(s) for a secondary storage computing device 106 have no errors (e.g., no or few long running, pending jobs failed) and the secondary storage computing device 106 has a high resource usage, then the media agent manager 349 determines a new state for the secondary storage computing device 106—which may or may not be the same as the current state of the secondary storage computing device 106. However, if these job(s) for a secondary storage computing device 106 have no errors and the secondary storage computing device 106 has a low resource usage, then the media agent manager 349 determines that the state of the secondary storage computing device 106 should not change.

If the media agent manager 349 determines that a new state for a secondary storage computing device 106 should be determined, the media agent manager 349 can obtain anomaly information from the event anomaly detector 342, the long running job detector 344, and/or the global job analyzer 346. For example, the media agent manager 349 can determine whether the number of failed jobs associated with the secondary storage computing device 106 is anomalous based on information provided by the event anomaly detector 342, the long running job detector 344, and/or the global job analyzer 346 (e.g., where the event anomaly detector 342, the long running job detector 344, and/or the global job analyzer 346 can use jobs data associated with jobs running on a secondary storage computing device to determine whether the number of failed jobs is anomalous, such as by determining whether the number of failed jobs deviates from an expected number or an expected trend in a manner as described herein). If the number of failed jobs is anomalous and/or the number of failed jobs is greater than a threshold (e.g., 15 failed jobs), the media agent manager 349 can determine that a new state of the secondary storage computing device 106 is a recycle services state. The media agent manager 349 may determine that the new state should be a recycle services state because there may be no harm in recycling the services of the secondary storage computing device 106 given that jobs are failing anyway.

Otherwise, if there is no anomaly in the number of failed jobs or the number of failed jobs is less than the threshold, then the media agent manager 349 can determine whether there is an anomaly in the number of pending jobs, in the number of long running jobs, and/or in the number of pending and long running jobs, and/or whether the sum of the number of pending and long running jobs is greater than a threshold (e.g., 15). For example, the event anomaly detector 342, the long running job detector 344, and/or the global job analyzer 346 can use jobs data associated with jobs running on the secondary storage computing device to determine whether the number of pending and/or long running jobs is anomalous—such as by determining whether the number of pending and/or long running jobs deviates from an expected number or an expected trend in a manner as described herein—and can provide this information to the media agent manager 349. If there is no anomaly in the number of pending jobs, in the number of long running jobs, and/or in the number of pending and long running jobs, or the sum of the number of pending and long running jobs is not greater than a threshold, then the media agent manager 349 determines that the new state for the secondary storage computing device 106 should be the same as the current state.

Otherwise, if there is an anomaly in the number of pending jobs, in the number of long running jobs, and/or in the number of pending and long running jobs, and/or the sum of the number of pending and long running jobs is greater than a threshold, then the media agent manager 349 can determine whether the number of running and succeeded job is greater than the number of pending and long running jobs. In other words, the media agent manager 349 can determine whether the job completion is increasing or decreasing. If the number of running and succeeded job is greater than the number of pending and long running jobs, then the media agent manager 349 determines that the new state for the secondary storage computing device 106 should be the same as the current state because jobs are succeeding and running.

Otherwise, if the number of running and succeeded job is less than the number of pending and long running jobs, then the media agent manager 349 can determine the resource usage or utilization of the secondary storage computing device 106. If the resource usage by the secondary storage computing device 106 is increasing constantly, at a constant rate, or at a near constant rate (e.g., the resource usage is increasing every X hours, where X may be 1, 2, 3, 4, 5, etc.) and/or the available memory and/or CPU capacity is less than a threshold (e.g., 10%), then a memory leak may be present and the media agent manager 349 can determine that a new state of the secondary storage computing device 106 is a recycle services state. If the resource usage or utilization by the secondary storage computing device 106 is greater than a threshold percentage for at least a threshold percentage of data points in the past X hours (e.g., the resource usage is greater than 90% for at least 75% of data points in the past X hours, where X may be 1, 2, 3, 4, 5, etc.), then the media agent manager 349 determines that the new state for the secondary storage computing device 106 is a disabled state (e.g., a soft state disabled state, a completely disabled state, etc.).

Prior to changing the state of the secondary storage computing device 106 for which the determined new state is different than the current state, the media agent manager 349 can perform a health check on one or more alternate secondary storage computing devices 106 to ensure that an alternate secondary storage computing device 106 can take over and process jobs intended for a secondary storage computing device 106 that will be transitioned to a disabled state. For example, the media manager 349 can identify the storage policy copies that are served by a secondary storage computing device 106 (e.g., a secondary storage computing device 106 that will be transitioned into a disabled state) and, for each copy, can obtain a list of alternate secondary storage computing devices 106. The media agent manager 349 can also obtain, for each of the alternate secondary storage computing devices 106 in each of the copy lists, a current count for the respective alternate secondary storage computing device 106 of the number of pending jobs, the number of failed jobs, and/or the number of long running jobs. If the number of pending jobs, the number of failed jobs, and/or the number of long running jobs are alone or in combination is greater than a threshold and the combined number of pending jobs, failed jobs, and long running jobs is greater than a threshold (e.g., 15), then the media agent manager 349 determines that the respective alternate secondary storage computing device 106 has poor health. Otherwise, if the number of pending jobs, the number of failed jobs, and/or the number of long running jobs are alone or in combination is less than a threshold or the combined number of pending jobs, failed jobs, and long running jobs is less than a threshold, then the media agent manager 349 determines that the respective alternate secondary storage computing device 106 has good health. The media agent manager 349 may transition a secondary storage computing device 106 to a disabled state if there is at least one alternate secondary storage computing device 106 associated with the secondary storage computing device 106 that has good health. Otherwise, if there is not at least one alternate secondary storage computing device 106 associated with a secondary storage computing device 106 that has good health, then the media agent manager 349 may not transition the secondary storage computing device 106 to a disabled state even if the new state of the secondary storage computing device 106 is a disabled state.

Once the media agent manager 349 confirms that at least one alternate secondary storage computing device 106 is available to a secondary storage computing device 106 to be transitioned to a disabled state, the media agent manager 349 can begin setting each secondary storage computing device 106 to the respective new state. For example, if the media agent manager 349 determines a new state for a secondary storage computing device 106 and the secondary storage computing device 106 is also listed in the list of secondary storage computing devices 106 to enable, then the media agent manager 349 can remove the secondary storage computing device 106 from the list so that the secondary storage computing device 106 can be set to the new state. The media agent manager 349 can then set the secondary storage computing devices 106 present on one or both lists that have a new state to the corresponding new state (and/or enable the secondary storage computing device(s) 106 present on the list of secondary storage computing devices 106 to be enabled). In some embodiments, if the new state is a disabled state or a recycle services state, then an administrator may be notified of the new state via an electronic message, an alert, a notification, and/or the like.

If a secondary storage computing device 106 is set to the recycle services state, then the media agent manager 349 may optionally perform additional operations with respect to the secondary storage computing device 106. For example, if the secondary storage computing device 106 is set to the recycle services state and this is the first time that the media agent manager 349 has determined the new state of the secondary storage computing device 106 to be the recycle services state within the last X hours (e.g., 12 hours, 24 hours, 48 hours, etc.), then the media agent manager 349 may take no action, and therefore the secondary storage computing device 106 may remain in a current state and/or the media agent manager 349 may transition the secondary storage computing device 106 back to the current state from the new state. As another example, if the secondary storage computing device 106 is set to the recycle services state and this is the second time that the media agent manager 349 has determined the new state of the secondary storage computing device 106 to be the recycle services state within the last X hours (e.g., 12 hours, 24 hours, 48 hours, etc.), then the media agent manager 349 may determine whether the secondary storage computing device 106 has any index activity (e.g., is generating indexes during secondary copy operations). If the secondary storage computing device 106 has indexing activity, then the media agent manager 349 may take no action, and therefore the secondary storage computing device 106 may remain in a current state and/or the media agent manager 349 may transition the secondary storage computing device 106 back to the current state from the new state. If the secondary storage computing device 106 does not have indexing activity, then the media agent manager 349 may suspend jobs on the secondary storage computing device 106, restart services of the secondary storage computing device 106, and then resume jobs on the secondary storage computing device 106. As another example, if the secondary storage computing device 106 is set to the recycle services state and this is the third (or more) time that the media agent manager 349 has determined the new state of the secondary storage computing device 106 to be the recycle services state within the last X hours (e.g., 12 hours, 24 hours, 48 hours, etc.) (e.g., the secondary storage computing device 106 is being restarted too often in a short period of time), then the media agent manager 349 may transition the secondary storage computing device 106 to the disabled state.

In some embodiments, the media agent manager 349 may refrain from transitioning a secondary storage computing device 106 to the recycle services state if, for example, indexing activity is running in the secondary storage computing device 106, and/or suspended jobs are running in the secondary storage computing device 106 with an auto resume interval of equal to or less than a threshold time (e.g., 5 minutes, 10 minutes, etc.).

If a secondary storage computing device 106 is transitioned to the disabled state, then the media agent manager 349 may route future jobs intended for the secondary storage computing device 106 to an alternate secondary storage computing device 106. The secondary storage computing device 106 may later be placed on the enable list by the media agent manager 349 if the secondary storage computing device 106 has not been restarted more than two times in the last X hours (e.g., 12 hours, 24 hours, 48 hours, etc.) and/or if the past Y hours (e.g., 2 hours, 3 hours, 4 hours, etc.) of resource usage statistics for the secondary storage computing device 106 indicate that at least a threshold percentage (e.g., 75%) of the entries in the resource usage statistics show resource usage of less than a threshold percentage (e.g., 90%). Once the secondary storage computing device 106 is placed on the list of secondary storage computing devices 106 to be enabled and if the media agent manager 349 does not later take the secondary storage computing device 106 off the list (e.g., after new states are determined), then the media agent manager 349 enables the secondary storage computing device 106 and no longer routes future jobs to the alternate secondary storage computing device 106. Rather, the media agent manager 349 resumes sending jobs to the secondary storage computing device 106.

In further embodiments, the media agent manager 349 can train and/or use a neural network or another artificial intelligence model (e.g., a machine learning model) to determine the appropriate thresholds for some or all of the thresholds described herein. For example, the media agent manager 349 can obtain past jobs data and/or past anomaly information, and use this data to train a neural network to output a threshold resource usage (e.g., memory usage, CPU usage, etc.) for one or more resources at which secondary storage computing device 106 performance begins to degrade below acceptable levels. In particular, the media agent manager 349 can train the neural network to determine the amount of resources (e.g., memory storage capacity, CPU processing capacity, etc.) that may be needed by a secondary storage computing device 106 to process one or more future jobs, and to output a resource usage threshold value that is set to be the amount of resources needed (or the amount of resources not needed) to process the future job(s). The neural network may receive job information as an input (e.g., a number of jobs to be performed, client computing device(s) 110 on which the job(s) will be performed, etc.) and may output the resource usage threshold value as a result. The media agent manager 349 can then use the output resource usage threshold value to determine whether a secondary storage computing device 106 should remain in a current state, should transition to the recycle services state, or should transition to the disabled state in a manner as described herein. In some embodiments, the media agent manager 349 can use the output resource usage threshold value to determine how many jobs can be completed before the performance of the secondary storage computing device 106 degrades below acceptable levels. If the number of jobs to be completed is greater than the number of jobs that can be completed before the performance of the secondary storage computing device 106 degrades, the storage manager 140 can route the excess jobs (e.g., the difference between the number of jobs to be completed and the number of jobs that can be completed before the performance of the secondary storage computing device 106 degrades) to an alternative secondary storage computing device 106, if available.

Figure 4:
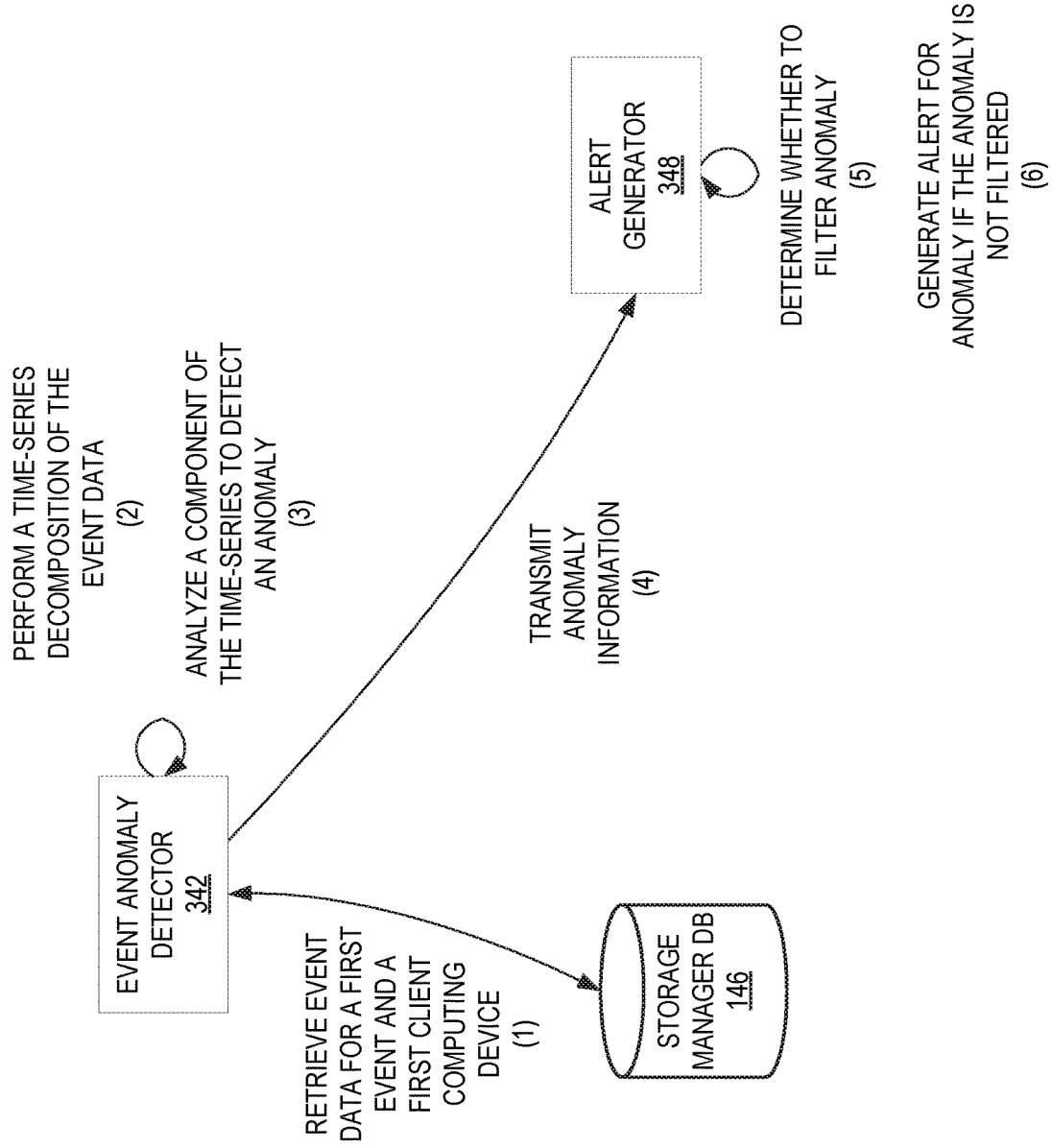
FIG. 4 illustrates a block diagram showing the operations performed to detect event anomalies.

FIG. 4 illustrates a block diagram showing the operations performed to detect event anomalies. As illustrated in FIG. 4, the event anomaly detector 342 can retrieve event data from the storage manager database 146 for a first event and a first client computing device (e.g., for a first event that occurred on a first client computing device) at (1). For example, the event anomaly detector 342 can retrieve the event data in response to a request by a user or administrator to determine whether any anomalous events are occurring.

As another example, the event anomaly detector 342 can retrieve the event data automatically for analysis, such as in periodic intervals or when a new event is received or detected.

The event anomaly detector 342 can perform a time-series decomposition of the event data at (2). For example, the event anomaly detector 342 can apply the LOESS process, Dickey Fuller test, periodogram, the GESD test, and/or the like to decompose the time-series event data.

The event anomaly detector 342 can then analyze a component of the time-series (e.g., the seasonal component(s), the trend component, and/or the error component) to detect a potential anomaly at (3). For example, the event anomaly detector 342 can apply a Box and Whisker analysis to the error component to determine whether the event occurrences at a particular time or time period exceeds an upper extreme of a Box and Whisker plot or does not exceed a lower extreme of the Box and Whisker plot, indicating a possible anomaly. In an embodiment, the upper extreme and/or the lower extreme may be N (e.g., 1, 2, 3, 4, 5, etc.) times the mean, median, standard deviation, variance, etc. away from the mean or median.

The event anomaly detector 342 can then transmit anomaly information to the alert generator 348 at (4). For example, the anomaly information may be an indication of the client computing device 110 on which the event occurred, the type of event, the time or time period during which the event occurred, the threshold that was exceeded (e.g., a duration threshold or an occurrence threshold), a number of occurrences of the event during the time or time period, and/or the type of anomaly (e.g., a frequency anomaly, in which a duration threshold was violated, or an occurrence anomaly, in which an occurrence threshold was violated).

The alert generator 348 can determine whether to filter the anomaly at (5). For example, the alert generator 348 can perform a filtering operation to determine whether a sufficient number of alerts have been generated for the same event, which may indicate that the user or administrator is already aware of the issue. Instead of sending a duplicate alert that provides the user or administrator with no new information, the alert generator 348 can filter the anomaly and not generate an alert. The filtering may occur in the form of instructing the event anomaly detector 342 to adjust the duration and/or occurrence thresholds (e.g., either all the thresholds or just the threshold that was violated) such that future event occurrences that are analyzed are less likely to violate the set duration and/or occurrence thresholds. Alternatively, the event anomaly detector 342 can perform the filtering operation instead of the alert generator 348. In this case, the event anomaly detector 342 may not even inform the alert generator 348 of the anomaly information if the anomaly is filtered (such as if the anomaly is filtered because the number of occurrences of the event or the duration of time between events now falls within an expanded range, when the number of occurrences or duration would not fall within the unexpanded range).

The alert generator 348 can generate an alert for the anomaly if the anomaly is not filtered at (6). The alert can be an email or other electronic message. The alert can include a table with anomaly information, one or more graphs depicting event occurrences at time instances over a period of time (with or without markings or annotations indicating which time instant(s) correspond to a detected anomaly), and/or other visual or non-visual information.

While FIG. 4 depicts the operations being performed in a specific order, this is not meant to be limiting. The operations described above with respect to FIG. 4 can be performed in any order.

Optionally, the event anomaly detector 342 can repeat the above operations for any number or types of events that occur on any number of different client computing devices 110.

Figure 5:
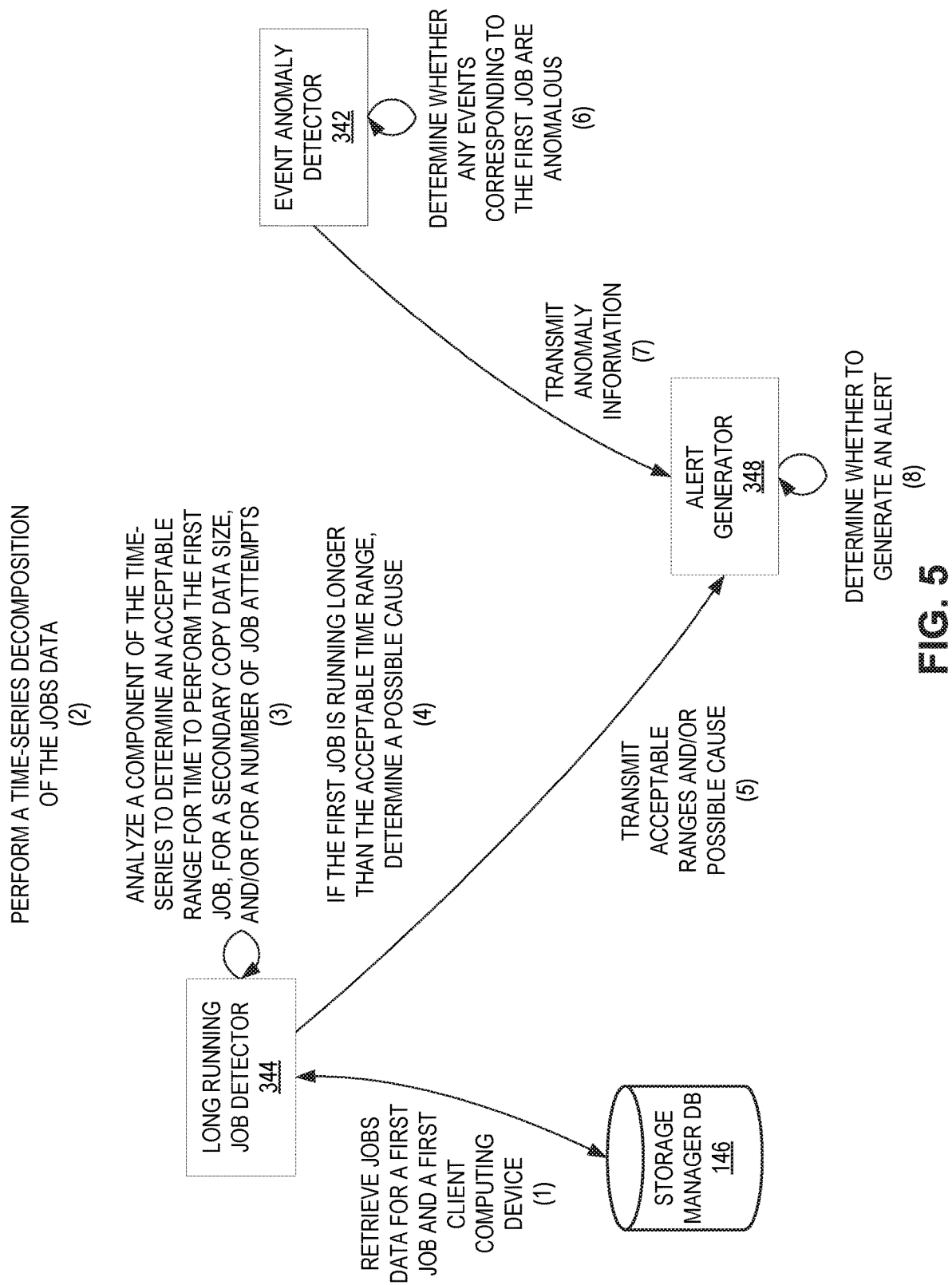
FIG. 5 illustrates a block diagram showing the operations performed to detect long running jobs.

FIG. 5 illustrates a block diagram showing the operations performed to detect long running jobs. As illustrated in FIG. 5, the long running job detector 344 retrieves jobs data from the storage manager database 146 for a first job and a first client computing device (e.g., for a first job initiated by or otherwise corresponding to a first client computing device) at (1). For example, the long running job detector 344 can retrieve the jobs data in response to a request by a user or administrator to determine whether any jobs initiated by or otherwise corresponding to a particular client computing device 110 are running long or have other issues. As another example, the long running job detector 344 can retrieve the jobs data automatically for analysis, such as in periodic intervals or when a new job is received or detected.

The long running job detector 344 can perform a time-series decomposition of the jobs data at (2). For example, the long running job detector 344 can apply the LOESS process, Dickey Fuller test, periodogram, the GESD test, and/or the like to decompose the time-series event data.

The long running job detector 344 can then analyze a component of the time-series (e.g., the seasonal component(s), the trend component, and/or the error component) to determine an acceptable range for time to perform the first job, for a secondary copy data size being processed by the first job, and/or for a number of job attempts at (3). For example, long running job detector 344 can apply a Box and Whisker analysis to the error component to determine the acceptable ranges, where the boundaries of the acceptable ranges may be an upper extreme of a Box and Whisker plot and a lower extreme of the Box and Whisker plot. In an embodiment, the upper extreme and/or the lower extreme may be N (e.g., 1, 2, 3, 4, 5, etc.) times the mean, median, standard deviation, variance, etc. away from the mean or median.

The long running job detector 344 can then determine a possible cause if the first job is running longer than the acceptable time range at (4). For example, a possible cause could be that the deduplication database 247 being used by the first job is being backed up while the first job is running, a user or administrator may have disabled an activity, a secondary copy operation window may not be enforced, a user or administrator may have suspended the first job, the secondary copy data being processed by the first job may have changed in file or content makeup, and/or the size of the secondary copy data being processed by the first job may have increased. The long running job detector 344 can also otherwise flag the first job if any of the acceptable ranges is violated.

The long running job detector 344 can then transmit the acceptable ranges and/or the possible cause to the alert generator 348 at (5), optionally along with an indication of whether the first job has been flagged. Before, during, and/or after operations (2) through (5) are performed, the event anomaly detector 342 can determine whether any events corresponding to the first job are anomalous at (6). For example, an event corresponding to the first job may be an event that occurs when the first job is initiated, an event that occurs during performance of the first job and that occurs as a result of the first job, and/or an event that occurs when the first job completes, fails, is killed, and/or is suspended.

The event anomaly detector 342 can then transmit anomaly information to the alert generator 348 at (7). For example, the anomaly information may be an indication of the client computing device 110 on which a detected anomalous event occurred, the type of event, the time or time period during which the detected anomalous event occurred, the threshold that was exceeded (e.g., a duration threshold or an occurrence threshold), a number of occurrences of the detected anomalous event during the time or time period, and/or the type of anomaly (e.g., a frequency anomaly, in which a duration threshold was violated, or an occurrence anomaly, in which an occurrence threshold was violated).

The alert generator 348 can determine whether to generate an alert at (8). For example, the alert generator 348 can perform the filter operation described above in determining whether to generate an alert. Alternatively, the event anomaly detector 342 and/or the long running job detector 344 can perform the filtering operation instead of the alert generator 348. In this case, the event anomaly detector 342 may not even inform the alert generator 348 of the anomaly information and/or the long running job detector 344 may not provide the acceptable ranges and/or possible cause if the flagged job or anomaly is filtered. If the alert generator 348 generates an alert, the alert can include a table with anomaly information, acceptable ranges and/or ranges that were violated, one or more graphs depicting event occurrences at time instances over a period of time (with or without markings or annotations indicating which time instant(s) correspond to a detected anomaly), one or more graphs depicting jobs data at time instances over a period of time, and/or other visual or non-visual information.

While FIG. 5 depicts the operations being performed in a specific order, this is not meant to be limiting. The operations described above with respect to FIG. 5 can be performed in any order.

Optionally, the long running job detector 344 can repeat the above operations for any number or types of jobs associated with any number of different client computing devices 110.

Figure 6:
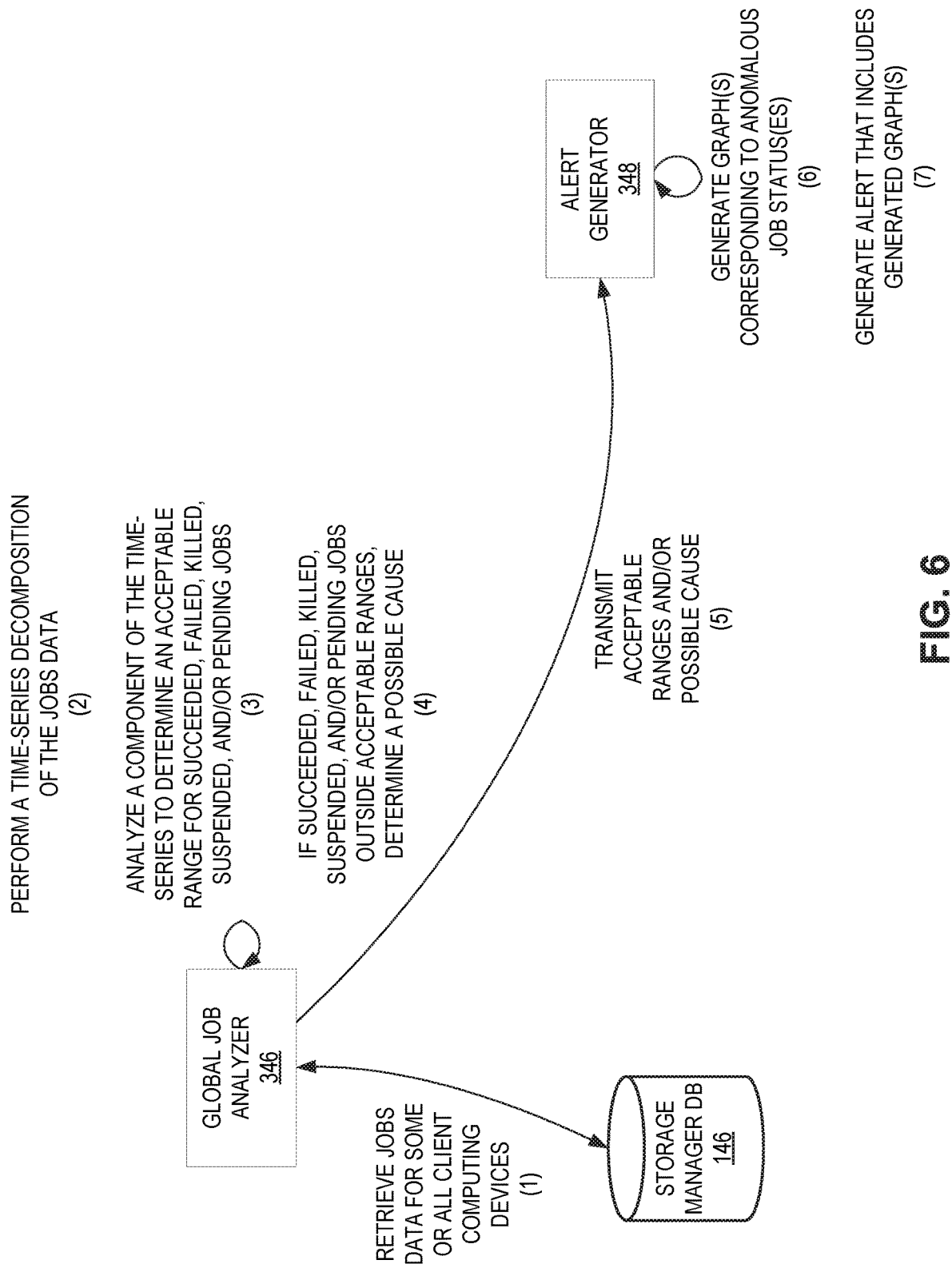
FIG. 6 illustrates a block diagram showing the operations performed to detect job statuses that are occurring too often or less often.

FIG. 6 illustrates a block diagram showing the operations performed to detect job statuses that are occurring too often or less often. As illustrated in FIG. 6, the global job analyzer 346 retrieves jobs data from the storage manager database 146 for some or all client computing devices (e.g., for some or all jobs initiated by or otherwise corresponding to some or all of the client computing devices) at (1). For example, the global job analyzer 346 can retrieve the jobs data in response to a request by a user or administrator to determine whether any job statuses are occurring at an unusual rate. As another example, the global job analyzer 346 can retrieve the jobs data automatically for analysis, such as in periodic intervals or when a new job or set of jobs is received or detected.

The global job analyzer 346 can perform a time-series decomposition of the jobs data at (2). For example, the global job analyzer 346 can apply the LOESS process, Dickey Fuller test, periodogram, seasonal trend decomposition, the GESD test, and/or the like to decompose the time-series event data.

The global job analyzer 346 can then analyze a component of the time-series (e.g., the seasonal component(s), the trend component, and/or the error component) to determine an acceptable range for succeeded, failed, killed, suspended, and/or pending jobs at (3). For example, global job analyzer 346 can apply a Box and Whisker analysis to the error component to determine the acceptable ranges, where the boundaries of the acceptable ranges may be an upper extreme of a Box and Whisker plot and a lower extreme of the Box and Whisker plot. In an embodiment, the upper extreme and/or the lower extreme may be N (e.g., 1, 2, 3, 4, 5, etc.) times the mean, median, standard deviation, variance, etc. away from the mean or median.

The global job analyzer 346 can then determine a possible cause if the succeeded, failed, killed, suspended, and/or pending jobs fall outside the acceptable ranges at (4). For example, a possible cause could be a component in the system 300 (e.g., a client computing device 110, a secondary storage computing device 106, a secondary storage device 108, a deduplication database 247, a proxy, a firewall, etc.) failing or malfunctioning, a new secondary copy operation schedule being created, a secondary copy operation schedule being manually triggered by a user or administrator, new client computing devices 110 being added to the system 300, a high number of job failures, slow progress because many jobs are running slowly, an activity is disabled, a secondary copy operation window is adjusted (to be larger or smaller), and/or the like. The global job analyzer 346 can also otherwise indicate which job status(es) fall outside an acceptable range.

The global job analyzer 346 can then transmit the acceptable ranges and/or the possible cause to the alert generator 348 at (5), optionally along with an indication of which job statuses appear to be anomalous.

Optionally, the alert generator 348 can determine whether to generate an alert. For example, the alert generator 348 can perform the filter operation described above in determining whether to generate an alert. Alternatively, the global job analyzer 346 can perform the filtering operation instead of the alert generator 348. In this case, the global job analyzer 346 may not even inform the alert generator 348 of an anomalous job status if the anomalous job status is filtered.

If the anomalous job status is not filtered, the alert generator 348 can generate one or more graphs corresponding to the anomalous job status(es) at (6). For example, the graph(s) can depict the number of different types of job statuses (e.g., the number of succeeded jobs, failed jobs, killed jobs, suspended jobs, and/or pending jobs) at different time instants over a period of time, with markings or annotations indicating which time instants correspond to anomalous job statuses and/or which job statuses are anomalous. The alert generator 348 can then generate an alert that includes the generated graph(s) at (7). In addition to the graph(s), the alert can include a table with job status information, acceptable ranges and/or ranges that were violated, and/or other visual or non-visual information.

While FIG. 6 depicts the operations being performed in a specific order, this is not meant to be limiting. The operations described above with respect to FIG. 6 can be performed in any order.

Optionally, the global job analyzer 346 can repeat the above operations for any number of times or time periods.

Figure 7:
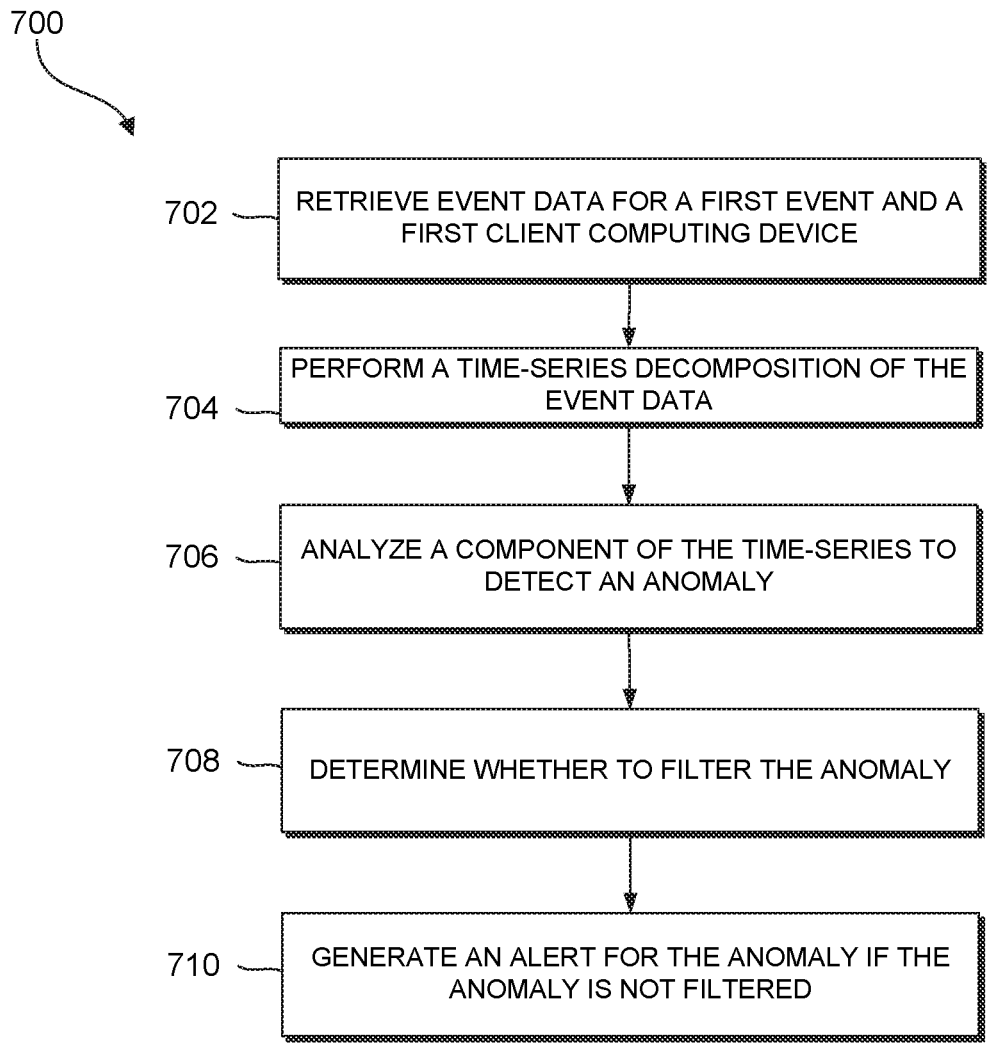
FIG. 7 depicts some salient operations of a method for detecting an anomalous event, according to an embodiment.

FIG. 7 depicts some salient operations of a method 700 for detecting an anomalous event, according to an embodiment. The method 700 may be implemented, for example, by a storage manager, such as the storage manager 140. The method 700 may start at block 702.

At block 702, event data for a first event and a first client computing device is retrieved. For example, the event data may be historical data indicating the number of occurrences of the first event at different time instants over a period of time.

In some embodiments, the event data is retrieved from the storage manager database 146. In other embodiments, the event data is retrieved from the first client computing device.

At block 704, a time-series decomposition of the event data is performed. The decomposition may result in one or more seasonal component(s), a trend component, and an error component. Alternatively, multiple decompositions can be performed, with each decomposition resulting in a different seasonal component, trend component, and error component.

At block 706, a component of the time-series is analyze to detect an anomaly. For example, the error component of the time-series can be analyzed to detect the anomaly. If multiple decompositions are performed, then each error component of each decomposition may be analyzed separately to detect an anomaly.

As part of the anomaly detection, a Box and Whisker analysis can be performed on the error component to determine upper and lower extremes. If the occurrence of the first event at a particular time instant falls below the lower extreme (e.g., the negative occurrence threshold value) or above the upper extreme (e.g., the positive occurrence threshold value), then this may indicate that an anomaly is present. Similarly, if the duration between occurrences of the first event falls below the lower extreme (e.g., the minimum duration threshold) or above the upper extreme (e.g., the maximum duration threshold), then this may indicate that an anomaly is present. The anomaly can be an occurrence anomaly (e.g., too many or too few occurrences) or a frequency anomaly (e.g., the duration between occurrences is too short or too long).

At block 708, whether to filter the anomaly is determined. For example, the anomaly may be filtered if the user or administrator has already been notified of the same anomaly one or more times. As another example, the anomaly may be filtered if the time it takes to generate the alert, to transmit the alert to the user or administrator, to have the user or administrator read the alert, and to have the user or administrator take appropriate action to resolve the alert is longer than the time it takes for a job to complete or an event occurrence to be increased or decreased, as appropriate. As another example, the anomaly may be filtered if the difference between a number of occurrences that triggered a previous alert with respect to the same event and a number of occurrences that is triggering a current alert with respect to the same event is less than a threshold percentage value.

Filtering the anomaly can be implemented by adjusting the upper and/or lower extremes determined during the analysis of the error component such that it is less likely that the number of future event occurrences will fall outside the extremes. The upper and/or lower extremes can be adjusted periodically over time such that the likelihood of a number of occurrences resulting in an alert in the future is gradually reduced. In this way, the anomalies may not be stopped suddenly or only after a set number of alerts have been generated, but rather may be stopped gradually and at a pace that is determined by the values of the extremes and how much the extremes are increased or decreased during each filter stage. The rate at which the extremes are increased or decreased during each filter stage can be preset or set by the user or administrator.

In some embodiments, a user or administrator can indicate that an alert should be silenced or that an alert is not wanted, in which case the alert may not be generated.

At block 710, an alert is generated for the anomaly if the anomaly is not filtered. The alert can be transmitted to a user or administrator as a push notification, a pop-up message, an email, a text message, and/or any other electronic message.

The alert can include information identifying what triggered the anomaly detection, a possible cause, and/or a possible resolution. After the alert is generated, the method 700 is complete.

Figure 8:
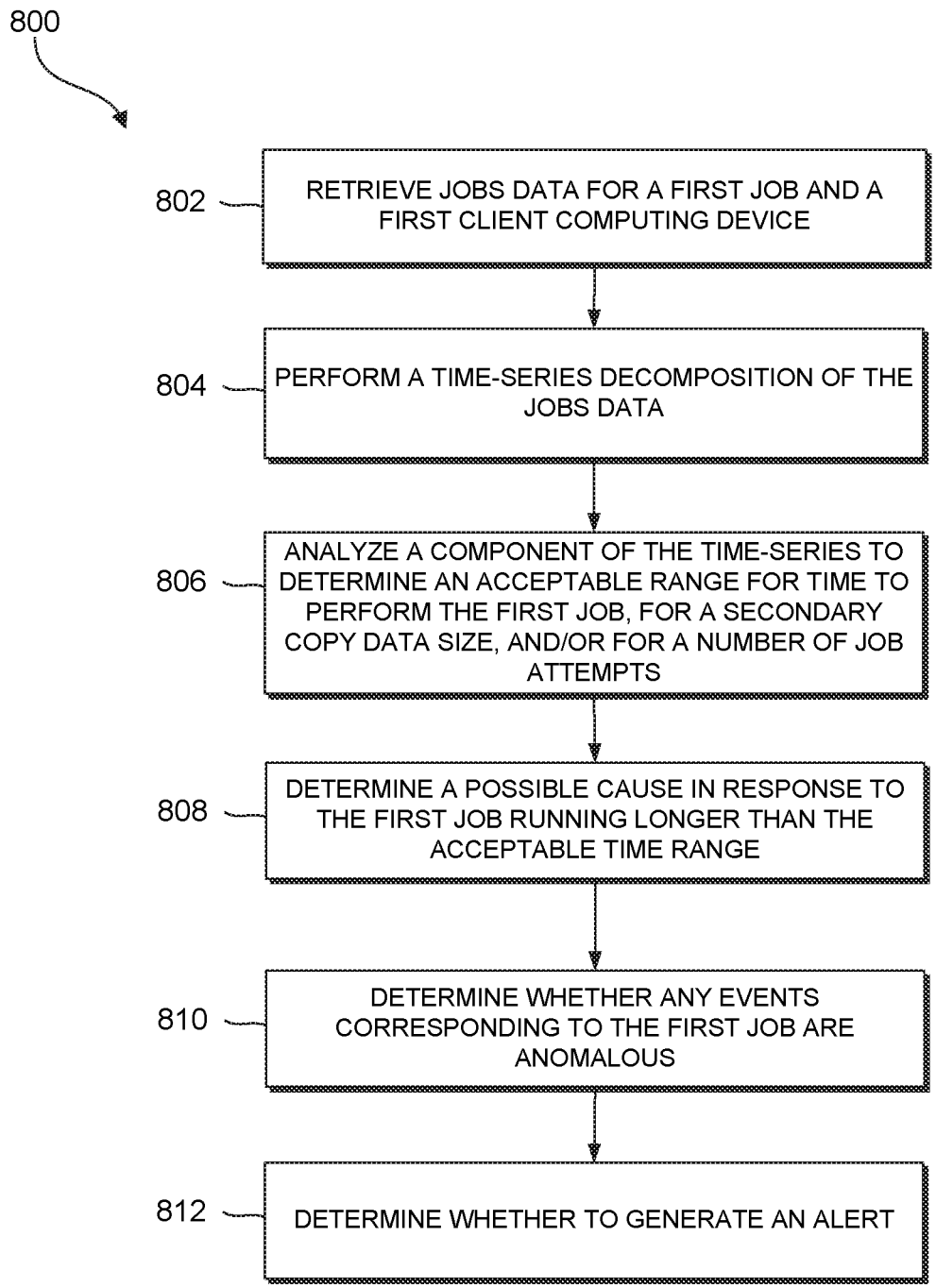
FIG. 8 depicts some salient operations of a method for detecting long running jobs, according to an embodiment.

FIG. 8 depicts some salient operations of a method 800 for detecting long running jobs, according to an embodiment. The method 800 may be implemented, for example, by a storage manager, such as the storage manager 140. The method 800 may start at block 802.

At block 802, jobs data for a first job and a first client computing device is retrieved. For example, the jobs data may be historical data indicating the job length, secondary copy data size, and/or number of job attempts for performing the first job at different time instants over a period of time. The first job may not refer to specific job that runs at a specific time instant only. Rather, the first job may refer to a specific type of job that runs periodically to process a similar or same subset of data. For example, a first job may be an incremental backup job to back up files of a first application, a full backup job to back up files of a first application, an incremental backup job to back up a file system, an incremental snapshot job to take a snapshot of a volume, etc.

In some embodiments, the jobs data is retrieved from the storage manager database 146. In other embodiments, the jobs data is retrieved from the first client computing device.

At block 804, a time-series decomposition of the jobs data is performed. The decomposition may result in one or more seasonal component(s), a trend component, and an error component. Alternatively, multiple decompositions can be performed, with each decomposition resulting in a different seasonal component, trend component, and error component.

At block 806, a component of the time-series is analyze to detect an acceptable range of time to perform the first job, for a secondary copy data size of secondary copy data being processed by the first job, and/or for a number of job attempts to perform the first job. For example, the error component of the time-series can be analyzed to detect the acceptable ranges. If multiple decompositions are performed, then each error component of each decomposition may be analyzed separately to detect the acceptable ranges.

As part of the acceptable range detection, a Box and Whisker analysis can be performed on the error component to determine upper and lower extremes. The upper and lower extremes may represent the boundaries of the acceptable range.

At block 808, a possible cause for the first job running long is determined in response to the first job running longer than the acceptable time range. Determination of the possible cause can include analyzing jobs corresponding to a deduplication database 247 used by the first job to determine whether the deduplication database 247 is being backed up at the same time that the first job is running.

Other possible causes can include an activity being disabled, a secondary copy operation window not being enforced, a user or administrator suspending the first job, the content of the secondary copy data being processed by the first job changing, and/or the size of the secondary copy data increasing. Possible solutions to resolve the issue can also be determined.

At block 810, whether any events corresponding to the first job are anomalous is determined. For example, an event corresponding to the first job may be an event that occurs as a result of an action taken by the first job and/or as a result of a status of the first job changing.

To detect whether an event corresponding to the first job is anomalous, the method 800 can perform some or all of the operations described above with respect to the method 700. Block 810 can be performed before, during, and/or after blocks 804 through 808 are performed.

At block 812, whether to generate an alert is determined. An alert may be generated if the time to perform the first job at a particular time instant or time period falls outside the acceptable time range, if the size of the secondary copy data processed by the first job at a particular time instant or time period falls outside the acceptable size range, if the number of job attempts to perform the first job at a particular time instant or time period falls outside the acceptable attempts range, and/or if an event corresponding to the first job is detected as being anomalous.

Optionally, a filtering operation can be performed before an alert is generated. The filtering operation may result in no alert being generated even if the time to perform the first job at a particular time instant or time period falls outside the acceptable time range, if the size of the secondary copy data processed by the first job at a particular time instant or time period falls outside the acceptable size range, if the number of job attempts to perform the first job at a particular time instant or time period falls outside the acceptable attempts range, and/or if an event corresponding to the first job is detected as being anomalous.

In some embodiments, a user or administrator can indicate that an alert should be silenced or that an alert is not wanted, in which case the alert may not be generated. After the determination is made, the method 800 is complete.

Figure 9:
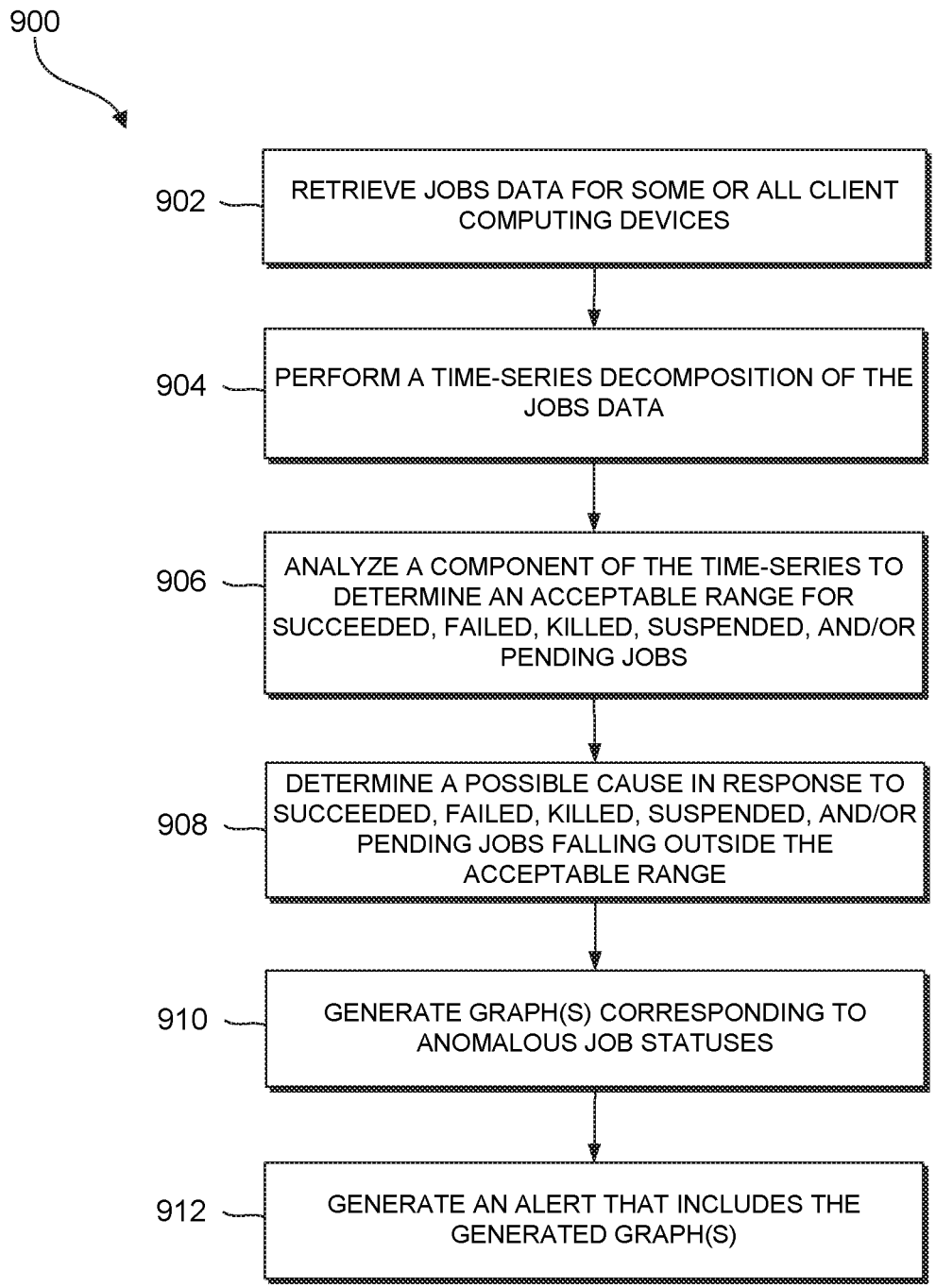
FIG. 9 depicts some salient operations of a method for detecting anomalous job statuses, according to an embodiment.

FIG. 9 depicts some salient operations of a method 900 for detecting anomalous job statuses, according to an embodiment. The method 900 may be implemented, for example, by a storage manager, such as the storage manager 140. The method 900 may start at block 902.

At block 902, jobs data for some or all of the jobs initiated by or otherwise associated with some or all of the client computing devices is retrieved. For example, the jobs data may be historical data indicating the number of succeeded, failed, killed, suspended, and/or pending jobs at different time instants over a period of time.

In some embodiments, the jobs data is retrieved from the storage manager database 146. In other embodiments, the jobs data is retrieved from the first client computing device.

At block 904, a time-series decomposition of the jobs data is performed. The decomposition may result in one or more seasonal component(s), a trend component, and an error component. Alternatively, multiple decompositions can be performed, with each decomposition resulting in a different seasonal component, trend component, and error component.

At block 906, a component of the time-series is analyzed to detect an acceptable range for the number of succeeded, failed, killed, suspended, and/or pending jobs. For example, the error component of the time-series can be analyzed to detect the acceptable ranges. If multiple decompositions are performed, then each error component of each decomposition may be analyzed separately to detect the acceptable ranges.

As part of the acceptable range detection, a Box and Whisker analysis can be performed on the error component to determine upper and lower extremes. The upper and lower extremes may represent the boundaries of the acceptable range.

At block 908, a possible cause is determined in response to the number of succeeded, failed, killed, suspended, and/or pending jobs falling outside the acceptable ranges. Possible causes can include a component of the system 300 failing or malfunctioning, a new secondary copy operation schedule being created, a secondary copy operation schedule being manually triggered, such as a time that the secondary copy operation is not normally performed, new client computing devices 110 being added to the system 300, a high job failure rate, slow progress because many jobs are running longer than expected, a user or administrator disabling an activity and forgetting to re-enable the activity, and/or a change to the secondary copy operation window (e.g., increased or decreased).

Possible solutions to resolve the issue can also be determined. The possible solutions may be to reverse actions identified as being possible causes.

At block 910, one or more graphs corresponding to the anomalous job statuses is generated. The graph(s) can depict the number of different types of job statuses (e.g., the number of succeeded jobs, failed jobs, killed jobs, suspended jobs, and/or pending jobs) at different time instants over a period of time, with markings or annotations indicating which time instants correspond to anomalous job statuses and/or which job statuses are anomalous.

At block 912, an alert that includes the generated graph(s) is generated. In addition to the graph(s), the alert can include a table with job status information, acceptable ranges and/or ranges that were violated, and/or other visual or non-visual information.

Optionally, a filtering operation can be performed before an alert is generated. The filtering operation may result in no alert being generated even if the number of succeeded, failed, killed, suspended, and/or pending jobs falling outside the acceptable ranges.

In some embodiments, a user or administrator can indicate that an alert should be silenced or that an alert is not wanted, in which case the alert may not be generated. After the alert is generated, the method 900 is complete.

FIGS. 10A-10B depict a graphical user interface 1000 showing an anomaly notification or alert, according to an embodiment. The graphical user interface 1000 can be generated by the storage manager 140 or another component in the system 300. As illustrated in FIGS. 10A-10B, the alert may be generated as a result of the storage manager 140 (e.g., the long running job detector 344) detecting that one or more jobs are running longer than usual.

The graphical user interface 1000 includes a table 1002 that provides information on jobs that have been detected as running longer than usual. For example, the table 1002 identifies a server (or cell) on which the long running job was running; the subclient (e.g., client computing device 110) that initiated the long running job, on which the long running job was running, or that is otherwise associated with the job; the job ID of the long running job; the current (as of generation of the alert) completion percentage of the long running job; the anomaly threshold that triggered a detection of a long running job; a running time of the long running job; and a reason for the delay, including possible causes and/or suggestions for resolving the issue.

FIG. 11A depicts another graphical user interface 1100 showing an anomaly notification or alert, according to an embodiment. The graphical user interface 1100 can be generated by the storage manager 140 or another component in the system 300. As illustrated in FIG. 11A, the alert may be generated as a result of the storage manager 140 (e.g., the global job analyzer 346) detecting that the number of at least one type of job status is unusually high or low. Specifically, the graphical user interface 1100 provides a notice indicating that an unusually large number of jobs in the system 300 have failed, providing the current (as of generation of the alert) number of failed jobs (e.g., 109) and the expected number of failed jobs (e.g., less than 28, which may be the mean or median number of failed jobs or the upper extreme).

FIG. 11B depicts another graphical user interface 1150 showing an anomaly notification or alert, according to an embodiment. The graphical user interface 1150 can be generated by the storage manager 140 or another component in the system 300. As illustrated in FIG. 11B, the alert may be generated as a result of the storage manager 140 (e.g., the global job analyzer 346) detecting that the number of at least one type of job status is unusually high or low. Specifically, the graphical user interface 1150 provides a notice indicating that an unusually large number of jobs in the system 300 are pending, providing the current (as of generation of the alert) number of pending jobs (e.g., 17) and the expected number of pending jobs (e.g., less than 16, which may be the mean or median number of failed jobs or the upper extreme).

FIG. 12 depicts another graphical user interface 1200 showing an anomaly notification or alert, according to an embodiment. The graphical user interface 1200 can be generated by the storage manager 140 or another component in the system 300. As illustrated in FIG. 12, the alert may be generated as a result of the storage manager 140 (e.g., the event anomaly detector 342) detecting that one or more events are anomalous.

The graphical user interface 1200 includes a table 1202 that provides information on the events detected as being anomalous. For example, the table 1202 identifies a server (or cell) on which the anomalous event occurred; a time that the anomalous event occurred; details explaining the type of event that is detected as being anomalous, a number of occurrences of the anomalous event at the time or time period, and a type of anomaly that was detected (e.g., occurrence anomaly or frequency anomaly).

Figure 13:
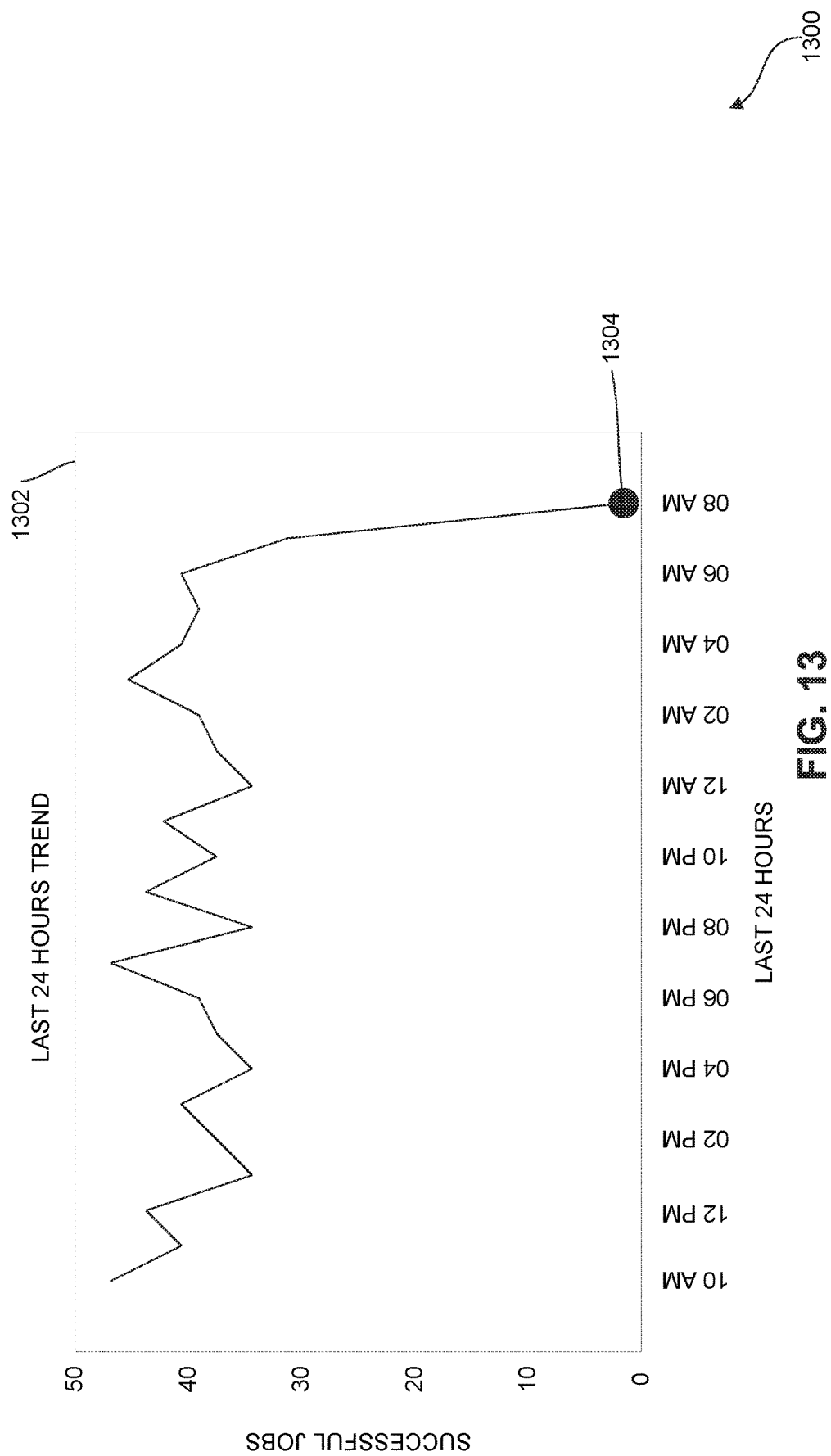
FIG. 13 depicts another graphical user interface showing an anomaly notification or alert, according to an embodiment.

FIG. 13 depicts another graphical user interface 1300 showing an anomaly notification or alert, according to an embodiment. The graphical user interface 1300 can be generated by the storage manager 140 or another component in the system 300. As illustrated in FIG. 13, the alert may be generated as a result of the storage manager 140 (e.g., the global job analyzer 346) detecting that the number of at least one type of job status is unusually high or low. Specifically, the graphical user interface 1300 provides a notice indicating that an unusually fewer number of jobs succeeded in the system 300 during a particular time period (e.g., 7 AM to 8 AM on Aug. 28, 2019), providing the current (as of generation of the alert) number of succeeded jobs (e.g., 0).

The graphical user interface 1300 includes a graph 1302 that provides information on history of the number of succeeded jobs in the system 300 over a period of time (e.g., the last 24 hours). The graph 1302 further includes a marker 1304 indicating the time or time period at which the number of succeeded jobs fell below an acceptable range.

Figure 14:
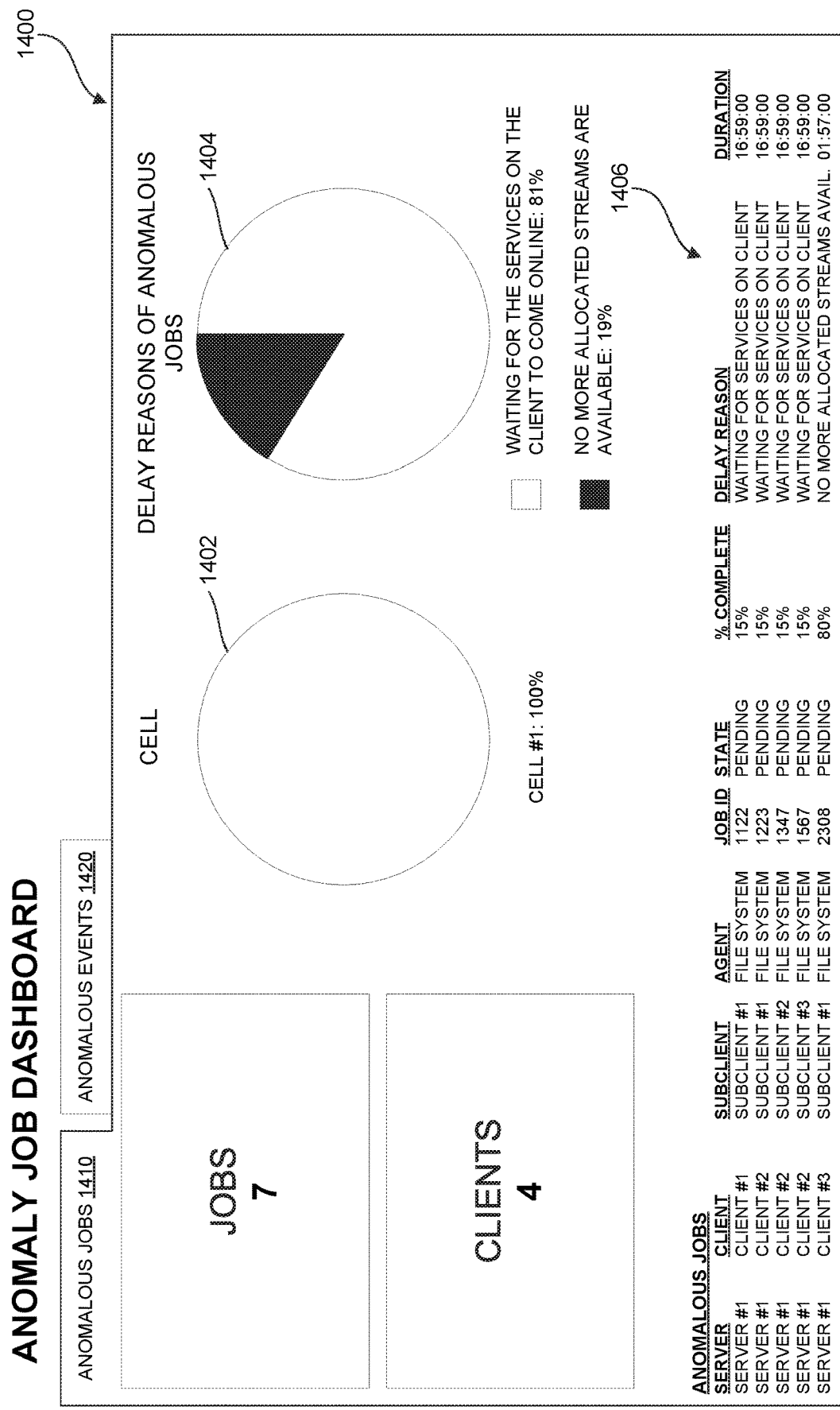
FIG. 14 depicts another graphical user interface showing an anomaly job dashboard, according to an embodiment.

FIG. 14 depicts another graphical user interface 1400 showing an anomaly job dashboard, according to an embodiment. The graphical user interface 1400 can be generated by the storage manager 140 or another component in the system 300. As illustrated in FIG. 14, the dashboard depicted in the graphical user interface 1400 can provide, in tab 1410, a high level overview of the number of jobs succeeded, failed, killed, suspended, and/or pending in a cell (e.g., 7), and the number of client computing devices 110 in the cell (e.g., 4).

The graphical user interface 1400 can further include, in the tab 1410, a pie chart 1402 depicting the percentage of jobs succeeded, failed, killed, suspended, and/or pending that correspond to the system 300 or cell (e.g., 100%), and a pie chart 1404 depicting reasons why jobs are long running, such as a percentage of jobs that are delayed or long running for a first reason (e.g., 81% of the jobs that are long running are waiting for other services), a percentage of jobs that are delayed or long running for a second reason (e.g., 19% of jobs that are long running do not have any available streams allocated thereto), a percentage of jobs that are delayed or long running for a third reason, and so on. The tab 1410 further includes a table 1406 providing more information on the anomalous jobs and/or the jobs corresponding to anomalous job statuses, including server, client, subclient, agent, job ID, state or status, percentage of the job that is complete, the reason for delay, and the duration of the job.

Tab 1420 in the graphical user interface 1400, not shown, can depict similar information for anomalous events. For example, the tab 1420 can depict a list of anomalous events and their details, causes for the anomalous events and a percentage of each cause shown in a pie chart similar to the pie chart 1404, other graphs or tables showing anomalous event information, and/or the like.

Anomaly Detection of Deduplication Pruning Operations

In an embodiment, the storage manager 140 can also perform anomaly detection on deduplication database 247 pruning operations. For example, an archive file may be generated in response to a job being performed (e.g., a backup job) and the archive file may comprise various chunks. Each chunk may store a data block and/or a reference to a data block that was already stored in another chunk (possibly in another archive file). Information about archive files and their corresponding chunks may be stored in the storage manager database 146. The deduplication database 247 may store or have access to a table that indicates, for a data block, a signature of the data block, an archive file or chunk in which the data block is stored, a reference count of a number of times the data block is referenced by other chunks or archive files, and/or the other chunks or archive files that reference the data block. Generally, to perform pruning of chunks, the deduplication database 247 may receive a list of archive files that are to be deleted, and the deduplication database 247 can update the table to reduce the reference count as appropriate (e.g., reduce the reference count for data blocks that are referenced in chunks of archive files to be deleted). The chunks of the archive files may not be deleted immediately, however, because the chunks may include data blocks referenced by other chunks. Thus, the deduplication database 247 can then, after updating the table, provide the storage manager 140 with a list of archive files that only include data blocks for which the reference count is 0. The storage manager 140 or another component in the system 100 can then delete the chunks of these listed archive files.

In some circumstances, a delay can occur in the transmission of the list of archive files that are to be deleted to the deduplication database 247, resulting in a backlog of archive file deletion indications that the deduplication database 247 needs to process to update the table. In other circumstances, the deduplication database 247 can be running slowly (e.g., because the deduplication database 247 is being backed up, a media agent 144 is running slowly or has failed, etc.) such that there is a delay in generation of the list of archive files that only include data blocks for which the reference count is 0. Thus, archive files (e.g., chunks) that could otherwise be deleted are not deleted, reducing the amount of available memory space to store other blocks.

Accordingly, the storage manager 140 can store, for various time periods, a count (e.g., a backlog) of the number of archive files or chunks that a deduplication database 247 has yet to process to update the table, a count of the number of archive files or chunks identified as only having data blocks for which the reference count is 0, and/or a time since the last list of archive files that only include data blocks for which the reference count is 0 was generated by the deduplication database 247. The event anomaly detector 342 can retrieve this deduplication pruning information from the deduplication database 247 and implement the anomaly detection and reporting functionality described herein to detect whether there are any anomalous delays in the pruning operations of the deduplication database 247 (e.g., any delays in the processing of archive files to be deleted and/or any delays in the generation of the list of archive files or chunks to delete because they include only data blocks having a reference count of 0). In some embodiments, instead of comparing the absolute value of the counts or times over various time periods, the event anomaly detector 342 can determine a difference in the absolute value of the counts or times between time periods (e.g., between 1 minute periods, between 1 hour periods, between 1 day periods, between 1 week periods, etc.), and use the determined differences to detect anomalies and/or generate alerts. Generally, if the difference is negative, the event anomaly detector 342 likely will not identify anomalous activity. In other embodiments, the event anomaly detector 342 uses the absolute value of the counts or times to detect anomalies and/or generate alerts.

Figure 15:
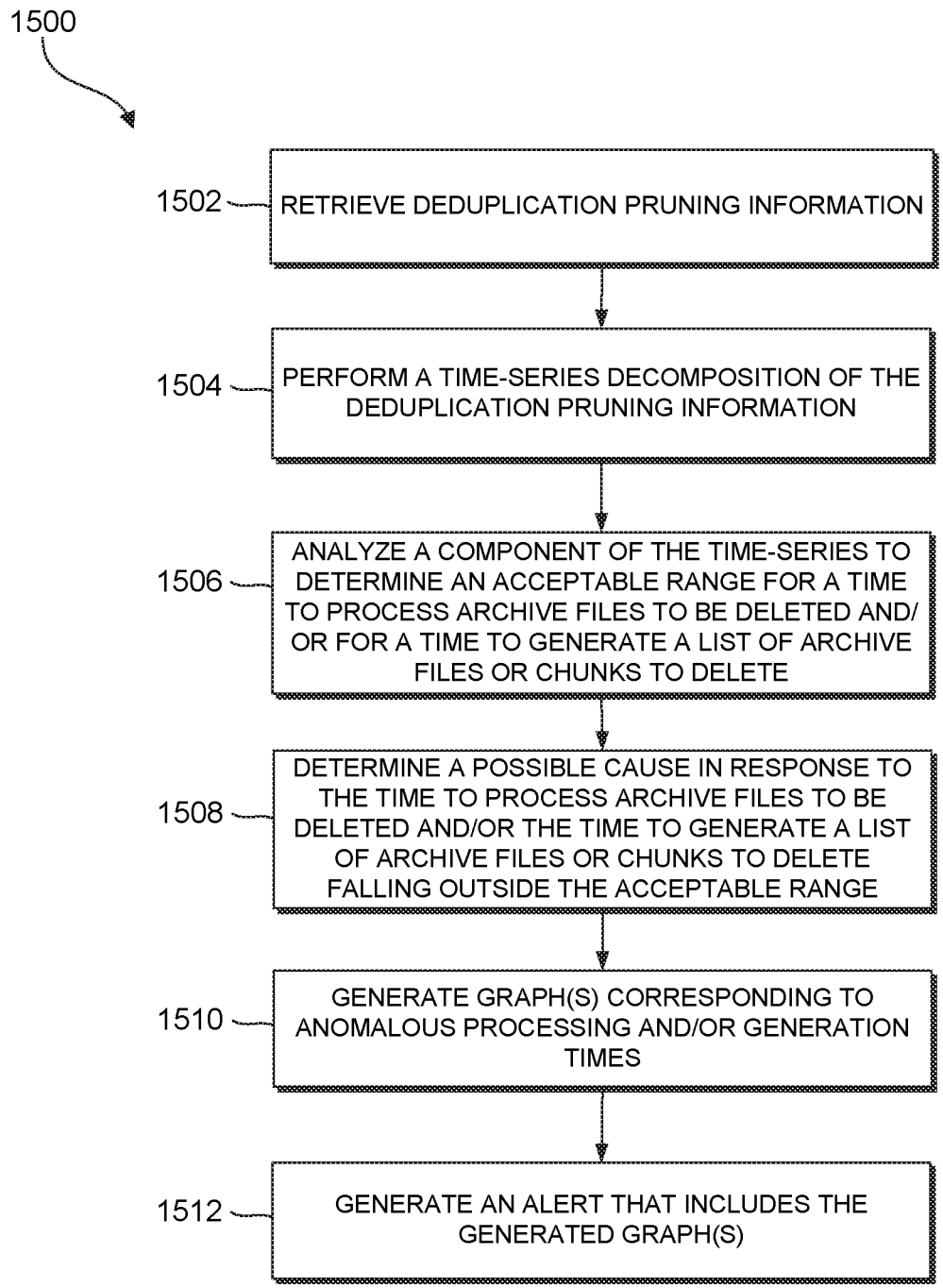
FIG. 15 depicts some salient operations of a method for detecting anomalous delays in the pruning operations of a deduplication database, such as the deduplication database of FIG. 2C, according to an embodiment.

FIG. 15 depicts some salient operations of a method 1500 for detecting anomalous delays in the pruning operations of a deduplication database, such as the deduplication database 247, according to an embodiment. The method 1500 may be implemented, for example, by a storage manager, such as the storage manager 140. The method 1500 may start at block 1502.

At block 1502, deduplication pruning information is retrieved. For example, the deduplication pruning information can include, for one or more time periods (e.g., for one or more deduplication pruning operations), a count (e.g., a backlog) of the number of archive files or chunks that a deduplication database 247 has yet to process to update the table (e.g., the table that indicates, for a data block, a signature of the data block, an archive file or chunk in which the data block is stored, a reference count of a number of times the data block is referenced by other chunks or archive files, and/or the other chunks or archive files that reference the data block), a count of the number of archive files or chunks identified as only having data blocks for which the reference count is 0, and/or a time since the last list of archive files that only include data blocks for which the reference count is 0 was generated by the deduplication database 247. A time period can be a 1 minute period, 1 hour period, 1 day period, 1 week period, etc. The portion of the deduplication pruning information corresponding to a particular time period may be derived from a particular deduplication pruning operation.

In some embodiments, the deduplication pruning information is retrieved from one or more deduplication databases 247. In other embodiments, the deduplication pruning information is retrieved from the storage manager database 146.

At block 1504, a time-series decomposition of the deduplication pruning information is performed. The decomposition may result in one or more seasonal component(s), a trend component, and an error component. Alternatively, multiple decompositions can be performed, with each decomposition resulting in a different seasonal component, trend component, and error component.

At block 1506, a component of the time-series is analyzed to detect an acceptable range for a time to process archive files to be deleted and/or for a time to generate a list of archive files or chunks to delete. For example, the error component of the time-series can be analyzed to detect the acceptable ranges. If multiple decompositions are performed, then each error component of each decomposition may be analyzed separately to detect the acceptable ranges.

As part of the acceptable range detection, a Box and Whisker analysis can be performed on the error component to determine upper and lower extremes. The upper and lower extremes may represent the boundaries of the acceptable range.

In some embodiments, the acceptable ranges are absolute time values. In other embodiments, the acceptable ranges are delta time values (e.g., a different in absolute time values). For example, an acceptable range may be a delta time value representing a difference between a time to process archive files to be deleted in a first time period and a time to process archive files to be deleted in a successive time period. An acceptable range may be a delta time value that is a positive number less than a threshold difference. In further embodiments, a negative delta time value may be considered to fall within an acceptable range. However, a negative delta time value may also fall outside an acceptable range in some circumstances (e.g., if data corruption causes the loss of the list of archive files to delete such that fewer archive files are deleted than expected).

At block 1508, a possible cause is determined in response to the time to process archive files to be deleted and/or the time to generate a list of archive files or chunks to delete falling outside the acceptable ranges. Possible causes can include a component of the system 300 failing or malfunctioning (e.g., the deduplication database 247, a media agent 144, etc.), a delay in the transmission of the list of archive files that are to be deleted from, for example, a client computing device 110 to the deduplication database 247, a backup or restore of the deduplication database 247 occurring during the time period, a backup or restore of a media agent 144 occurring during the time period, a media agent 144 running slowly or about to fail, a user or administrator disabling an activity and forgetting to re-enable the activity, data corruption causing the loss of at least a portion of the list of archive files to delete, data corruption causing the loss of other data useful in determining which archive files to delete, etc. The possible cause can be presented to an administrator or user in a user interface rendered and/or displayed by a client computing device 110.

Possible solutions to resolve the issue can also be determined and/or included in the user interface rendered and/or displayed by the client computing device 110. The possible solutions may be to reverse actions identified as being possible causes, suggest the installation of new hardware to replace failing or failed hardware, suggest new times to backup or restore a deduplication database 247 (e.g., suggest times that do not conflict with usual times in which deduplication pruning operations occur), suggest new times to initiate deduplication pruning operations (e.g., suggest times that do not conflict with usual times that secondary copy or restore operations occur), and/or the like.

At block 1510, one or more graphs corresponding to the anomalous processing and/or generation times is generated.

The graph(s) can be displayed in a user interface rendered and/or displayed by a client computing device 110. The graph(s) can depict the time to process archive files to be deleted and/or the time to generate a list of archive files or chunks to delete at different time instants over a period of time, with markings or annotations indicating which time instants correspond to anomalous times and/or which deduplication pruning operations are anomalous.

At block 1512, an alert that includes the generated graph(s) is generated. In addition to the graph(s), the alert can include a table with deduplication pruning information, acceptable ranges and/or ranges that were violated, and/or other visual or non-visual information.

Optionally, a filtering operation can be performed before an alert is generated. The filtering operation may result in no alert being generated even if the time to process archive files to be deleted and/or the time to generate a list of archive files or chunks to delete fall outside the acceptable ranges.

In some embodiments, a user or administrator can indicate that an alert should be silenced or that an alert is not wanted, in which case the alert may not be generated. After the alert is generated, the method 1500 is complete.

Automated Media Agent State Management

Figure 16:
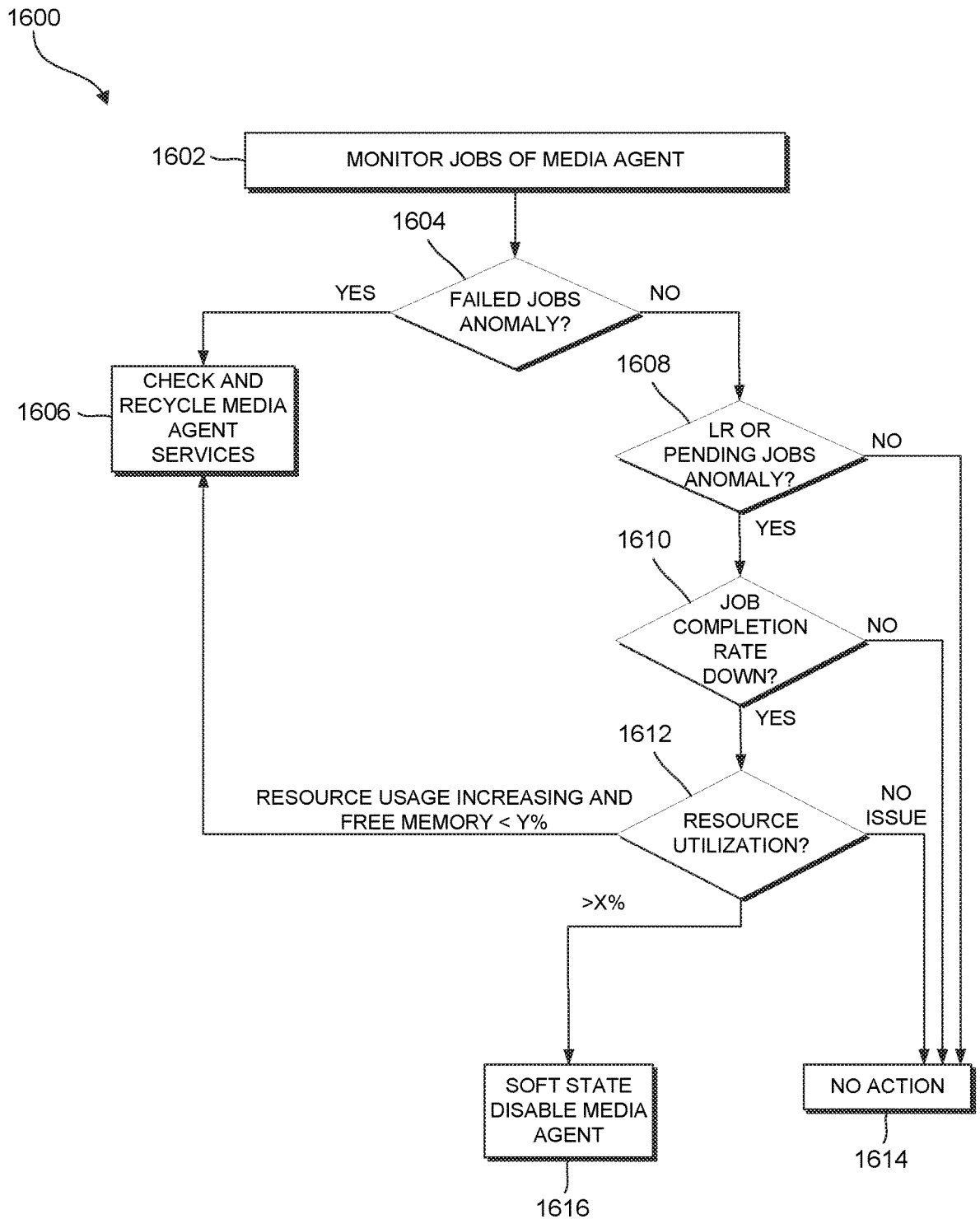
FIG. 16 depicts some salient operations of a method for determining a new state for a secondary storage computing device (e.g., a media agent), according to an embodiment.

FIG. 16 depicts some salient operations of a method 1600 for determining a new state for a secondary storage computing device 106 (e.g., a media agent 144), according to an embodiment. The method 1600 may be implemented, for example, by a storage manager, such as the storage manager 140 (e.g., the media agent manager 349). The method 1600 may start at block 1602.

At block 1602, jobs of a media agent are monitored. For example, the number of pending jobs, long running jobs, succeeded jobs, failed jobs, and/or the like may be monitored. The number of these different types of jobs may be monitored to determine whether any anomalies are present.

At block 1604, a determination is made as to whether the number of failed jobs is anomalous. If the number of failed jobs is anomalous, then the method 1600 proceeds to block 1606. Otherwise, if the number of failed jobs is not anomalous, then the method 1600 proceeds to block 1608.

The global job analyzer 346 may determine whether the number of failed jobs is anomalous and provide this information to the media agent manager 349. For example, the global job analyzer 346 can obtain jobs data corresponding to jobs initiated by one or more client computing devices 110 and run by a particular secondary storage computing device 106 that implements the media agent 144. The global job analyzer 346 can then determine whether the number of failed jobs, as indicated in the jobs data, deviates from an expected number and/or an expected trend. If there is a deviation, then the global job analyzer 346 determines that the number of failed jobs is anomalous.

At block 1606, media agent services are checked and recycled. For example, the media agent manager 349 may perform additional operations on the media agent 144 depending on the number of times the media agent 144 services have been checked and recycled over a threshold period of time. For example, the media agent manager 349 may take no action (e.g., not restart the media agent 144 services or disable the media agent 144), restart the media agent 144 services, or disable the media agent 144.

In some embodiments, the media agent manager 349 transitions the media agent 144 into the recycle services state, and then either transitions the media agent 144 back to a previous state, restarts the media agent 144 services, or disables the media agent 144. Alternatively, the media agent manager 349 does not transition the media agent 144 into the recycle services state, but rather keeps the media agent 144 in the current state, restarts the media agent 144 services, or disables the media agent 144.

At block 1608, a determination is made as to whether long running jobs, pending jobs, and/or both long running and pending jobs are anomalous. If such jobs are anomalous, then the method 1600 proceeds to block 1610. Otherwise, if such jobs are not anomalous, then the method 1600 proceeds to block 1614.

In some embodiments, long running jobs, pending jobs, and/or both long running and pending jobs being anomalous does not mean that the media agent 144 is performing poorly. For example, the media agent 144 may not be performing poorly if the job completion rate is still high.

At block 1610, a determination is made as to whether the job completion rate is down. For example, a comparison may be made between the number of running and succeeded jobs on the media agent 144 and the number of pending and long running jobs on the media agent 144. If the number of running and succeeded jobs is greater than the number of pending and long running jobs, then the job completion rate is not down. If the job completion rate is not down, then the method 1600 proceeds to block 1614. Otherwise, if the job completion rate is down, then the method 1600 proceeds to block 1612.

At block 1612, a determination is made as to the resource utilization of the media agent 144. If there is no issue with the resource utilization of the media agent 144, then the method 1600 proceeds to block 1614. For example, there may be no issue with the resource utilization if the memory usage of the media agent 144, the CPU usage of the media agent 144, and/or the like is below a threshold resource usage and/or the resource usage is not increasing constantly or at a constant or near constant rate.

Otherwise, if the resource usage is increasing (e.g., constantly or at a constant rate or near constant rate), the amount of memory storage capacity available for future jobs is less than a Y %, and/or the amount of CPU processing capabilities available for future jobs is less than a Z % (where Y and Z can be equal or different), then the method 1600 proceeds to block 1606. Thus, the media agent 144 services may be checked and recycled.

Otherwise, if the resource usage is greater than X % or is near or at a maximum usage level, then the method 1600 proceeds to block 1616.

At block 1614, no action is taken. Thus, the media agent 144 may remain in a current state. At block 1616, the media agent 144 is disabled. For example, the media agent 144 can be soft state disabled or completely disabled. When a media agent 144 is soft state disabled, no new jobs may be assigned to the media agent 144. The media agent 144, however, may continue to process existing jobs already assigned to the media agent 144 prior to the media agent 144 being soft state disabled. Any new jobs may be routed by the storage manager 140 to an alternate media agent 144, if available. When a media agent 144 is completely disabled, then the media agent 144 may not process any new or existing jobs. Rather, new and/or existing jobs may be routed by the storage manager 140 to an alternate media agent 144, if available.

Figure 17:
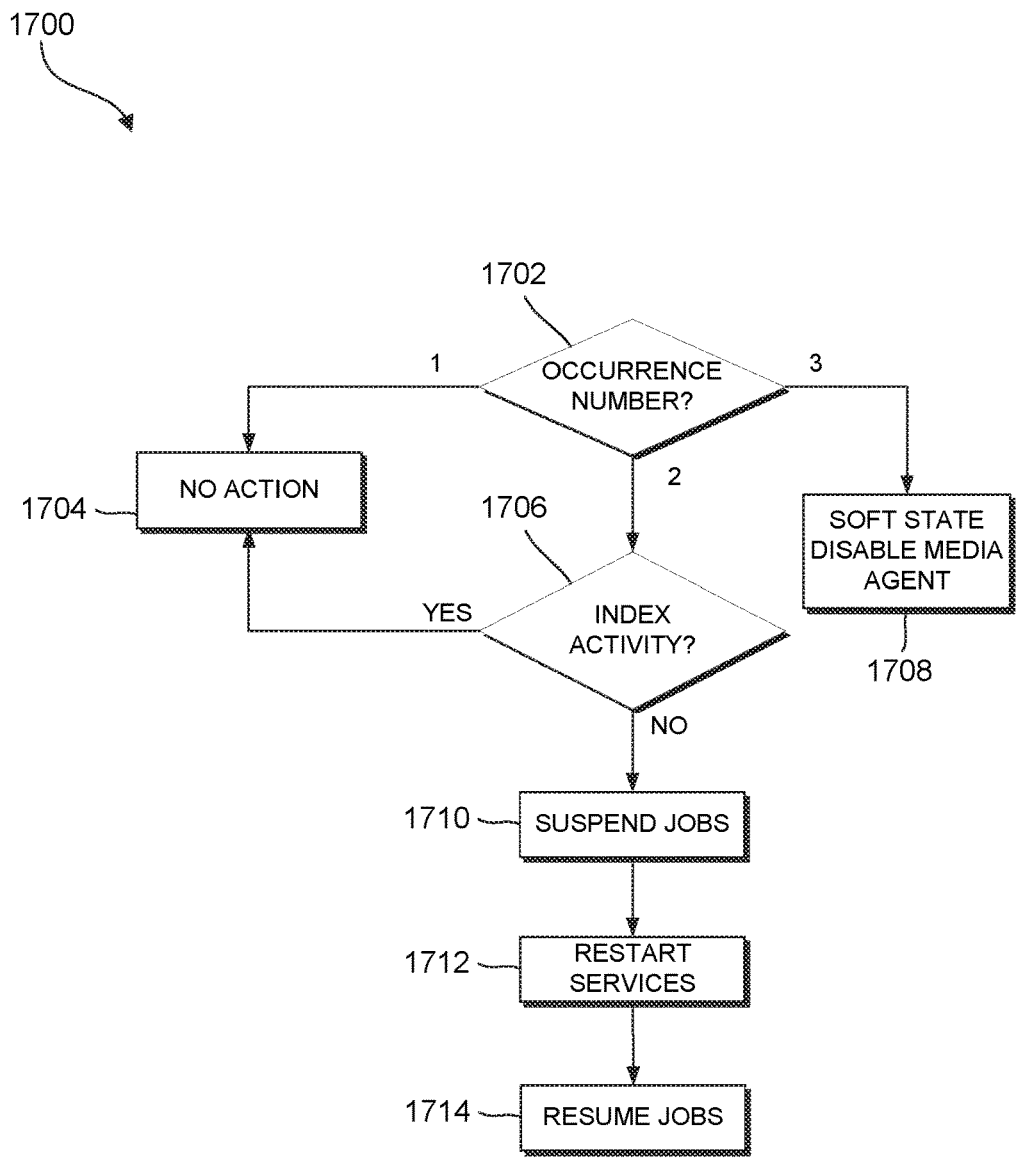
FIG. 17 depicts some salient operations of a method for checking and recycling secondary storage computing device services (e.g., media agent services), according to an embodiment.

FIG. 17 depicts some salient operations of a method 1700 for checking and recycling secondary storage computing device 106 services (e.g., media agent 144 services), according to an embodiment. The method 1700 may be implemented, for example, by a storage manager, such as the storage manager 140 (e.g., the media agent manager 349). The method 1700 may start at block 1702.

At block 1702, the number of times that a media agent 144 has been checked and recycled is determined. For example, the media agent manager 349 may determine the number of times the media agent 144 has been checked and recycled within a threshold period of time. If this is the first occurrence, then the method 1700 proceeds to block 1704. Otherwise, if this is the second occurrence, then the method 1700 proceeds to block 1706. Otherwise, if this is the third (or more) occurrence, then the method 1700 proceeds to block 1708.

At block 1704, no action is taken. Thus, the media agent manager 349 can transition the media agent 144 back to a previous state or the media agent manager 349 can maintain the current state of the media agent 144 (e.g., if the media agent 144 was not previously transitioned to the recycle services state).

At block 1706, a determination is made as to whether index activity is occurring on the media agent 144. For example, indexing activity may be occurring on the media agent 144 if, for example, the media agent 144 is performing secondary copy operations.

If indexing activity is occurring, then the method 1700 reverts to block 1704. Thus, the media agent manager 349 takes no action because indexing is occurring. Otherwise, if indexing activity is not occurring, then the method 1700 proceeds to block 1710.

At block 1708, the media agent is disabled. For example, the media agent may be soft state disabled or completely disabled.

In some embodiments, the media agent 144 may be re-enabled after some time. For example, the media agent 144 may be re-enabled if the media agent 144 services have not been checked and recycled more than a threshold number of times within a threshold period of time.

At block 1710, jobs on the media agent 144 are suspended. For example, the jobs may be suspended so that the media agent services 144 can be restarted, which occurs at block 1712. Once the media agent services 144 have been restarted, then the jobs on the media agent 144 are resumed, as shown at block 1714.

In some embodiments, restarting services of the media agent 144 can resolve issues that cause an anomalous number of failed jobs or excess resource utilization. In other embodiments, restarting services of the media agent 144 does not resolve these issues, and the media agent 144 may eventually be disabled and an alternate media agent 144 may process jobs in place of the media agent 144.

Figure 18:
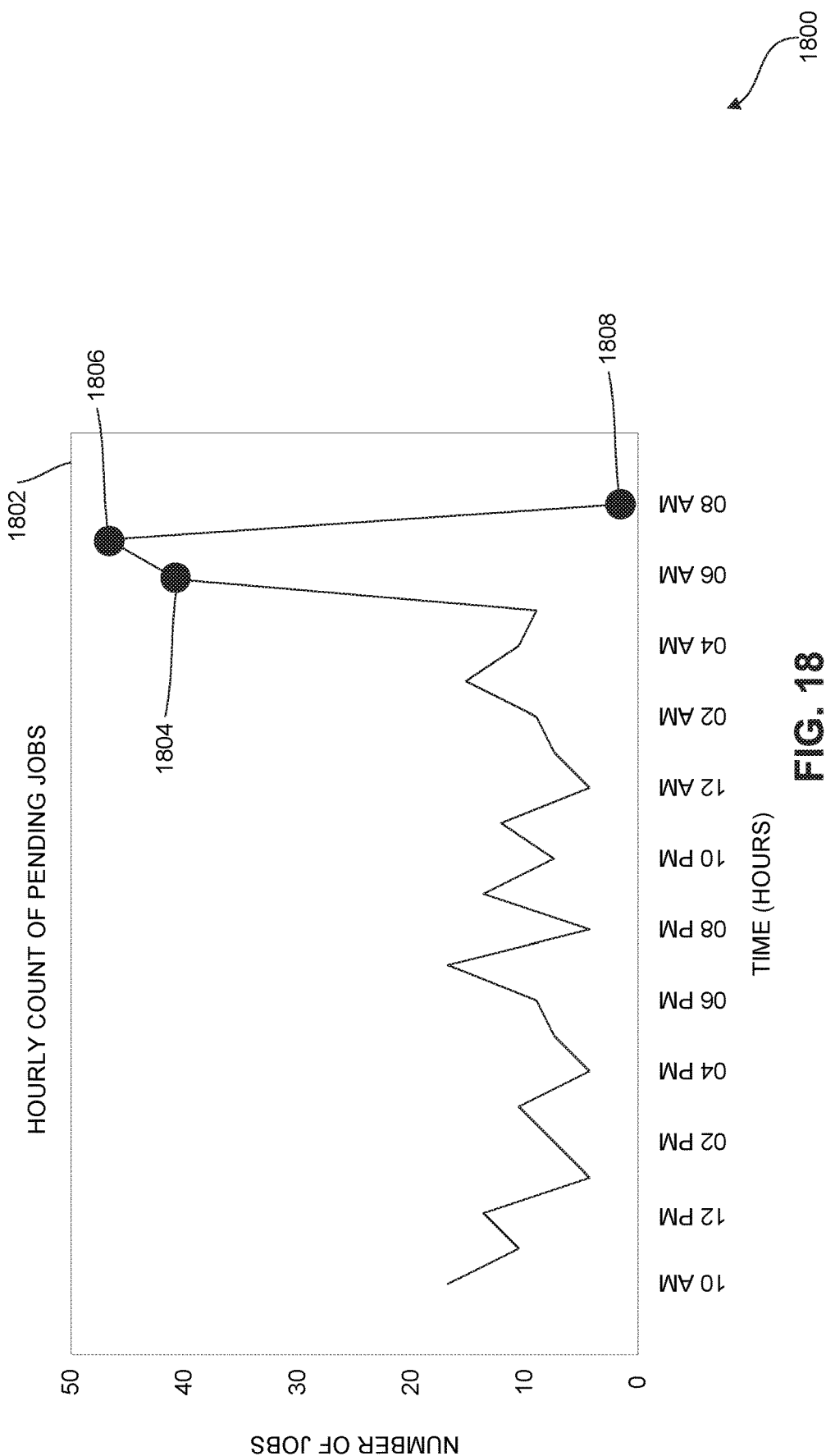
FIG. 18 depicts another graphical user interface showing an hourly count of pending jobs running on a secondary storage computing device (e.g., a media agent).

FIG. 18 depicts another graphical user interface 1800 showing an hourly count of pending jobs running on a secondary storage computing device 106 (e.g., a media agent 144). The graphical user interface 1800 can be generated by the storage manager 140 (e.g., the media agent manager 349) or another component in the system 300.

As illustrated in FIG. 18, the graphical user interface 1800 includes a graph 1802. The graph 1802 depicts the number of pending jobs hour by hour for a particular media agent 144. As shown in the graph 1802, the number of pending jobs remains relatively stable until around 5:00 AM, at which point the number of pending jobs spikes to point 1804 at 6:00 AM. The number of pending jobs at point 1804 may be above a threshold, so the storage manager 140 may continue to monitor the number of pending jobs for another hour.

As shown at 7:00 AM, the number of pending jobs has continued to increase (e.g., from point 1804 to point 1806). Thus, the storage manager 140 may set the media agent 144 to be transitioned to a recycle services state or a disabled state depending on the resource usage of the media agent 144 and/or other performance indicators.

By 8:00 AM, the storage manager 140 has changed the state of the media agent 144 (e.g., restarted the media agent 144 services or disabled the media agent 144). As a result of the state change, the number of pending jobs has dropped from point 1806 to point 1808. Thus, the state change helped resolve the issue that was causing the rise in the number of pending jobs.

Figure 19:
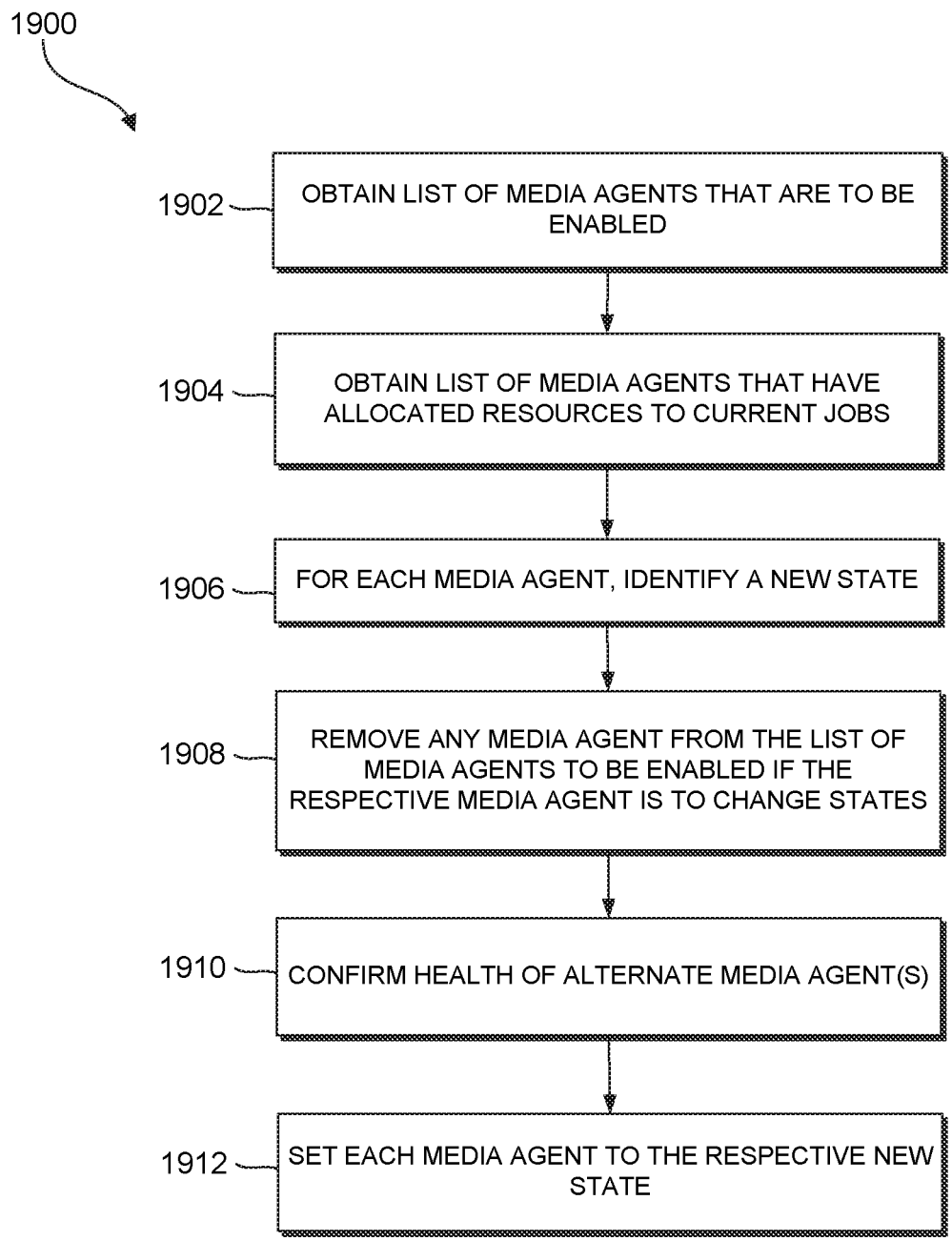
FIG. 19 depicts some salient operations of a method for transitioning secondary storage computing devices (e.g., media agents) to new states, according to an embodiment.

FIG. 19 depicts some salient operations of a method 1900 for transitioning secondary storage computing devices 106 (e.g., media agents 144) to new states, according to an embodiment. The method 1900 may be implemented, for example, by a storage manager, such as the storage manager 140 (e.g., the media agent manager 349). The method 1900 may start at block 1902.

At block 1902, a list of media agents 144 that are to be enabled is obtained. For example, the media agents 144 in the list may have been disabled previously for have services checked and recycled too often, for having an anomalous number of long running and/or pending jobs, and/or for having a high resource usage.

The media agents 144 on the enable list may be placed therein by the media agent manager 349 because the media agents 144 have not had services checked and recycled too often. Alternatively or in addition, the media agents 144 on the enable list may be placed therein by the media agent manager 349 because a majority of the media agent 144 resource usage statistics entries indicate that the resource usage is less than a threshold value (e.g., 90%).

At block 1904, a list of media agents 144 that have allocated resources to current jobs is obtained. For example, this list may include media agents 144 that are or should be processing secondary copy operation jobs.

At block 1906, a new state is identified for each media agent 144 on one or both of the lists. For example, the new state can be the current state of the media agent 144 if the media agent 144 is performing well.

As another example, the new state can be a recycle services state. As another example, the new state can be a disabled state. The new state may be determined based on whether the media agent 144 has an anomalous number of a certain type of job and/or the resource usage by the media agent 144.

At block 1908, any media agent 144 that is to change states to a new state is removed from the list of media agents 144 to be enabled. For example, such media agents 144 may be removed from the enable list because the new state for these media agents 144 may not be an enable state, but may be a recycle services state or a disabled state.

At block 1910, health of alternate media agent(s) 144 is confirmed. For example, the health of alternate media agent(s) 144 can be confirmed using a count of a number of pending jobs, long running jobs, failed jobs, succeeded jobs, etc. on each alternate media agent 144.

The health of alternate media agent(s) 144 may be confirmed prior to the media agents 144 of one or both lists being transitioned to the corresponding new state. For example, the health of alternate media agent(s) 144 may be checked first to ensure that at least one alternate media agent 144 is available and healthy to take over for a media agent 144 to be disabled.

At block 1912, each media agent is set to the respective new state. Thus, the media agent manager 349 can take no action, restart services of a media agent 144, or disable a media agent 144.

Figure 20:
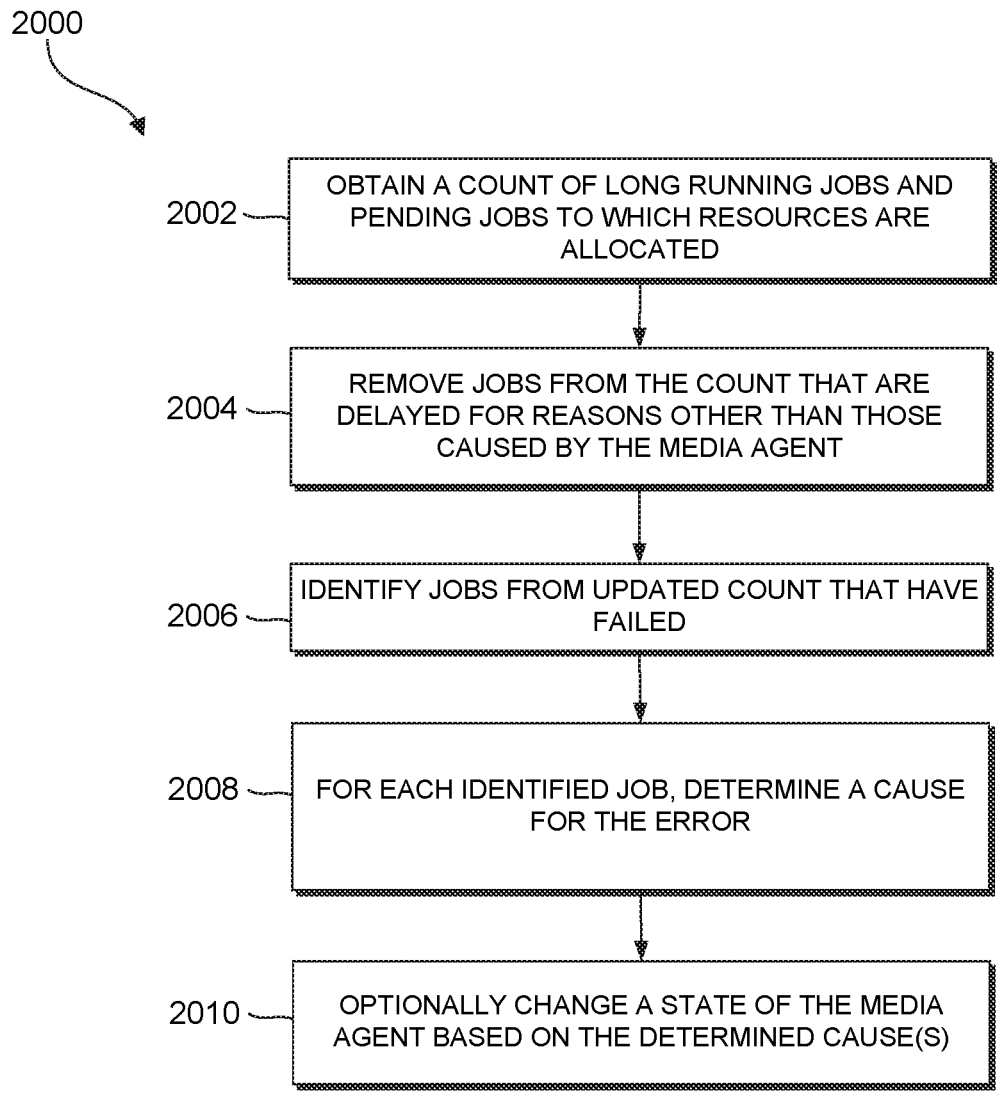
FIG. 20 depicts some salient operations of a method for determining a new state for a secondary storage computing device (e.g., a media agent), according to an embodiment.

FIG. 20 depicts some salient operations of a method 2000 for determining a new state for a secondary storage computing device 106 (e.g., a media agent 144), according to an embodiment. The method 2000 may be implemented, for example, by a storage manager, such as the storage manager 140 (e.g., the media agent manager 349). The method 2000 may start at block 2002.

At block 2002, a count of long running jobs and pending jobs to which resources are allocated is obtained. For example, the count may be obtained for a media agent 144.

At block 2004, jobs from the count that are delayed for reasons other than those caused by the media agent 144 are removed. For example, the media agent 144 should not be penalized for jobs that delayed for reasons other than media agent 144 performance.

The types of reasons that a job can be delayed other than because of the media agent 144 include a user suspended the job; an edge drive backup cannot run because the edge drive backup is in a paused state; a small number of valid archive files are missing in index logs, a loss of a control process occurred (e.g., because the control process unexpectedly died, communication to the control process machine failed due to network errors, the control process machine failed over to another control process machine in a cluster, the control process machine may have rebooted, etc.); the secondary storage computing device 106 is waiting for the services of the client computing device 110 to come online; a synthetic full job was suspended by a user; the job was initiated by an automatic schedule and is ready to be resumed by a client computing device 110; data management activity on a client computing device has been disabled; backup activity for a subclient on a client computing device 110 and/or for a data agent 142 has been disabled; backup activity for a subclient on a client computing device 110, a data agent 142, and/or an instance has been disabled; some or all activity on the storage manager 140 is disabled; data management activity on the storage manager 140 is disabled; there was a failure to validate the credentials of an instance; there was a failure to register a job; a full operation window for a client computing device 110 prevents a secondary copy operation from running; and/or the like. The media agent manager 349 can identify a reason for delay based on jobs data retrieved from the storage manager database 146, based on possible cause information provided by the long running detector 344, and/or based on possible cause information provided by the global job analyzer 346.

At block 2006, jobs from the updated count that have failed are identified. For example, the media agent manager 349 may identify pending, long running jobs that have failed because of the media agent 144.

At block 2008, a cause for the error is determined for each identified job. For example, the cause could be high media agent 144 resource usage or constantly increasing media agent 144 resource usage. The cause could also be an anomaly caused by a hardware or software failure, such as a failure of the secondary storage computing device 106 hardware and/or the media agent 144 software.

At block 2010, a state of the media agent 144 is optionally changed based on the determined cause(s). For example, if the cause is high resource usage, the state of the media agent 144 may be changed to a disabled state.

As another example, if the cause is constantly increasing resource usage, then the state of the media agent 144 may be changed to a recycle services state. In the recycle services state, the state of the media agent 144 may revert to a previous state, may result in a restart of the media agent 144 services, or may change to a disabled state.

Figure 21:
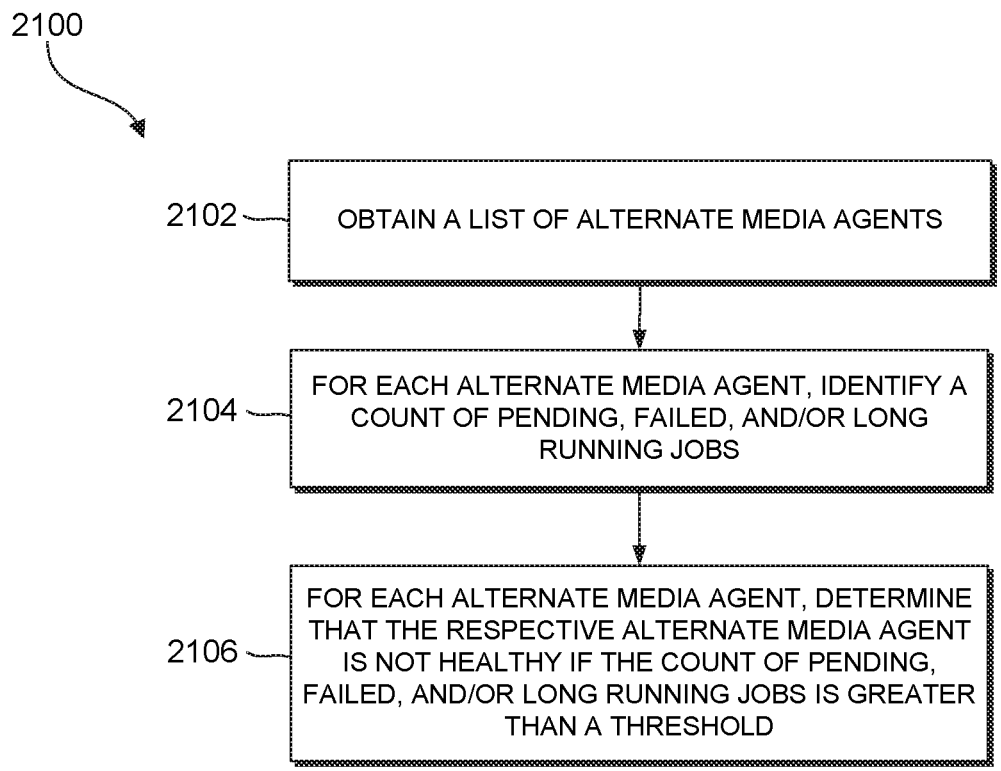
FIG. 21 depicts some salient operations of a method for determining a health of an alternate secondary storage computing device (e.g., an alternate media agent), according to an embodiment.

FIG. 21 depicts some salient operations of a method 2100 for determining a health of an alternate secondary storage computing device 106 (e.g., an alternate media agent 144), according to an embodiment. The method 2100 may be implemented, for example, by a storage manager, such as the storage manager 140 (e.g., the media agent manager 349). The method 2100 may start at block 2102.

At block 2102, a list of alternate media agents 144 is obtained. The list may be obtained based on storage policy copies associated with a media agent 144.

At block 2104, for each alternate media agent, a count of pending, failed, and/or long running jobs is identified. For example, the count may be obtained directly from the respective alternate media agent. As another example, the count may be obtained from jobs data stored in the storage manager database 146.

In some embodiments, the count of pending, failed, and/or long running jobs may indicate whether the alternate media agent 144 can accept additional jobs. For example, a low count may indicate that the alternate media agent 144 can accept additional jobs, and a high count may indicate that the alternate media agent 144 cannot accept additional jobs.

At block 2106, for each alternate media agent, a 144 determination is made that the respective alternate media agent 144 is not healthy if the count of pending, failed, and/or long running jobs is greater than a threshold. Alternatively, for each alternate media agent 144, a determination is made that the respective alternate media agent 144 is healthy if the count of pending, failed, and/or long running jobs is less than or equal to the threshold.

If at least one alternate media agent 144 from the list associated with a media agent 144 is healthy, then the media agent 144 can be disabled and an alternate media agent 144 that is healthy can perform secondary copy operation jobs in place of the media agent 144. The media agent 144 can later be enabled again, which causes the secondary copy operation jobs to be re-routed from the alternate media agent 144 to the media agent 144.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, the anomaly detection and reporting functionality described herein as being performed by the storage manager 140 can be performed by a component external to the storage manager 140, not shown, in place of or in conjunction with the storage manager 140. The external component can store event and/or jobs data, and/or retrieve such data from the storage manager 140, the client computing device(s) 110, the secondary storage computing device(s) 106, and/or the like.

Example Embodiments

Some example enumerated embodiments are recited in this section in the form of methods, systems, and non-transitory computer-readable media, without limitation.

One aspect of the disclosure provides a networked information management system comprising a client computing device having one or more first hardware processors, where a first type of event occurs on the client computing device. The networked information management system further comprises one or more computing devices in communication with the client computing device, where the one or more computing devices are configured with computer-executable instructions that, when executed, cause the one or more computing devices to: retrieve event data corresponding to the first type of event and the client computing device; perform a time-series decomposition of the event data; analyze a component of the decomposed time-series to determine an acceptable range for a number of occurrences of the first type of event; determine not to expand the acceptable range in response to an indication that a number of alerts generated for the first type of event is less than a threshold; determine that an anomaly exists at a first time in response to a determination that a number of occurrences of the first type of event falls outside the acceptable range; and generate an alert for the detected anomaly.

The networked information management system of the preceding paragraph can include any sub-combination of the following features: where the computer-executable instructions, when executed, further cause the one or more computing devices to perform the time-series decomposition of the event data to form a trend component, a seasonal component, and an error component; where the computer-executable instructions, when executed, further cause the one or more computing devices to analyze the error component to determine the acceptable range for the number of occurrences of the first type of event; where the computer-executable instructions, when executed, further cause the one or more computing devices to determine that a second anomaly exists at the first time in response to a determination that a duration between occurrences of the first type of event falls outside a second acceptable range; where the duration between occurrences of the first type of event is less than a lower extreme of the second acceptable range; where the number of occurrences of the first type of event is greater than an upper limit of the acceptable range; and where the number of occurrences of the first type of event is less than a lower limit of the acceptable range.

Another aspect of the disclosure provides a computer-implemented method comprising: retrieving event data corresponding to a first type of event that occurs on a client computing device; performing a time-series decomposition of the event data; analyzing a component of the decomposed time-series to determine an acceptable range for a number of occurrences of the first type of event; determining not to expand the acceptable range in response to an indication that a number of alerts generated for the first type of event is less than a threshold; determining that an anomaly exists at a first time in response to a determination that a number of occurrences of the first type of event falls outside the acceptable range; and generating an alert for the detected anomaly.

The computer-implemented method of the preceding paragraph can include any sub-combination of the following features: where performing the time-series decomposition further comprises performing the time-series decomposition of the event data to form a trend component, a seasonal component, and an error component; where analyzing a component of the decomposed time-series further comprises analyzing the error component to determine the acceptable range for the number of occurrences of the first type of event; where the computer-implemented method further comprises determining that a second anomaly exists at the first time in response to a determination that a duration between occurrences of the first type of event falls outside a second acceptable range; where the duration between occurrences of the first type of event is less than a lower extreme of the second acceptable range; where the number of occurrences of the first type of event is greater than an upper limit of the acceptable range; and where the number of occurrences of the first type of event is less than a lower limit of the acceptable range.

Another aspect of the disclosure provides non-transitory computer-readable medium storing instructions, which when executed by one or more computing devices, cause the one or more computing devices to perform a method comprising: retrieving event data corresponding to a first type of event that occurs on a client computing device; performing a time-series decomposition of the event data; analyzing a component of the decomposed time-series to determine an acceptable range for a number of occurrences of the first type of event; determining not to expand the acceptable range in response to an indication that a number of alerts generated for the first type of event is less than a threshold; determining that an anomaly exists at a first time in response to a determination that a number of occurrences of the first type of event falls outside the acceptable range; and generating an alert for the detected anomaly.

The non-transitory computer-readable medium of the preceding paragraph can include any sub-combination of the following features: where the method further comprises performing the time-series decomposition of the event data to form a trend component, a seasonal component, and an error component; where the method further comprises analyzing the error component to determine the acceptable range for the number of occurrences of the first type of event; where the method further comprises determining that a second anomaly exists at the first time in response to a determination that a duration between occurrences of the first type of event falls outside a second acceptable range; where the duration between occurrences of the first type of event is less than a lower extreme of the second acceptable range; and where the number of occurrences of the first type of event is greater than an upper limit of the acceptable range.

Another aspect of the disclosure provides a networked information management system comprising a client computing device having one or more first hardware processors, where the client computing device is associated with a first job. The networked information management system further comprises one or more computing devices in communication with the client computing device, where the one or more computing devices are configured with computer-executable instructions that, when executed, cause the one or more computing devices to: retrieve jobs data corresponding to the first job and the first client computing device; perform a time-series decomposition of the jobs data; analyze a component of the decomposed time-series to determine at least one of an acceptable range for time to perform the first job, an acceptable range for a size of secondary copy data associated with the first job, or an acceptable range for a number of job attempts until the first job is complete; determine a possible cause for the first job running longer than the acceptable range for time to perform the first job in response to the first job at a first time running longer than the acceptable range for time to perform the first job; determine whether any events corresponding to the first job are anomalous; and generate an alert in response to at least one of the first job running longer or a first event corresponding to the first job being anomalous.

Another aspect of the disclosure provides a computer-implemented method comprising: retrieving jobs data corresponding to a first job and a first client computing device; performing a time-series decomposition of the jobs data; analyzing a component of the decomposed time-series to determine at least one of an acceptable range for time to perform the first job, an acceptable range for a size of secondary copy data associated with the first job, or an acceptable range for a number of job attempts until the first job is complete; determining a possible cause for the first job running longer than the acceptable range for time to perform the first job in response to the first job at a first time running longer than the acceptable range for time to perform the first job; determining whether any events corresponding to the first job are anomalous; and generating an alert in response to at least one of the first job running longer or a first event corresponding to the first job being anomalous.

Another aspect of the disclosure provides a non-transitory computer-readable medium storing instructions, which when executed by one or more computing devices, cause the one or more computing devices to perform a method comprising: retrieving jobs data corresponding to a first job and a first client computing device; performing a time-series decomposition of the jobs data; analyzing a component of the decomposed time-series to determine at least one of an acceptable range for time to perform the first job, an acceptable range for a size of secondary copy data associated with the first job, or an acceptable range for a number of job attempts until the first job is complete; determining a possible cause for the first job running longer than the acceptable range for time to perform the first job in response to the first job at a first time running longer than the acceptable range for time to perform the first job; determining whether any events corresponding to the first job are anomalous; and generating an alert in response to at least one of the first job running longer or a first event corresponding to the first job being anomalous.

Another aspect of the disclosure provides a networked information management system comprising one or more client computing devices each having one or more first hardware processors, where the one or more client computing devices are associated with a plurality of jobs. The networked information management system further comprises one or more computing devices in communication with the client computing device, where the one or more computing devices are configured with computer-executable instructions that, when executed, cause the one or more computing devices to: retrieve jobs data corresponding to the plurality of jobs; perform a time-series decomposition of the jobs data; analyze a component of the decomposed time-series to determine at least one of an acceptable range for succeeded jobs in the plurality of jobs, an acceptable range for failed jobs in the plurality of jobs, an acceptable range for killed jobs in the plurality of jobs, an acceptable range for suspended jobs in the plurality of jobs, or an acceptable range for pending jobs in the plurality of jobs; determine a possible cause for at least one of the succeeded jobs, the failed jobs, the killed jobs, the suspended jobs, or the pending jobs falling outside the respective acceptable range; generate a graph corresponding to a number of succeeded jobs, failed jobs, killed jobs, suspended jobs, and pending jobs; and generate an alert indicating an anomalous status of at least one of the succeeded jobs, the failed jobs, the killed jobs, the suspended jobs, or the pending jobs, where the alert includes the generated graph.

Another aspect of the disclosure provides a computer-implemented method comprising: retrieving jobs data corresponding to a plurality of jobs; performing a time-series decomposition of the jobs data; analyzing a component of the decomposed time-series to determine at least one of an acceptable range for succeeded jobs in the plurality of jobs, an acceptable range for failed jobs in the plurality of jobs, an acceptable range for killed jobs in the plurality of jobs, an acceptable range for suspended jobs in the plurality of jobs, or an acceptable range for pending jobs in the plurality of jobs; determining a possible cause for at least one of the succeeded jobs, the failed jobs, the killed jobs, the suspended jobs, or the pending jobs falling outside the respective acceptable range; generating a graph corresponding to a number of succeeded jobs, failed jobs, killed jobs, suspended jobs, and pending jobs; and generating an alert indicating an anomalous status of at least one of the succeeded jobs, the failed jobs, the killed jobs, the suspended jobs, or the pending jobs, where the alert includes the generated graph.

Another aspect of the disclosure provides a non-transitory computer-readable medium storing instructions, which when executed by one or more computing devices, cause the one or more computing devices to perform a method comprising: retrieving jobs data corresponding to a plurality of jobs; performing a time-series decomposition of the jobs data; analyzing a component of the decomposed time-series to determine at least one of an acceptable range for succeeded jobs in the plurality of jobs, an acceptable range for failed jobs in the plurality of jobs, an acceptable range for killed jobs in the plurality of jobs, an acceptable range for suspended jobs in the plurality of jobs, or an acceptable range for pending jobs in the plurality of jobs; determining a possible cause for at least one of the succeeded jobs, the failed jobs, the killed jobs, the suspended jobs, or the pending jobs falling outside the respective acceptable range; generating a graph corresponding to a number of succeeded jobs, failed jobs, killed jobs, suspended jobs, and pending jobs; and generating an alert indicating an anomalous status of at least one of the succeeded jobs, the failed jobs, the killed jobs, the suspended jobs, or the pending jobs, where the alert includes the generated graph.

Another aspect of the disclosure provides a networked information management system comprising a deduplication database. The networked information management system further comprises one or more computing devices in communication with the deduplication database, where the one or more computing devices are configured with computer-executable instructions that, when executed, cause the one or more computing devices to: retrieve deduplication pruning information associated with the deduplication database; perform a time-series decomposition of the deduplication pruning information; analyze a component of the decomposed time-series to determine an acceptable range for a time to process archive files to be deleted; determine that an anomaly exists at a first time in response to a determination that a time to process archive files to be deleted at the first time falls outside the acceptable range; and generate an alert for the detected anomaly.

The networked information management system of the preceding paragraph can include any sub-combination of the following features: where the computer-executable instructions, when executed, further cause the one or more computing devices to perform the time-series decomposition of the deduplication pruning information to form a trend component, a seasonal component, and an error component; where the computer-executable instructions, when executed, further cause the one or more computing devices to analyze the error component to determine the acceptable range for the time to process archive files to be deleted; where the computer-executable instructions, when executed, further cause the one or more computing devices to analyze the component of the decomposed time-series to determine a second acceptable range for a time to generate a list of archive files to delete; where the acceptable range comprises one or an absolute time value or a delta time value; where the time to process archive files to be deleted at the first time is greater than an upper limit of the acceptable range; where the time to process archive files to be deleted at the first time is less than a lower limit of the acceptable range; where the computer-executable instructions, when executed, further cause the one or more computing devices to generate a graph indicating the anomaly for display in a user interface rendered by a client computing device; where the computer-executable instructions, when executed, further cause the one or more computing devices to determine a possible cause of the anomaly in response to the determination that the anomaly exists; where the computer-executable instructions, when executed, further cause the one or more computing devices to determine a possible solution to resolve the anomaly based on the determined possible cause; and where the deduplication pruning information comprises at least one of a count of a number of archive files that the deduplication database has yet to process to update a table, a count of a number of archive files identified as only having data blocks for which a reference count is zero, or a time since a last list of archive files that only include data blocks for which the reference count is zero was generated by the deduplication database.

Another aspect of the disclosure provides a computer-implemented method comprising: retrieving deduplication pruning information associated with a deduplication database; performing a time-series decomposition of the deduplication pruning information; analyzing a component of the decomposed time-series to determine an acceptable range for a time to process archive files to be deleted; determining that an anomaly exists at a first time in response to a determination that a time to process archive files to be deleted at the first time falls outside the acceptable range; and generating an alert for the detected anomaly.

The computer-implemented method of the preceding paragraph can include any sub-combination of the following features: where performing a time-series decomposition further comprises performing the time-series decomposition of the deduplication pruning information to form a trend component, a seasonal component, and an error component; where analyzing a component of the decomposed time-series further comprises analyzing the error component to determine the acceptable range for the time to process archive files to be deleted; where the computer-implemented method further comprises analyzing the component of the decomposed time-series to determine a second acceptable range for a time to generate a list of archive files to delete; where the acceptable range comprises one or an absolute time value or a delta time value; where the time to process archive files to be deleted at the first time is greater than an upper limit of the acceptable range; where the time to process archive files to be deleted at the first time is less than a lower limit of the acceptable range; where the computer-implemented method further comprises determining a possible cause of the anomaly in response to the determination that the anomaly exists, and determining a possible solution to resolve the anomaly based on the determined possible cause; and where the deduplication pruning information comprises at least one of a count of a number of archive files that the deduplication database has yet to process to update a table, a count of a number of archive files identified as only having data blocks for which a reference count is zero, or a time since a last list of archive files that only include data blocks for which the reference count is zero was generated by the deduplication database.

Another aspect of the disclosure provides a networked information management system comprising a first secondary storage computing device. The networked information management system further comprises one or more computing devices in communication with the secondary storage computing device, where the one or more computing devices are configured with computer-executable instructions that, when executed, cause the one or more computing devices to: determine that the first secondary storage computing device has computing resources allocated to a current job; identify a new state for the first secondary storage computing device based at least in part on the current job, where the new state is a disabled state; determine that at least one alternate secondary storage computing device associated with the first secondary storage computing device is healthy; and disable the first secondary storage computing device.

The networked information management system of the preceding paragraph can include any sub-combination of the following features: where the computer-executable instructions, when executed, further cause the one or more computing devices to obtain a list of secondary storage computing devices to be enabled; where the computer-executable instructions, when executed, further cause the one or more computing devices to: identify a second new state for a second secondary storage computing device present on the list, remove the second secondary storage computing device from the list in response to the identification of the new state, and set the second secondary storage computing device to the second new state; where the computer-executable instructions, when executed, further cause the one or more computing devices to: monitor jobs of the first secondary storage computing device, determine that a number of failed jobs of the first secondary storage computing device is anomalous, determine that services of the first secondary storage computing device were refreshed within a threshold period of time of the determination that the number of failed jobs of the first secondary storage computing device is anomalous, and set the new state of the first secondary storage computing device to be the disable state; where the computer-executable instructions, when executed, further cause the one or more computing devices to: monitor jobs of the first secondary storage computing device, determine that a number of failed jobs of the first secondary storage computing device is not anomalous, determine that a number of long running or pending jobs is anomalous, determine that a job completion rate of the first secondary storage computing device has fallen from a first level to a second level below the first level, determine that an amount of computing resources used by the first secondary storage computing device is above a threshold value, and set the new state of the first secondary storage computing device to be the disable state; where the computer-executable instructions, when executed, further cause the one or more computing devices to train a neural network that outputs the threshold value; where the computer-executable instructions, when executed, further cause the one or more computing devices to: obtain a list of alternate secondary storage computing devices associated with the first secondary storage computing device, for each alternate secondary storage computing device in the list, identify a number of pending jobs, failed jobs, and long running jobs, and determine that, for the at least one alternate secondary storage computing device, the number of pending jobs, failed jobs, and long running jobs is below a threshold value; where the computer-executable instructions, when executed, further cause the one or more computing devices to route future jobs to the at least one alternate secondary storage computing device instead of to the first secondary storage computing device; where the computer-executable instructions, when executed, further cause the one or more computing devices to place the first secondary storage computing device on a list of secondary storage computing devices to enable in response to services of the first secondary storage computing device not being restarted within a threshold period of time; where the computer-executable instructions, when executed, further cause the one or more computing devices to re-enable the first secondary storage computing device after placing the first secondary storage computing device on the list of secondary storage computing devices to enable; and where the computer-executable instructions, when executed, further cause the one or more computing devices to route future jobs to the first secondary storage computing device instead of the at least one alternate storage computing device after re-enabling the first secondary storage computing device.

Another aspect of the disclosure provides a computer-implemented method comprising: determining, by a storage manager in a networked information management system, that a first secondary storage computing device in the networked information management system has computing resources allocated to a current job; identifying a new state for the first secondary storage computing device based at least in part on the current job, where the new state is a disabled state; determining that at least one alternate secondary storage computing device associated with the first secondary storage computing device is healthy; and disabling the first secondary storage computing device.

The computer-implemented method of the preceding paragraph can include any sub-combination of the following features: where the computer-implemented method further comprises obtaining a list of secondary storage computing devices to be enabled; where the computer-implemented method further comprises: identifying a second new state for a second secondary storage computing device present on the list, removing the second secondary storage computing device from the list in response to the identification of the new state, and setting the second secondary storage computing device to the second new state; where identifying a new state for the first secondary storage computing device further comprises: monitoring jobs of the first secondary storage computing device, determining that a number of failed jobs of the first secondary storage computing device is anomalous, determining that services of the first secondary storage computing device were refreshed within a threshold period of time of the determination that the number of failed jobs of the first secondary storage computing device is anomalous, and setting the new state of the first secondary storage computing device to be the disable state; where identifying a new state for the first secondary storage computing device further comprises: monitoring jobs of the first secondary storage computing device, determining that a number of failed jobs of the first secondary storage computing device is not anomalous, determining that a number of long running or pending jobs is anomalous, determining that a job completion rate of the first secondary storage computing device has fallen from a first level to a second level below the first level, determining that an amount of computing resources used by the first secondary storage computing device is above a threshold value, and setting the new state of the first secondary storage computing device to be the disable state; where the computer-implemented method further comprises training a neural network that outputs the threshold value; where determining that at least one alternate secondary storage computing device associated with the first secondary storage computing device is healthy further comprises: obtaining a list of alternate secondary storage computing devices associated with the first secondary storage computing device, for each alternate secondary storage computing device in the list, identifying a number of pending jobs, failed jobs, and long running jobs, and determining that, for the at least one alternate secondary storage computing device, the number of pending jobs, failed jobs, and long running jobs is below a threshold value; where the computer-implemented method further comprises routing future jobs to the at least one alternate secondary storage computing device instead of to the first secondary storage computing device; where the computer-implemented method further comprises placing the first secondary storage computing device on a list of secondary storage computing devices to enable in response to services of the first secondary storage computing device not being restarted within a threshold period of time.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects are presented below in certain claim forms, but the applicant contemplates other aspects in any number of claim forms. For example, while only one aspect may be recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An information management system comprising:
   a first secondary storage computing device comprising one or more hardware processors; and
   one or more computing devices comprising one or more hardware processors, wherein the one or more computing devices are in communication with the first secondary storage computing device, and wherein the one or more computing devices are configured with computer-executable instructions that, when executed, cause the one or more computing devices to:
   determine that the first secondary storage computing device is allocated to a current job that comprises secondary copy operations;
   determine that the first secondary storage computing device is performing anomalously compared to one or more values measured for jobs previously allocated to the first secondary storage computing device over a period of time, wherein the one or more values correspond to one or more of: jobs running longer than expected, pending jobs, failed jobs, suspended jobs, killed jobs, and jobs successfully completed;

based on determining that the first secondary storage computing device is performing anomalously, identify an alternate secondary storage computing device, distinct from the first secondary storage computing device, wherein the alternate secondary storage computing device does not exceed one or more threshold values corresponding to one or more of: pending jobs, failed jobs, and jobs running longer than expected, that are allocated to the alternate secondary storage computing device; and based on determining that the one or more threshold values are not exceeded at the alternate secondary storage computing device: route future jobs that comprise secondary copy operations to the alternate secondary storage computing device instead of to the first secondary storage computing device.

2. The information management system of claim 1, wherein the computer-executable instructions, when executed, further cause the one or more computing devices to: place the first secondary storage computing device into a disabled state, based on determining that the first secondary storage computing device is performing anomalously, and while the first secondary storage computing device is in the disabled state, route the future jobs to the alternate secondary storage computing device instead of to the first secondary storage computing device.

3. The information management system of claim 2, wherein the computer-executable instructions, when executed, further cause the one or more computing devices to: based on determining that services of the first secondary storage computing device were previously recycled within a threshold period of time, maintain the disabled state for the first secondary storage computing device.

4. The information management system of claim 1, wherein the first secondary storage computing device is deviating from a trend that comprises the one or more values measured for the first secondary storage computing device over the period of time.

5. The information management system of claim 1, wherein the one or more values measured for the first secondary storage computing device over the period of time comprise an expected trend, and wherein the first secondary storage computing device is performing anomalously by deviating from the expected trend.

6. The information management system of claim 1, wherein the alternate secondary storage computing device is associated with the first secondary storage computing device based on a storage policy.

7. The information management system of claim 1, wherein the computer-executable instructions, when executed, further cause the one or more computing devices to: based on determining that services of the first secondary storage computing device were previously recycled within a threshold period of time, continue to route the future jobs to the alternate secondary storage computing device instead of to the first secondary storage computing device.

8. The information management system of claim 1, wherein determining that the first secondary storage computing device is performing anomalously is further based on a measure of usage of computing resources of the first secondary storage computing device exceeding a threshold value.

9. The information management system of claim 1, wherein the computer-executable instructions, when executed, further cause the one or more computing devices to train a neural network that determines that the first secondary storage computing device is performing anomalously.

10. The information management system of claim 1, wherein the computer-executable instructions, when executed, further cause the one or more computing devices to:

obtain a list of alternate secondary storage computing devices that are associated with the first secondary storage computing device based on one or more storage policies;

for each alternate secondary storage computing device on the list, determine one or more values of one or more of: pending jobs, failed jobs, and jobs running longer than expected, that are allocated to the respective alternate secondary storage computing device on the list;

determine that the alternate secondary storage computing device is healthy based on not exceeding the one or more threshold values; and based on determining that the alternate secondary storage computing device is healthy, route the future jobs to the alternate secondary storage computing device instead of to the first secondary storage computing device.

11. A data storage management system comprising:

a first secondary storage computing device comprising one or more hardware processors; and one or more computing devices comprising one or more hardware processors, wherein the one or more computing devices are in communication with the first secondary storage computing device, and wherein the one or more computing devices are configured with computer-executable instructions that, when executed, cause the one or more computing devices to:

determine that the first secondary storage computing device is performing anomalously, based on the first secondary storage computing device exceeding one or more expected values of at least one metric measured for jobs previously allocated to the first secondary storage computing device over a period of time, wherein the at least one metric measured one or more of: jobs running longer than expected, pending jobs, failed jobs, suspended jobs, killed jobs, and jobs successfully completed;

determine that, among one or more alternate secondary storage computing devices in the data storage management system, an alternate secondary storage computing device is available to take over for the first secondary storage computing device;

determine that the alternate secondary storage computing device does not exceed one or more threshold values corresponding to one or more of: pending jobs, failed jobs, and jobs running longer than expected, that are allocated to the alternate secondary storage computing device; and based on determining that the one or more threshold values are not exceeded at the alternate secondary storage computing device: place the first secondary storage computing device into a disabled state, and while the first secondary storage computing device is in the disabled state, route future jobs that comprise secondary copy operations to the alternate secondary storage computing device instead of to the first secondary storage computing device.

12. The data storage management system of claim 11, wherein the computer-executable instructions, when executed, further cause the one or more computing devices to:
  monitor the jobs at the first secondary storage computing device to measure the at least one metric of the first secondary storage computing device; and
  determine the one or more expected values of the at least one metric.

13. The data storage management system of claim 11, wherein the first secondary storage computing device is configured to execute a media agent, which performs the jobs at the first secondary storage computing device, and wherein the future jobs are routed to an alternate media agent that executes on the alternate secondary storage computing device.

14. The data storage management system of claim 11, wherein the computer-executable instructions, when executed, further cause a storage manager among the one or more computing devices to: place the first secondary storage computing device into the disabled state, and while the first secondary storage computing device is in the disabled state, route the future jobs to the alternate secondary storage computing device instead of to the first secondary storage computing device.

15. The data storage management system of claim 11, determining that the first secondary storage computing device is performing anomalously is based at least in part based on a time-series decomposition of jobs data associated with the first secondary storage computing device.

16. The data storage management system of claim 11, wherein the computer-executable instructions, when executed, further cause the one or more computing devices to:
  determine a number of times that the first secondary storage computing device has been recycled within a threshold period of time;
  based on determining that the number of times is below a threshold value, place the first secondary storage computing device into an enabled state, and while the first secondary storage computing device is in the enabled state, route future jobs that comprise secondary copy operations to the first secondary storage computing device instead of to the alternate secondary storage computing device; and
  based on determining that the number of times is above the threshold value, continue to route the future jobs to the alternate secondary storage computing device instead of to the first secondary storage computing device.

17. The data storage management system of claim 11, wherein at least one metric measured for jobs previously allocated to the first secondary storage computing device over the period of time comprise an expected trend, and wherein the first secondary storage computing device is performing anomalously by deviating from the expected trend.

18. The data storage management system of claim 11, wherein the alternate secondary storage computing device is associated with the first secondary storage computing device based on a storage policy.

19. The data storage management system of claim 11, wherein determining that the first secondary storage computing device is performing anomalously is further based on a measure of usage of computing resources of the first secondary storage computing device exceeding a threshold value.

20. The data storage management system of claim 11, wherein the computer-executable instructions, when executed, further cause the one or more computing devices to:
  obtain a list of alternate secondary storage computing devices that are associated with the first secondary storage computing device based on one or more storage policies;
  for each alternate secondary storage computing device on the list, determine one or more values of one or more of: pending jobs, failed jobs, and jobs running longer than expected, that are allocated to the respective alternate secondary storage computing device on the list;
  determine that the alternate secondary storage computing device is healthy based on not exceeding the one or more threshold values; and
  based on determining that the alternate secondary storage computing device is healthy, route the future jobs to the alternate secondary storage computing device instead of to the first secondary storage computing device.

* * * * *